(12) United States Patent
Park et al.

(10) Patent No.: US 10,716,137 B2
(45) Date of Patent: Jul. 14, 2020

(54) APPARATUS AND METHOD FOR CHANNEL ACCESS IN WIRELESS COMMUNICATION SYSTEM

(71) Applicants: Samsung Electronics Co., Ltd., Suwon-si, Gyeonggi-do (KR); Korea University Research and Business Foundation, Seoul (KR)

(72) Inventors: Seung-Hoon Park, Seoul (KR); Chung Gu Kang, Seoul (KR); Chung Kee Kim, Seoul (KR); Jung-Min Moon, Suwon-si (KR); Junman Lee, Seoul (KR); Byounghoon Jung, Suwon-si (KR); Jungsoo Jung, Suwon-si (KR)

(73) Assignees: Samsung Electronics Co., Ltd., Suwon-si (KR); Korea University Research and Business Foundation, Seoul (KR)

( * ) Notice: Subject to any disclaimer, the term of this patent is extended or adjusted under 35 U.S.C. 154(b) by 12 days.

(21) Appl. No.: 15/990,606

(22) Filed: May 26, 2018

(65) Prior Publication Data

US 2018/0343670 A1 Nov. 29, 2018

(30) Foreign Application Priority Data

May 26, 2017 (KR) .......................... 10-2017-0065534

(51) Int. Cl.
*H04W 74/00* (2009.01)
*H04W 72/12* (2009.01)
(Continued)

(52) U.S. Cl.
CPC ......... *H04W 74/006* (2013.01); *H04W 16/14* (2013.01); *H04W 72/1289* (2013.01);
(Continued)

(58) Field of Classification Search
CPC ............... H04W 74/006; H04W 16/14; H04W 72/1289; H04W 72/1268; H04W 74/0808; H04L 5/001; H04L 5/0044
(Continued)

(56) References Cited

U.S. PATENT DOCUMENTS

| 2015/0215874 A1* | 7/2015 | Chen | ..................... H04W 52/18 455/522 |
| 2016/0066195 A1* | 3/2016 | Moon | ................... H04W 16/14 455/454 |

(Continued)

FOREIGN PATENT DOCUMENTS

WO 2016081375 A1 5/2016

OTHER PUBLICATIONS

Qualcomm, et al., "Way Forward on supporting trigger based transmission for UL in eLAA," R1-165923, 3GPP TSG RAN WG1 #85, Busan, Korea, May 23-27, 2016, 6 pages.

*Primary Examiner* — Obaidul Huq

(57) ABSTRACT

The present disclosure relates to a pre-$5^{th}$-Generation (5G) or 5G communication system for supporting higher data rates beyond $4^{th}$-Generation (4G) communication system such as long term evolution (LTE). According to various embodiments in the present disclosure, a method of operating a terminal in a wireless communication system comprises receiving information for indicating a pre-listen interval within an allocated channel occupancy time from a base station (BS), transmitting a reporting signal for indicating that occupancy of an unlicensed band by at least one node is not detected during the pre-listen interval, receiving resource allocation information for indicating uplink resources of the unlicensed band allocated based on the reporting signal, and transmitting uplink data through the uplink resources.

26 Claims, 25 Drawing Sheets

(51) Int. Cl.
*H04W 16/14* (2009.01)
*H04W 74/08* (2009.01)
*H04L 5/00* (2006.01)

(52) U.S. Cl.
CPC ............ *H04L 5/001* (2013.01); *H04L 5/0044* (2013.01); *H04W 72/1268* (2013.01); *H04W 74/0808* (2013.01)

(58) Field of Classification Search
USPC ................................. 370/310, 328, 320, 330
See application file for complete search history.

(56) References Cited

U.S. PATENT DOCUMENTS

2017/0048880 A1* 2/2017 Anderson ......... H04W 72/1226
2018/0049241 A1* 2/2018 Heo .................. H04W 74/0808

* cited by examiner

APPARATUS AND METHOD FOR CHANNEL ACCESS IN WIRELESS COMMUNICATION SYSTEM

CROSS-REFERENCE TO RELATED APPLICATION AND CLAIM OF PRIORITY

This application is based on and claims priority under 35 U.S.C. § 119 to Korean Patent Application No. 10-2017-0065534 filed on May 26, 2017 in the Korean Intellectual Property Office, the disclosure of which is incorporated herein by reference in its entirety.

BACKGROUND

1. Field

The present disclosure relates generally to a wireless communication system, and more particularly to an apparatus and a method for channel access in a wireless communication system.

2. Description of Related Art

The above information is presented as background information only to assist with an understanding of the present disclosure. No determination has been made, and no assertion is made, as to whether any of the above might be applicable as prior art with regard to the present disclosure.

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

SUMMARY

Based on the above-described discussion, the present disclosure provides an apparatus and a method for uplink channel access in a wireless communication system.

The present disclosure provides an apparatus and a method for determining occupancy of an unlicensed band before uplink scheduling in a wireless communication system.

The present disclosure provides an apparatus and a method for performing control signaling in order to grasp occupancy of the unlicensed band before uplink scheduling in a wireless communication system.

The present disclosure provides an apparatus and a method for grasping a status of a channel adjacent to the terminal in a wireless communication system.

The present disclosure provides an apparatus and a method for exchanging parameters for reducing an uplink resource information processing time and performing control signaling in a wireless communication system.

The present disclosure provides an apparatus and a method for determining occupancy of a channel for a plurality of carriers and accessing an uplink channel in a wireless communication system.

The present disclosure provides an apparatus and a method for occupying an uplink channel by the terminal used to perform transmission in the unlicensed band in a wireless communication system.

In accordance with an aspect of the present disclosure, an apparatus of a terminal in a wireless communication system includes at least one processor and at least one transceiver. The at least one transceiver may receive information for indicating a pre-listen interval within an allocated channel occupation time from a base station (BS), transmit a reporting signal for indicating that occupancy of an unlicensed band by at least one node is not detected during the pre-listen interval, receive resource allocation information for indicating uplink resources of the unlicensed band allocated based on the reporting signal, and transmit uplink data through the uplink resources.

In accordance with another aspect of the present disclosure, an apparatus of a base station (BS) in a wireless communication system includes at least one processor and at least one transceiver. The at least one transceiver may transmit information for indicating a pre-listen interval within an allocated channel occupation time (COT), receive, from a terminal, a reporting signal for indicating that occupancy of an unlicensed band by at least one node is not detected during the pre-listen interval, transmit, to the terminal, resource allocation information for indicating uplink resources of the unlicensed band allocated based on the reporting signal, and receive uplink data in the unlicensed band.

In accordance with another aspect of the present disclosure, a method of operating a terminal in a wireless communication system includes: receiving information for indicating a pre-listen interval within an allocated channel occupancy time from a base station (BS); transmitting a reporting signal for indicating that occupancy of an unlicensed band by at least one node is not detected during the pre-listen interval; receiving resource allocation information for indicating uplink resources of the unlicensed band allocated based on the reporting signal; and transmitting uplink data through the uplink resources.

In accordance with another aspect of the present disclosure, a method of operating a base station (BS) in a wireless communication system includes: transmitting information for indicating a pre-listen interval within an allocated channel occupation time (COT); receiving, from a terminal, a reporting signal for indicating that occupancy of an unlicensed band by at least one node is not detected during the pre-listen interval; transmitting, to the terminal, resource allocation information for indicating uplink resources of the unlicensed band allocated based on the reporting signal; and receiving uplink data in the unlicensed band.

An apparatus and a method according to various embodiments of the present disclosure can more accurately grasp a current channel status of a terminal, thereby effectively allocating resources.

Effects which can be acquired by the present disclosure are not limited to the above described effects, and other effects that have not been mentioned may be clearly understood by those skilled in the art from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
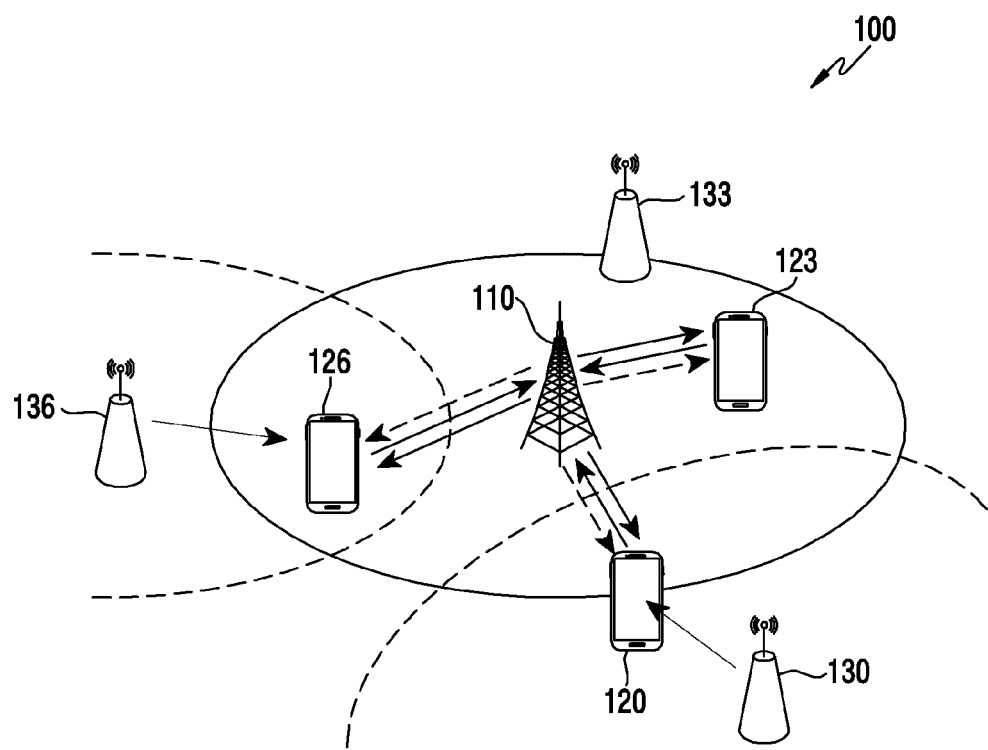
FIG. 1 illustrates a wireless communication environment according to various embodiments of the present disclosure.

FIGS. 1 through 24, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The terms used in the present disclosure are only used to describe specific embodiments, and are not intended to limit the present disclosure. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

Hereinafter, various embodiments of the present disclosure will be described based on an approach of hardware. However, various embodiments of the present disclosure include a technology that uses both hardware and software and thus, the various embodiments of the present disclosure may not exclude the perspective of software.

As used herein, singular forms may include plural forms as well unless the context clearly indicates otherwise. The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

Hereinafter, the present disclosure relates to an apparatus and a method for uplink channel access in a wireless communication system supporting Licensed Assisted Access (LAA). Specifically, the present disclosure describes operations for reducing a waste of resources allocated for uplink channel access and increasing a probability of channel occupancy for uplink data transmission.

The terms referring to control information used in the following description, the terms for calculation states (for example, a step and an operation), the terms referring to data (for example, information or a value), the terms referring to a network entity, signaling, uplink burst, or downlink burst (for example, a 5GNB, a central unit (CU), a distributed unit (DU), a radio unit (RU)), the terms referring to messages (for example, feedback, a signal, or data), and the terms referring to elements of the device are employed for convenience of description. Accordingly, the present disclosure is not limited to the following terms and other terms having the same technical meaning may be used.

Further, the present disclosure describes various embodiments through the terms used in some communication standards (for example, a long term evolution (LTE) system and an LTE-Advanced (LTE-A) system defined by 3rd Generation Partnership Project (3GPP) and a 802.11 system defined by the Institute of Electrical and Electrical Engineers (IEEE)), but those are only examples for description. Various embodiments of the present disclosure may be easily modified and applied to other communication systems.

As the usage of wireless terminals or the like has increased, demands for an increase in wireless resources have also increased. For the efficient use of limited resources, the case where two communication systems having different access schemes share resources increases. When two communication systems coexist while sharing the same band, the two communication systems have to guarantee fairness therebetween. In order to prevent one system from exclusively using a channel, an LAA procedure including Listen Before Talk (LBT) is mentioned as a coexistence technology for guaranteeing fairness between two communication systems.

In 3rd Generation Partnership Project (3GPP) LAA, the LBT procedure is divided in four categories.

Category 1: does not perform the LBT

Category 2: performs the LBT without random backoff

Category 3: performs the LBT through random backoff in a fixed contention window Category 4: performs the LBT through random backoff in a variable contention window According to the scheme adopted by 3GPP, a base station (BS) may perform the LBT procedure of category 4 before downlink transmission and, if an arbitrary node occupying an unlicensed band is not detected, transmit downlink data through the unlicensed band. A UE may perform the LBT procedure of category 2 or the LBT procedure of category 4 before uplink transmission and, when an arbitrary node occupying an unlicensed band is not detected, transmit uplink data through the unlicensed band. The present disclosure is described on the assumption that the BS performs the LBT procedure of category 4 before downlink transmission and the UE performs the LBT procedure of category 2 before uplink transmission. However, LBT procedures of other categories may be performed.

FIG. 1 illustrates a wireless communication environment 100 according to various embodiments of the present disclosure.

Referring to FIG. 1, the wireless communication environment 100 may include a BS 110, a terminal (or UE) 120, and a node 130. Hereinafter, for convenience of description, the present disclosure is described based on division into a BS operating in a licensed band and a BS operating in an unlicensed band, but it is only an example for conceptually distinguishing the operation and the present disclosure is not limited thereto. In other words, one BS may perform the operations both in the licensed band and the unlicensed band.

The BS 110 is a network infrastructure that provides wireless access to the UE within coverage. The coverage may be defined as a geographical area based on range within which the BS 110 can transmit a signal. The BS 110 may provide a service to terminals (for example, terminals 120, 123, and 126) within the coverage (or cell). The BS may be referred to as "access point (AP)", "eNodeB (eNB)", "5$^{th}$-Generation (5G) node", "5G NodeB (NB)", "wireless point", "transmission/reception point (TRP)", a "digital unit (DU)", a "radio unit (RU)", a "remote radio head (RRH)", or other terms having an equivalent technical meaning, as well as a "base station". The BS 110 may perform communication with at least one terminal within the coverage.

The terminal 120, which is a device used by a user, communicates with the BS 110 through a wireless channel. According to circumstances, at least one terminal 120 may operate without user involvement. For example, terminal 120 is a device that performs machine type communication (MTC), and may not be carried by a user. The terminal 120 may be referred to as "user equipment (UE)", "mobile station", "subscriber station", "remote terminal", "wireless terminal", "electronic device", "user device", or other terms having the equivalent technical meaning, as well as "terminal". The terminal (for example, the terminal 120) according to various embodiments of the present disclosure may include at least one of, for example, a smart phone, a tablet personal computer (PC), a mobile phone, a video phone, an electronic book reader, a desktop PC, a laptop PC, a netbook computer, a workstation, a server, a personal digital assistant (PDA), a portable multimedia player (PMP), a MPEG-1 audio layer-3 (MP3) player, a medical device, a camera, and a wearable device. Although a description of the terminal is made based on the terminal 120, it can be applied to the terminal 123 and the terminal 126.

The node 130 may be a network node that provides radio access to the UE within the coverage of the unlicensed band. The node 130 may support a communication system operating in the unlicensed band. For example, the node 130 may be a device that supports a Wi-Fi communication system. In another example, the node 130 may be a device that supports a wireless local area network (WLAN) communication system. In another example, the node 130 may be a device that supports a Bluetooth communication system. Hereinafter, for convenience of description, the node 130 is described as an AP that supports the Wi-Fi communication system, but is not limited thereto. The description of the node operating in the unlicensed band is made based on the node 130, but can be applied to a node 133 and a node 136.

The wireless communication environment 100 may include the BS 110, the terminal 120, the terminal 123, the terminal 126, and the node 133. The BS 110 is located outside the coverage of each of the nodes 130 and 136. The terminal 120 is adjacent to the node 130, the terminal 123 is adjacent to the node 133, and the terminal 126 is adjacent to the node 136.

The wireless communication environment 100 may be a wireless environment in which the licensed band and the unlicensed band coexist. The BS 110 and the terminal 120 may be devices that support LAA. The BS 110 and the terminal 120 may occupy a channel after an LBT procedure in order to coexist with the node 130 operating in the unlicensed band. Hereinafter, a channel subject to be occupied or not is a channel in the unlicensed band. The BS 110 may identify that the channel in the unlicensed band is not occupied through the LBT procedure. The BS 110 may determine a maximum channel occupation time (COT) for occupying the unlicensed band. The maximum COT is a maximum value of the time allocated for uplink data transmission and downlink data transmission by the BS 110 and the terminal 120 through the unlicensed band. The BS 110 may allocate downlink resources for downlink transmission. The BS 110 may allocate uplink resources to the terminal (for example, the terminal 120) requiring uplink transmission. The BS 110 may transmit downlink data to the terminal 120 through downlink resources within the COT. The BS 110 may prevent nodes adjacent to the BS 110 from occupying the channel in the unlicensed band while downlink data is transmitted.

Before transmitting uplink data, the terminal 120 may identify whether nodes adjacent to the terminal 120 occupy the channel. When it is determined that the nodes adjacent to the terminal 120 do not occupy the channel, the terminal 120 may transmit uplink data to the BS 110 through allocated uplink resources. However, when the terminal 120 transmits the uplink data through the unlicensed band, the node 130 may occupy the unlicensed band. As the channel in the unlicensed band is currently occupied (busy), the terminal 120 may not perform uplink data transmission. At this time, uplink resources which the BS 110 allocates to the terminal 120 are not used. In other words, a waste of uplink resources occurs.

As described above, since the allocation of the uplink resources by the BS 110 is performed before the determination of the occupancy of the channel by the terminal 120, the state of the channel adjacent to the terminal 120 may not be accurately grasped in uplink data transmission. In order to solve the waste of resources, a procedure is performed of grasping a channel state (for example, whether the channel is occupied) by nodes adjacent to the terminal 120 before the BS 110 performs uplink resource scheduling. Hereinafter, the procedure is referred to as listen before scheduling (LBS) in the present disclosure. When the channel is not occupied by the nodes adjacent to the terminal 120, the BS 110 may allocate uplink resources to the terminal 120, thereby preventing a waste of the uplink resources.

Figure 2:
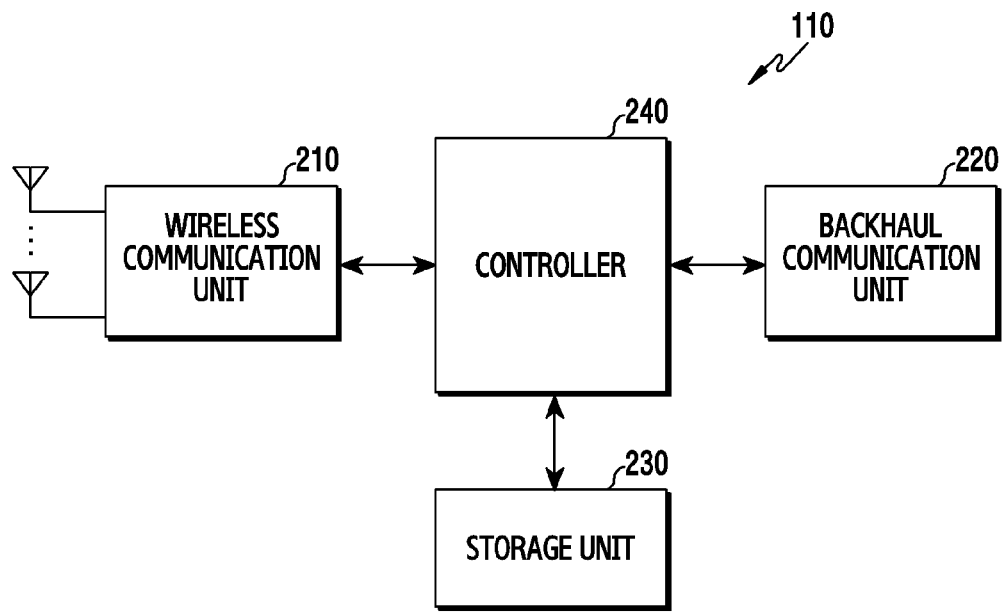
FIG. 2 illustrates the configuration of a BS in a wireless communication system according to various embodiments of the present disclosure.
Figure 3:
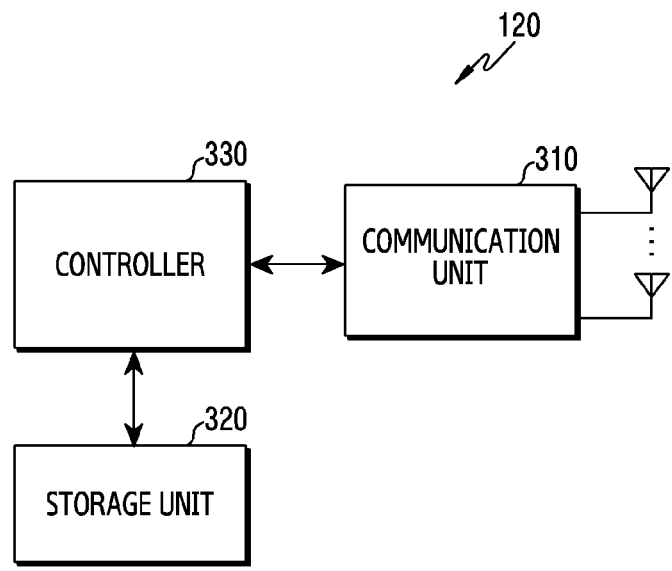
FIG. 3 illustrates the configuration of a terminal in a wireless communication system according to various embodiments of the present disclosure.
Figure 4:
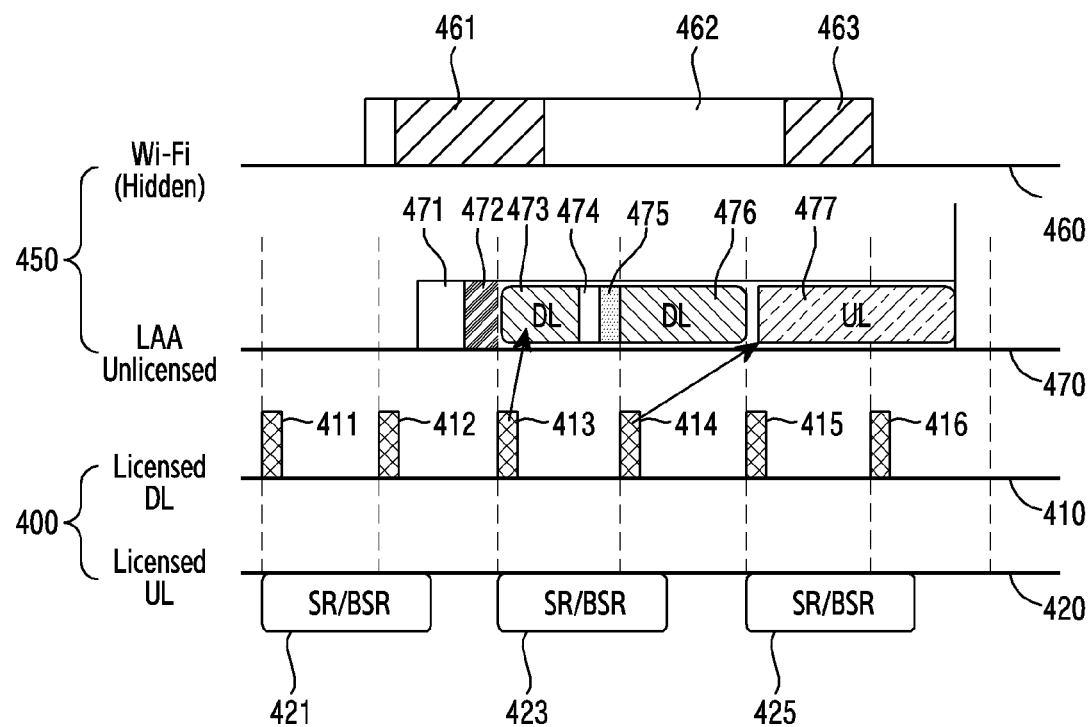
FIG. 4 illustrates an example of an uplink channel access procedure through Listen Before Scheduling (LBS) according to various embodiments of the present disclosure.

Hereinafter, FIGS. 2 and 3 illustrate the configuration of the BS 110 and the configuration of the terminal 120 for performing the LBS procedure, respectively. FIG. 4 illustrates an LBS mechanism according to various embodiments of the present disclosure.

FIG. 2 illustrates the configuration of the BS 110 in a wireless communication system according to various embodiments of the present disclosure. The configuration illustrated in FIG. 2 may be understood as the configuration of the BS 110. The term " . . . unit" or the ending of a word, such as " . . . or", " . . . er", or the like may indicate a unit of processing at least one function or operation, and this may be embodied by hardware, software, or a combination of hardware and software.

Referring to FIG. 2, the BS 110 may include a wireless communication unit 210, a backhaul communication unit 220, a storage unit 230, and a controller 240. The wireless communication unit 210 performs functions for transmitting and receiving signals through a wireless channel. For example, the wireless communication unit 210 may perform a function of conversion between a baseband signal and bitstreams according to a physical layer standard of the system. For example, in data transmission, the wireless communication unit 210 generates complex symbols by encoding and modulating transmission bitstreams. Further, in data reception, the wireless communication unit 210 reconstructs reception bitstreams by demodulating and decoding the baseband signal. In addition, the wireless communication unit 210 up-converts the baseband signal into a radio-frequency (RF) band signal, transmits the converted signal through an antenna, and then down-converts the RF band signal received through the antenna into the baseband signal.

To this end, the wireless communication unit 210 may include a transmission filter, a reception filter, an amplifier, a mixer, an oscillator, a Digital-to-Analog Convertor (DAC), an analog-to-digital convertor (ADC), and the like. Further, the wireless communication unit 210 may include a plurality of transmission/reception paths. In addition, the wireless communication unit 210 may include at least one antenna array consisting of a plurality of antenna elements. On the hardware side, the wireless communication unit 210 may include a digital unit and an analog unit, and the analog unit may include a plurality of sub-units according to operation power, operation frequency, and the like.

The wireless communication unit 210 transmits and receives the signal as described above. Accordingly, some or all of the wireless communication unit 210 may be referred to as a "transmitter", a "receiver", or a "transceiver". Further, in the following description, transmission and reception performed through the wireless channel may be used to have a meaning including the processing performed by the wireless communication unit 210 as described above.

The wireless communication unit 210 may transmit/receive a signal in a licensed band. The licensed band is a communication band allocated to a particular network service provider, wherein a service is provided from the corresponding service provider. The wireless communication unit 210 may also transmit a signal in an unlicensed band. The unlicensed band is a communication band (for example, 5 GHz) which can be used without permission of the network service provider. The wireless communication unit 210 may perform carrier aggregation (CA). The CA may be performed based on the settings in which a carrier of the licensed band is a PCC and a carrier of the unlicensed band is an SCC.

The backhaul communication unit 220 provides an interface for performing communication with other nodes within the network. That is, the backhaul communication unit 220 converts bitstreams transmitted to another node, for example, another access node, another BS, a higher node, or a core network, from the BS 110 into a physical signal and converts the physical signal received from the other node into the bitstreams. Meanwhile, although the present disclosure describes that the BS 110 operates both in the licensed band and the unlicensed band, the BS 110 may operate in the licensed band and another BS may operate in the unlicensed band. The BS 110 may control the operation of the other BS in the unlicensed band through the backhaul communication unit 220. For example, the BS 110 may control the other BS to transmit control information including uplink grant to the terminal 120.

The storage unit 230 stores a basic program, an application, and data such as setting information for the operation of the BS 110. The storage unit 230 may include a volatile memory, a non-volatile memory, or a combination of volatile memory and non-volatile memory. Further, the storage unit 230 provides stored data in response to a request from the controller 240.

The controller 240 controls the general operation of the BS 110. For example, the controller 240 transmits and receives a signal through the wireless communication unit 210 or the backhaul communication unit 220. Further, the controller 240 records data in the storage unit 230 and reads the recorded data. The controller 240 may perform functions of protocol stack used in the communication standards. To this end, the controller 240 may include at least one processor. According to various embodiments, the controller 240 may include a scheduler. The scheduler may allocate resources for downlink transmission. The scheduler may also allocate resources for uplink transmission. The scheduler may correspond to an instruction set or code stored in the storage unit 230, and may be instructions/code that reside at least temporarily in the controller 240, a storage space that stores the instructions/code, or part of the circuitry included in the controller 240. For example, the controller 240 may control the BS 110 to perform the operations described below according to various embodiments.

FIG. 3 illustrates the configuration of the terminal 120 in a wireless communication system according to various embodiments of the present disclosure. The configuration illustrated in FIG. 3 may be understood as the configuration of the terminal 120. The term " . . . unit" or the ending of a word, such as " . . . or", " . . . er", or the like may indicate a unit of processing at least one function or operation, and this may be embodied by hardware, software, or a combination of hardware and software.

Referring to FIG. 3, the terminal 120 includes a communication unit 310, a storage unit 320, and a controller 330. The communication unit 310 performs functions for transmitting/receiving a signal through a wireless channel. For example, the communication unit 310 performs a function of conversion between a baseband signal and a bit stream according to a physical layer standard of the system. For example, when data is transmitted, the communication unit 310 generates complex symbols by encoding and modulating a transmission bit stream. Also, when data is received, the communication unit 310 reconstructs a reception bit stream by demodulating and decoding a baseband signal. In addition, the communication unit 310 up-converts the baseband signal into an RF band signal, transmits the converted signal through an antenna, and then down-converts the RF band signal received through the antenna into the baseband signal. For example, the communication unit 310 may include a transmission filter, a reception filter, an amplifier, a mixer, an oscillator, a DAC, and an ADC.

Further, the communication unit 310 may include a plurality of transmission/reception paths. In addition, the communication unit 310 may include at least one antenna array consisting of a plurality of antenna elements. On the hardware side, the communication unit 310 may include a digital circuit and an analog circuit (for example, a radio frequency integrated circuit: RFIC). The digital circuit and the analog circuit may be implemented as one package. The communication unit 310 may include a plurality of RF chains. The communication unit 310 may perform beamforming.

The communication unit 310 may include different communication modules to process signals in different frequency bands. The communication unit 310 may include a communication module for processing signals of the licensed band. For example, the communication unit 310 may include a communication module for accessing a cellular network of an LTE communication system. Further, the communication unit 310 may include a communication module for processing signals of the unlicensed band. For example, the communication unit 310 may include a bluetooth low energy (BLE) module, a Wi-Fi module, or Wi-Fi gigabyte (WiGig). The communication unit 310 may include a plurality of communication modules described above to support a plurality of different radio access technologies (RATs). Further, different frequency bands may include a super high frequency (SHF) (for example, 2.5 GHz and 5 GHz) band and a millimeter (mm) wave (for example, 60 GHz) band.

The communication unit 310 transmits and receives the signal as described above. Accordingly, all or some of the communication unit 310 may be referred to as a "transmitter", a "receiver", or a "transceiver". Further, in the following description, transmission and reception performed through the wireless channel is used to have a meaning including the processing performed by the communication unit 310 as described above.

The storage unit 320 stores data such as a basic program, an application program, and setting information for the operation of the terminal 120. The storage unit 320 may include a volatile memory, a non-volatile memory, or a combination of volatile memory and non-volatile memory. Further, the storage unit 320 provides stored data in response to a request from the controller 330. The storage unit 320 may include a buffer. According to various embodiments, the storage unit 320 may store a plurality of transport blocks generated by the controller 330.

The controller 330 controls the general operation of the terminal 120. For example, the controller 330 transmits and receives a signal through the communication unit 310. Further, the controller 330 records data in the storage unit 320 and reads the recorded data. The controller 330 may perform functions of protocol stack used in the communication standards. To this end, the controller 330 may include at least one processor or microprocessor, or may play the part of the processor. Further, the relevant portion of the communication unit 310 or the controller 330 may be referred to as a communication processor (CP). Particularly, according to various embodiments, the controller 330 controls to generate a transport block according to control information received from the BS 110 and map the generated transport block to allocated uplink resources. For example, the controller 330 may control the terminal to perform the operations described below according to various embodiments.

FIG. 4 illustrates an example of an uplink channel access procedure through LBS according to various embodiments of the present disclosure. The LBS is a procedure in which the terminal 120 detects whether a channel is occupied by nodes adjacent to the terminal 120 before the BS 110 performs uplink scheduling. In FIG. 4, operations for performing LBS of the terminal 120 and terms used for describing the operations are defined.

Referring to FIG. 4, the operation of the BS 110 and the operation of the terminal 120 may be divided into the operation in a licensed band 400 and the operation in an unlicensed band 450. A time axis 410 indicates progress of downlink transmission in the licensed band 400, a time axis 420 indicates progress of uplink transmission in the licensed band 400, a time axis 460 indicates progress of traffic of the node 130 in the unlicensed band 450, and a time axis 470 indicates progress of traffic exchanged between the BS 110 and the terminal 120 in the unlicensed band 450.

Referring to time axis 420, the BS 110 may transmit downlink control information (DCI) in every subframe. The DCI may be transmitted to the terminal 120 through a control channel (for example, Physical Downlink Control Channel (PDCCH)) within a subframe. For example, the BS 110 may periodically transmit DCI 411, DCI 412, DCI 413, DCI 414, DCI 415, and DCI 416. The terminal 120 may acquire information on downlink data by decoding the received DCI. The DCI 413 may include downlink resource allocation information corresponding to downlink traffic, and the DCI 414 may include uplink grant for uplink traffic. FIG. 4 illustrates that the DCI 414 is transmitted through the licensed band 400, but is not limited thereto. The DCI 414 may be transmitted through the unlicensed band 450.

Referring to the time axis 420, the terminal 120 may periodically transmit a scheduling request (SR) or a buffer status report (BSR) for uplink resource allocation. The SR refers to a signal transmitted by the terminal 120 to make a request for resources used for transmitting uplink data to the BS 110. The BSR refers to a signal for informing the BS 110 of a buffer status when data to be transmitted by the terminal 120 through the uplink remains in the buffer of the terminal 120. The terminal 120 may periodically transmit the SR/BSR to the BS 110. For example, the terminal 120 may transmit an SR/BSR 421, an SR/BSR 423, and an SR/BSR 425 to the BS 110 at a certain time interval.

Referring to the time axis 460, the node 130 may be a node outside the coverage of the BS 110. The node 130 occupies the unlicensed band 450 in an interval 461 and an interval 463. The node 130 does not occupy the unlicensed band 450 in the interval 462. The occupancy in the unlicensed band 450 by the node 130 may be identified according to whether an energy value detected in the unlicensed band 450 is larger than or equal to a threshold value. For example, when the node 130 transmits a signal during the interval 462 in the unlicensed band 450 and the BS 110 detects, that an intensity of the transmitted signal is smaller than the threshold value, it may be determined that there is no traffic for occupying the unlicensed band 450.

Referring to the time axis 470, the BS 110 may perform the LBT procedure (for example, LBT of category 4) during the interval 471. The BS 110 may perform energy detection (ED) of the LBT procedure. The BS 110 may identify whether energy by an arbitrary node is detected to be larger than or equal to the threshold value. When the detected energy value is larger than or equal to the threshold value, the BS 110 may determine that another node currently occupies the channel. In this case, the BS 110 may delay downlink transmission. In some embodiments, the BS 110 may operate in a freezing mode. In other words, the BS 110 may not occupy the unlicensed band 450 during a predetermined interval.

In contrast, when the detected energy value is smaller than the threshold value, the BS 110 may determine that another node does not occupy the channel. In this case, the BS 110 may allocate a maximum COT for occupying the unlicensed band. At this time, the BS 110 may transmit an initial signal during the interval 472 in order to perform frame synchronization. The initial signal is a signal for maintaining a channel occupancy state. The initial signal may be called a reservation signal or another name having the same technical meaning.

As illustrated in FIG. 1, when the BS 110 performs not only downlink scheduling but also uplink scheduling for the terminal 120 according to a result of the LBT procedure, the BS 110 cannot consider some nodes, thereby wasting resources. Among nodes adjacent to the terminal 120, a node having the coverage in which the BS 110 is not located, is referred to as a hidden node in the relation with the BS 110. For example, the node 130 of FIG. 1 is a hidden node of the BS 110. Although the BS 110 performs the LBT procedure, the BS 110 may not detect energy by the node 130. If the terminal 120 performs the LBT procedure after uplink scheduling, occupancy of the unlicensed band 450 by the node 130 may be detected after the uplink scheduling. In this case, the terminal 120 cannot transmit data. Accordingly, uplink resources allocated in the uplink scheduling are wasted.

In order to solve the problem, LBS according to various embodiments of the present disclosure is used. According to various embodiments, the BS 110 may individually perform downlink scheduling and uplink scheduling. The BS 110 may perform downlink scheduling for the unlicensed band 450. The BS 110 may transmit the DCI 413 to the terminal 120. The BS 110 may transmit downlink data during the interval 473 through downlink resources indicated by the DCI 413.

As the LBS, a pre-listen interval 474 may be defined in the present disclosure. The pre-listen interval 474 is an interval for detecting, by the terminal 120, channel occupancy of an arbitrary node in the unlicensed band 450, and may be allocated for the LBT operation directly performed by the terminal 120. Since the LBT is performed before uplink scheduling, the LBT may be referred to as the LBS. Instead of the BS 110, the terminal 120 performs the LBT procedure, so that the occupancy of the unlicensed band 450 by the node 130, which is a hidden node of the BS 110, can be detected. When traffic for occupying the unlicensed band 450 of the node 130 is not detected during the pre-listen interval 474, the terminal 120 may make a request for allocating uplink resources to the BS 110 in the interval 475. In response to the request for allocating uplink resources, the BS 110 may transmit uplink grant to the terminal 120 through the DCI 414. Accordingly, the terminal 120 may transmit uplink data during the interval 478.

In addition, the terminal 120 may further perform the LBT procedure (for example, LBT of category 2) during the interval 477. The terminal 120 may determine whether the node 130 occupies the channel in the unlicensed band 450. In the example of FIG. 4, since the node 130 does not occupy the channel during the interval 462, the terminal 120 may determine that the node 130 does not currently occupy the channel.

Meanwhile, unlike the example of FIG. 4, when the node 130 occupies the channel during the interval 462, the terminal 120 may detect energy of the node 130 in the pre-listen interval 474. The terminal 120 may inform the BS 110 that allocation of uplink resources is not needed in the interval 475. Alternatively, as the terminal 120 does not make a request for allocating uplink resources to the BS 110 in the interval 475, the BS 110 may be implicitly informed. The BS 110 may acquire a result of the LBT procedure of the terminal 120 performed during the pre-listen interval 474, thereby reducing a resource waste probability.

Hereinafter, control signaling between the BS 110 and the terminal 120 for performing LBS and relevant parameters will be described in detail with reference to FIGS. 5 to 8.

Figure 5:
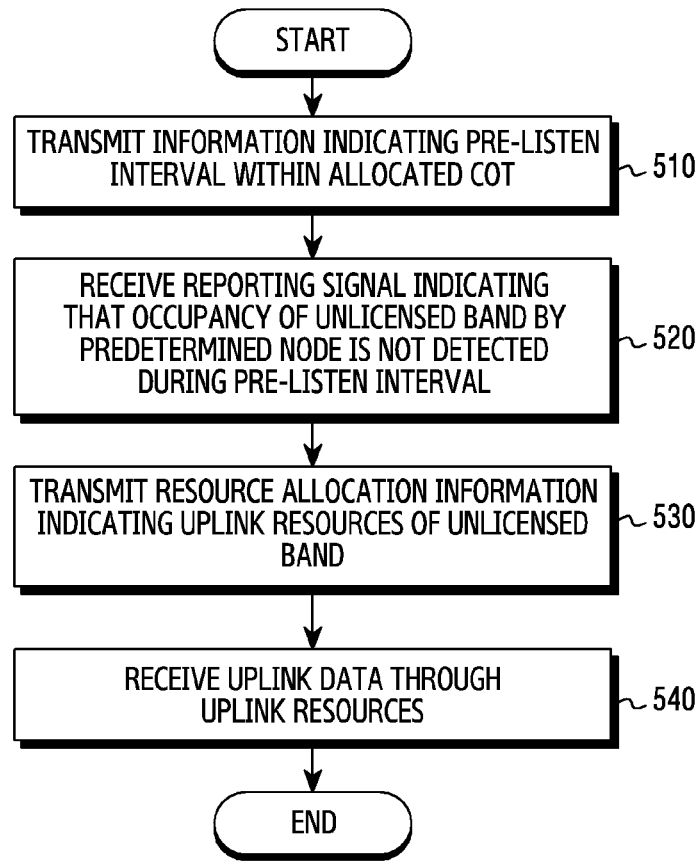
FIG. 5 is a flowchart illustrating the operation of the BS performing LBS in a wireless communication system according to various embodiments of the present disclosure.

FIG. 5 is a flowchart illustrating the operation of the BS 110 for performing LBS in a wireless communication system according to various embodiments of the present disclosure. The BS 110 may be connected to the terminal 120 through the licensed band. Hereinafter, although it is described that the BS 110 operates both in the licensed band and the unlicensed band, some of the operations of the BS 110 described below may be interpreted as being performed by another BS under control of the BS 110. For example, the BS 110 may be a BS operating in the licensed band, and the other BS may be a BS operating in the unlicensed band.

Referring to FIG. 5, in step 510, the BS 110 may transmit information indicating a pre-listen interval within the allocated COT. The BS 110 may broadcast a message including configuration information indicating the pre-listen interval. The configuration information may include parameters used for the operation of the terminal 120 in the unlicensed band. In some embodiments, the BS 110 may transmit information indicating the pre-listen interval to the terminal 120 through a request signal.

In step 520, the BS 110 may receive, from the terminal 120, a reporting signal for indicating that occupancy of the unlicensed band by at least one node is not detected during the pre-listen interval. When a signal higher than or equal to a threshold value by an arbitrary node (for example, the node 130) is not detected in the unlicensed band during the pre-listen interval, the terminal 120 may generate a reporting signal indicating that the any node does not occupy the unlicensed band.

The reporting signal may indicate a result of the LBT performed by the terminal 120 during the pre-listen interval, that is, a result of the LBS performed by the terminal 120. The terminal 120 may transmit a reporting signal indicating that occupancy of the unlicensed band is not detected as the result of the LBS to the BS 110. In some embodiments, the result of the LBS may be implicitly indicated according to whether the reporting signal is transmitted or not. When the BS 110 receives the reporting signal in the unlicensed band, the BS 110 may determine that the terminal 120 does not detect the occupancy of the channel by another node in the unlicensed band during the pre-listen interval. According to the reception of the reporting signal in the unlicensed band, the BS 110 may determine that the terminal 120 transmits a request for allocating uplink resources in the unlicensed band, that is, a scheduling request. In some embodiments, the result of the LBS may be explicitly indicated by the reporting signal. For example, the BS 110 may receive, from the terminal 120, feedback information indicating whether the channel is occupied by another node in the licensed band during the pre-listen interval. In another example, the BS 110 may receive, from the terminal 120, feedback information indicating whether the channel is occupied by another node in the unlicensed band during the pre-listen interval. The feedback information may be transmitted through resources separately allocated by the BS 110.

In some embodiments, the existing signal may be used as the reporting signal. For example, a sounding reference signal (SRS) may be used as the reporting signal. In this case, the BS 110 may induce transmission of the reporting signal by transmitting DCI for the SRS request to the terminal 120. The SRS may be an aperiodic SRS. In another example, the terminal 120 may use acknowledge (ACK)/negative acknowledge (NACK) of downlink data as the reporting signal. For example, ACK/NACK may indicate the result of the LBS instead of ACK/NACK of the subframe including the reporting signal. In another example, the terminal 120 may transmit the LBS result to the BS 110 by feeding back channel state information (CSI), which is fed back to the licensed band, to the unlicensed band. In another example, the terminal 120 may transmit the LBS result to the BS 110 by feeding back a measurement report (MR), which is periodically reported in the licensed band, to the unlicensed band.

In step 530, the BS 110 may transmit resource allocation information indicating uplink resources in the unlicensed band to the terminal 120. That is, according to the reception of the reporting signal, the BS 110 may allocate resources used for uplink transmission of the terminal 120 to the terminal 120. Specifically, the BS 110 may determine, from the reporting signal, that the terminal 120 can perform the uplink operation in the unlicensed band. For the uplink operation, the BS 110 may perform uplink scheduling. The BS 110 may generate resource allocation information indicating uplink resources. For example, the BS 110 may transmit resource allocation information to the terminal 120 through one of DCI formats 0A/0B/4A/4B. In another example, new DCI may be defined.

The resource allocation information may include position information indicating a position of a resource block to be used within an allocated system bandwidth. The terminal 120 may identify the position of the resource block through the position information. The terminal 120 may map a transport block (TB) to an actual physical resource block according to the identified position. In some embodiments, the resource allocation information may include uplink transmission information for generating the transport block. The uplink transmission information may be information used for generating the transport block before allocation to physical resources. For example, the uplink transmission information may include modulation and coding scheme (MCS) information. In another example, the uplink transmission information may include hybrid automatic repeat and request (HARQ)-related information. In another example, the uplink transmission information may include information indicating an amount of uplink traffic to be transmitted by the terminal 120. The uplink transmission information may include information indicating the number of resource blocks ($N_{PRB}$) allocated to the terminal 120.

In step 540, the BS 110 may receive uplink data through uplink resources. The BS 110 may receive uplink data in the unlicensed band.

Figure 6:
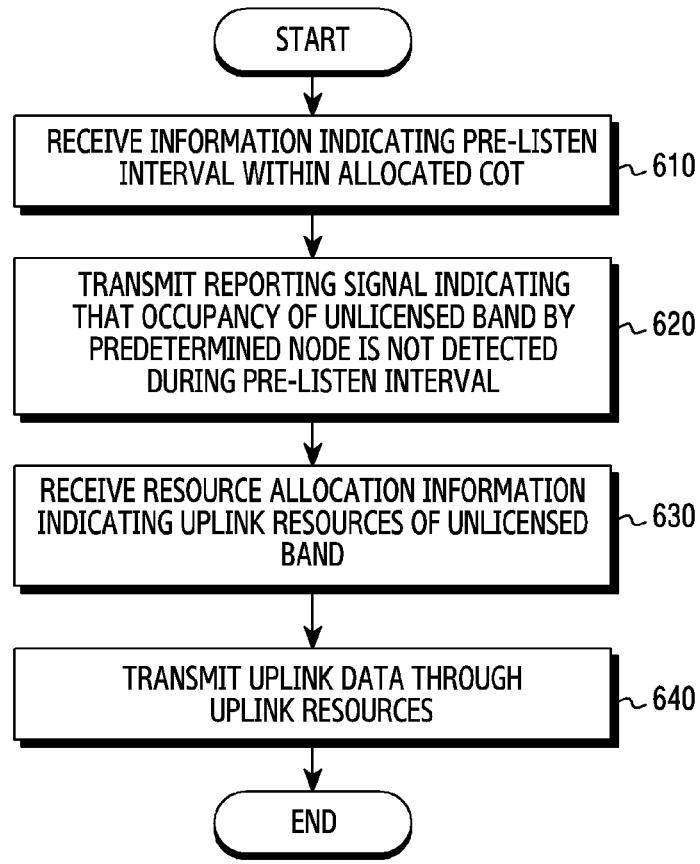
FIG. 6 is a flowchart illustrating the operation of the terminal performing LBS in a wireless communication system according to various embodiments of the present disclosure.

FIG. 6 is a flowchart illustrating the operation of the terminal 120 for performing LBS in a wireless communication system according to various embodiments of the present disclosure.

Referring to FIG. 6, in step 610, the terminal 120 may receive information indicating a pre-listen interval within the COT allocated from the BS 110. In some embodiments, the information indicating the pre-listen interval may be included in configuration information. The terminal 120 may receive the configuration information from the BS 110 through the licensed band. In some embodiments, the information indicating the pre-listen interval may be included in a request signal. The terminal 120 may receive the request signal from the BS 110 through the unlicensed band or the licensed band. The information indicating the pre-listen interval corresponds to the information indicating the pre-listen interval in step 510 of FIG. 5. When there is downlink transmission, the terminal 120 may receive downlink data before the pre-listen interval.

In step 620, the terminal 120 may transmit a reporting signal indicating that occupancy of the unlicensed band by at least one node is not detected during the pre-listen interval. The terminal 120 may determine the pre-listen interval from the configuration information received in step 610. The terminal 120 may determine whether there is occupancy of the unlicensed band by an arbitrary node during the pre-listen interval. That is, the terminal 120 may perform LBS. The terminal 120 may detect an intensity of a signal transmitted by another node without data transmission or reception. When the intensity of the detected signal is lower than a predetermined value, the terminal 120 may determine that any node does not occupy the unlicensed band. The terminal 120 may transmit the reporting signal to the unlicensed band. The terminal 120 may transmit a reporting signal for the purpose of making a request for uplink resources. The reporting signal corresponds to the reporting signal in step 520 of FIG. 5.

In step 630, the terminal 120 may receive resource allocation information indicating uplink resources in the unlicensed band. The resource allocation information corresponds to the resource allocation information in step 530 of FIG. 5. The terminal 120 may generate a transport block based on uplink transmission information. The terminal 120 may generate the transport block based on at least one piece of MCS information, HARQ information, and information indicating the number of resource blocks.

In step 640, the terminal 120 may transmit uplink data through uplink resources. The terminal 120 may transmit uplink data in the unlicensed band. The transmission of the uplink data may be referred to as uplink burst.

As described above with reference to FIGS. 5 and 6, it may be determined whether to perform uplink communication and uplink scheduling based on the pre-listen interval. Accordingly, it is possible to more effectively operate uplink resources. An example of using the frame according to the embodiment adopting the pre-listen interval will be described below with reference to FIG. 7.

Figure 7:
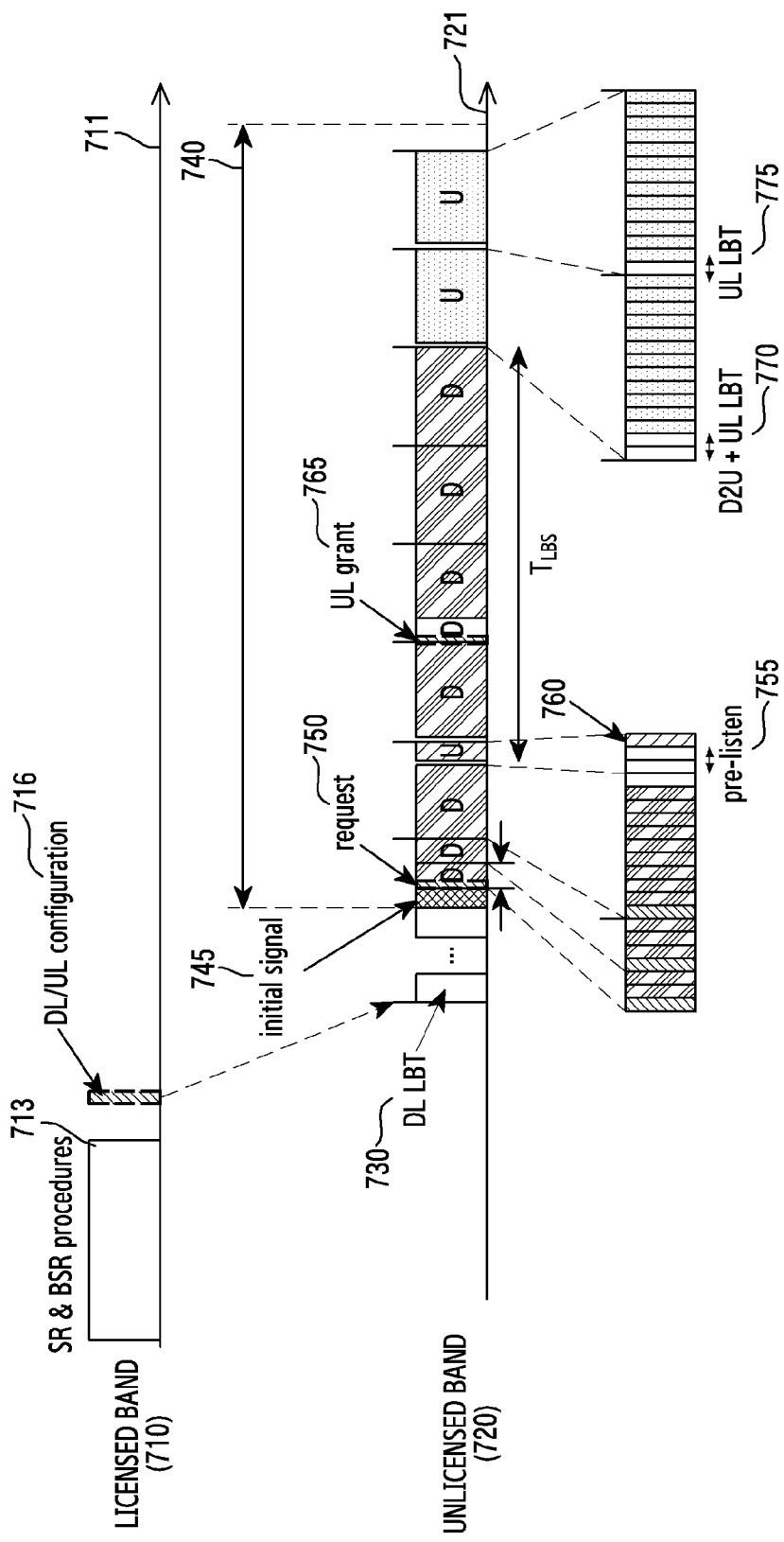
FIG. 7 illustrates an example of a subframe for LBS in a wireless communication system according to various embodiments of the present disclosure.

FIG. 7 illustrates an example of a subframe for LBS in a wireless communication system according to various embodiments of the present disclosure.

Referring to FIG. 7, the operation of the BS 110 and the operation of the terminal 120 may be performed both in a licensed band 710 and an unlicensed band 720. Meanwhile, the BS 110 is described as a BS operating both in the licensed band 710 and the unlicensed band 720, but is not limited thereto. The BS 110 may operate in the licensed band, and another BS connected to the BS 110 through a backhaul may operate in the unlicensed band.

A time axis 711 is a time axis for signaling performed by the BS 110 and the terminal 120 in the licensed band 710. A situation in which a scheduling request and buffer status report procedure 713 for uplink resource allocation of the terminal 120 is periodically performed will be described. A time axis 721 is a time axis for signaling performed by the BS 110 and the terminal 120 in the unlicensed band 720.

The BS 110 may generate configuration information 716 indicating DL-UL configuration for channel occupancy according to a predetermined reference such as downlink traffic and uplink traffic. The BS 110 may broadcast a message including the configuration information 716. The message may be a cell-specific signal. According to the reception of the configuration information 716, the terminal 120 may perform the operation used in the unlicensed band.

The configuration information 716 may include subframe information. The subframe information includes detailed information on a frame (or a subframe) for the operation of the BS 110 and the terminal 120 in the unlicensed band. The subframe information may include information on a subframe type and a subframe length in order to provide a purpose of each subframe within the COT to the terminal 120.

The subframe type may be a downlink subframe, an uplink subframe, a mixed subframe, or a blank subframe. The mixed subframe is a subframe including both an uplink symbol and a downlink symbol, and may be a self-contained subframe. The mixed subframe may indicate a subframe corresponding to a pre-listen interval. The mixed subframe may include a blank symbol for performing pre-listen, as a symbol corresponding to the pre-listen interval, as well as the downlink system and the uplink symbol.

The blank subframe is a subframe which is not designated for a specific purpose. The blank subframe may be one of the downlink subframe, the uplink subframe, and the mixed subframe. However, the configuration information may not indicate the purpose of the blank subframe. According to the LBS procedure, the purpose or the aim of the blank subframe may be determined.

The configuration information 716 may include mixed subframe information. The mixed subframe information may include information on each of symbols included in the mixed subframe. For example, the mixed subframe information may include information on whether a main component is a DL-dominant symbol or a UL-dominant symbol. In another example, the mixed subframe information may indicate the type of control information and data. For example, detailed information on the mixed subframe may indicate whether DCI is included and whether data traffic is downlink or uplink.

In some embodiments, the configuration information 716 may additionally include information on a transmission time interval (TTI). In order to reduce a delay time by signaling of the BS 110 and the terminal 120, a TTI shorter than a legacy TTI may be used. The legacy TTI may include one subframe, that is, 14 symbols. The length of the legacy TTI may be 1 ms. A short TTI may be an interval shorter than 1 ms (in other words, an interval corresponding to a number of symbols fewer than 14). For example, the short TTI may be 3 symbols. According to the use of the short TTI, latency of a data channel for processing traffic may be reduced.

Information on the TTI may include information indicating a subframe having a TTI different from the legacy TTI. In another example, the information on the TTI may include information indicating the number of symbols of the TTI different from the legacy TTI. In another example, the information on the TTI may include information on the flexible TTI size, that is, information on a flexible TTI.

In some embodiments, the configuration information 716 may include information indicating the pre-listen interval of the terminal 120. The configuration information 716 may include indication information indicating a subframe including the pre-listen interval (hereinafter, referred to as a listen-subframe). For example, the indication information may indicate a number of the listen-subframe. In another example, the indication information may indicate the listen-subframe as an index according to predetermined configuration. In another example, the indication information may indicate the listen-subframe in a bitmap form.

FIG. 7 illustrates one listen-subframe during the COT 740, but is not limited thereto. A plurality of listen-subframes may exist during the COT 740. Accordingly, although occupancy of the node 130 is detected in the first arriving listen-subframe, a signal of the node 130 may not be detected in a later listen-subframe. According to the operation of the plurality of listen-subframes, an LBT success rate may increase.

The pre-listen interval within the listen-subframe may be indicated in various manners. In some embodiments, the terminal 120 may be pre-configured to perform the LBS at a position of a particular symbol of the listen-subframe. For example, the terminal 120 may be pre-configured to perform the LBS in a $12^{th}$ symbol and a $13^{th}$ symbol of the listen-subframe. In other embodiments, the BS 110 may transmit position information of the symbol corresponding to the pre-listen interval in the listen-subframe to the terminal 120 through the configuration information 716. For example, the terminal 120 may identify if a main component of the mixed subframe is a downlink symbol through the configuration information 716. The terminal 120 may identify a position of the last downlink symbol of the mixed subframe of which the main component is the downlink symbol. The terminal 120 may perform the LBS procedure in the pre-listen interval before transmission of the uplink symbol after the last downlink symbol.

The BS 110 may perform the LBT procedure (for example, LBT procedure of category 4) in the unlicensed band 720. Hereinafter, the LBT performed in the unlicensed band 720 before the BS 110 transmits downlink data is referred to as DL LBT. When the BS 110 performs DL LBT 730 and determines that there is no channel occupancy by another node, the BS 110 may allocate the COT 740.

The BS 110 may transmit an initial signal 745 to a subframe boundary for channel occupancy. The BS 110 may prevent channel occupancy by an arbitrary node before the start of the next subframe by transmitting the initial signal 745. The BS 110 may transmit the initial signal 745 to reserve the unlicensed band 720. The initial signal 745 may be referred to as a reservation signal 745.

The BS 110 may transmit a request signal 750 in a downlink subframe after transmitting the initial signal 745. The BS 110 may trigger transmission of a reporting signal to the terminal 120 by transmitting the request signal 750. In some embodiments, the request signal is transmitted through downlink control information (DCI). For example, the request signal may be an SRS request. The reporting signal includes an aperiodic SRS (A-SRS). In another example, the request signal may be a CSI request.

A subframe in which the request signal 750 is transmitted may be referred to as an LBS control subframe. The LBS control subframe is a downlink subframe, and a short TTI may be applied thereto. For example, the LBS control subframe may consist of 3 OFDM symbols.

According to reception of the LBS control subframe, the terminal 120 may determine a subframe in which the reporting signal is transmitted. For example, the request signal 750 may include an offset value. According to the subframe in which the request signal 750 is received and the offset value, the terminal 120 may determine a subframe in which the reporting signal is transmitted. For example, the offset value may be 4. When the request signal 750 is received in an $n^{th}$ subframe, the terminal 120 may transmit the reporting signal to the BS 110 in an $n+4^{th}$ subframe.

In some embodiments, the BS 110 may notify of a pre-listen interval to the terminal 120 through the LBS control subframe. As described above, the BS 110 may inform, through the LBS control subframe, the BS 110 of the subframe in which the reporting signal is transmitted. The subframe in which the LBS is performed may be the same as the subframe in which the reporting signal indicating the LBS result is transmitted. As the LBS and the reporting signal transmission are performed in the same subframe, a discordance probability due to a difference between a time point at which the terminal 120 acquires the LBS result and a time point at which the BS 110 receives the LBS result may be reduced. The discordance probability refers to a probability of the difference between the result obtained when the terminal 120 performs the LBS and the LBS result, which the BS 110 actually receives, at the point at which the BS 110 receives the LBS result.

The BS 110 may notify of the pre-listen interval to the terminal 120 by transmitting the request signal 750. A symbol position within the corresponding subframe may be before a symbol to which the reporting signal is allocated to be transmitted. For example, when resources allocated for the reporting signal correspond to a 14$^{th}$ symbol, the terminal 120 may perform pre-listen 755 in a 12$^{th}$ symbol and a 13$^{th}$ symbol. When the listen-subframe is indicated through the LBS control subframe, configuration information 716 may not indicate the pre-listen interval.

When downlink traffic exists, the BS 110 may transmit downlink data to the terminal 120 in a downlink subframe within the COT 740. The terminal 120 may receive the downlink data from the BS 110.

Although not illustrated in FIG. 7, the BS 110 may inform the terminal 120 of resources for the reporting signal. For example, the BS 110 may transmit resources for the reporting signal to the terminal 120 through transmission of the configuration information 716. In another example, the BS 110 may transmit a position of the resources for the reporting signal to the terminal 120 through separate signaling of the licensed band. In another example, the position of the resources for the reporting signal may be pre-defined. For example, the terminal 120 may transmit the reporting signal (for example, SRS) in the last symbol of the subframe determined based on the reporting signal. In another example, the BS 110 may transmit the position of the resources for the reporting signal to the terminal 120 through the request signal 750. In some embodiments, the request signal includes a transmission time point (transmission timing) of the reporting signal and a channel index of the reporting signal.

When a start time point of the pre-listen interval arrives, each of the BS 110 and the terminal 120 may perform downlink-to-uplink (D2U) switching. Each of the BS 110 and the terminal 120 may change a transmission direction. The terminal 120 may perform the LBT procedure (for example, LBT procedure of category 2) in the unlicensed band 720. The LBT procedure is an LBT procedure of the terminal 120 performed before uplink scheduling, and is referred to as pre-listen 755 or UL LBT.

The terminal 120 may detect a signal intensity of the unlicensed band 720. The terminal 120 may identify whether the channel is busy or idle through the detection of the signal intensity (energy detection). When the signal of another node is not detected during the pre-listen interval, the terminal 120 may transmit the reporting signal 760 to the BS 110 in the unlicensed band. When the signal of another node is detected during the pre-listen interval, the terminal 120 may not transmit the reporting signal to the unlicensed band. When the reporting signal is not received, the BS 110 does not allocate uplink resources. In some embodiments, instead of not transmitting the reporting signal to the unlicensed band, the terminal 120 may inform the BS 110 whether another node occupies the channel.

Unlike FIG. 7, when the signal of another node is detected during the pre-listen interval, the terminal 120 may determine that the other node occupies the unlicensed band. Since the other node occupies the unlicensed band, the terminal 120 may perform uplink transmission through the unlicensed band. The terminal 120 cannot transmit the reporting signal through the unlicensed band. At this time, the terminal 120 may explicitly feedback the occupancy of the unlicensed band by the other node to the BS 110 through the licensed band according to an embodiment.

The BS 110 may receive the reporting signal 760 from the terminal 120. The BS 110 may identify terminals, which transmitted the reporting signal 760, among a plurality of terminals corresponding to the whole scheduling candidates. The terminal, which transmitted the reporting signal 760, may be referred to as a clear terminal (clear UE). Clear terminals include the terminal 120. The BS 110 may perform uplink scheduling for the clear terminals.

The BS 110 may transmit resource allocation information through a downlink subframe. The resource allocation information may be information indicating uplink resources for uplink data transmission of the terminal 120. The uplink grant 765 may include resource allocation information. For example, the resource allocation information includes at least one of information indicating time information (e.g., a subframe, slot, symbol) for the uplink data, frequency for the uplink data (e.g., uplink resource blocks, an uplink bandwidth, a channel index).

The uplink grant 765 may include uplink transmission information (for example, an MCS index) for generating a transport block as well as the resource allocation information. The BS 110 may transmit the uplink grant 765 to the terminal 120 through a downlink subframe of the licensed band 710 or the unlicensed band 720. An uplink subframe corresponding to the uplink grant 765 may be spaced apart from the downlink subframe by K TTIs. In some embodiments, K may be a pre-defined value shared between the BS 110 and the terminal 120. In some embodiments, K may be a value transmitted along with the uplink grant 765. In some embodiments, K may be a value dependent on a time at which the terminal 120 processes the uplink grant 765.

The downlink subframe including the uplink grant 765 may be a short TTI. The BS 110 may transmit downlink data before the subframe corresponding to the uplink grant 765 is transmitted.

When the uplink subframe starts after the downlink subframe, the BS 110 and the terminal 120 may perform D2U switching 770. When uplink transmission timing corresponding to the uplink grant 765 arrives, the terminal 120 receiving resources may identify whether the channel is occupied through the UL LBT 775.

When the channel is idle, that is, when the channel is not occupied by another node, the terminal 120 may transmit uplink data through the allocated uplink resources. On the other hand, when the channel has been already occupied by another node, the terminal 120 may not use the allocated resources and not perform any operation.

The same procedure may be repeated for the next uplink subframe. When all subframes for uplink transmission within the COT 740 are used, the BS 110 may release the connection with the terminal 120. The BS 110 may perform DL LBT in order to allocate the next COT.

Figure 8:
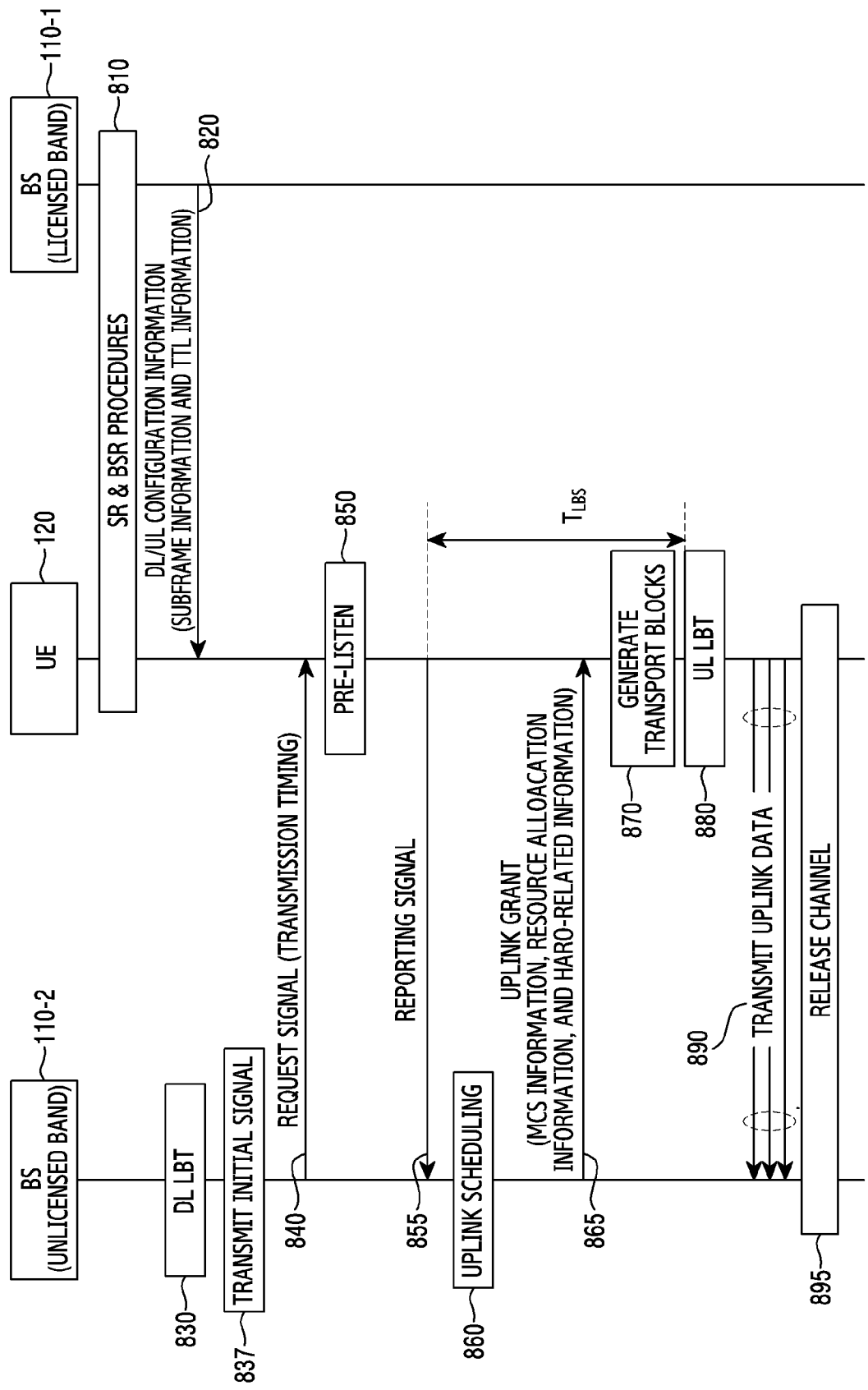
FIG. 8 illustrates an LBS procedure in a wireless communication system according to various embodiments of the present disclosure.

FIG. 8 illustrates an LBS procedure in a wireless communication system according to various embodiments of the present disclosure. FIG. 8 illustrates the operation of the BS 110 and the terminal 120 in the uplink, but it does not mean exclusion of the downlink operation. The BS 110 may transmit downlink data to the terminal 120. Further, FIG. 8 illustrates that the operation of the BS 110 in the licensed band is performed by a BS 110-1 and the operation of the BS 110 in the unlicensed band is performed by a BS 110-2, but they are only logical division of the operations. Accordingly, operations of the BS 110-1 and operations of the BS 110-2 are operations controlled by one BS 110 or operations by separated entities.

In step 810, the BS 110-1 may perform SR and BSR procedures with the terminal 120. The terminal 120 may periodically transmit the SR and the BSR to the BS 110-1 through the licensed band.

In step 820, the BS 110-1 may transmit configuration information to the terminal 120. The configuration information may include information on a type of each subframe within OCT, detailed information on a mixed subframe, and information on a TTI. In some embodiments, the configuration information may indicate a pre-listen interval.

In step 830, the BS 110-2 may perform DL LBT. The BS 110-2 may determine whether traffic for channel occupancy by another node is larger than or equal to a threshold value by performing the DL LBT. When traffic for channel occupancy by another node is smaller than a threshold value, the BS 110-2 may determine to enter the channel. The BS 110-2 may transmit an initial signal before the subframe boundary in order to prevent channel occupancy by the other node.

In step 840, the BS 110-2 may transmit a request signal to the terminal 120. The BS 110-2 may transmit the request signal to the terminal 120 through a downlink subframe. The BS 110 may make a request for the LBS result to the terminal 120 through the request signal. In some embodiments, the request signal may indicate a pre-listen interval.

In step 850, the terminal 120 may perform pre-listen. The terminal 120 may determine a listen-subframe based on information received from the BS 110-1 or the BS 110-2. The terminal 120 may determine the pre-listen interval in the listen-subframe. For example, the terminal 120 may identify the pre-listen interval within the listen-subframe according to a rule preset in the listen-subframe. In another example, the terminal 120 may identify at least one symbol corresponding to the pre-listen interval within the listen-subframe according to information received from the BS 110-1 or the BS 110-2 in the listen-subframe.

The terminal 120 may identify whether the unlicensed band is occupied by a at least one node in the listen-subframe. The terminal 120 may determine whether an intensity of a signal by at least one node is higher than or equal to a threshold value in the pre-listen interval. When the signal intensity is lower than the threshold value, the terminal 120 may make a request for allocating uplink resources.

In step 855, the terminal 120 may transmit the reporting signal to the BS 110-2. The terminal 120 may make a request for uplink resources through the reporting signal. FIG. 8 illustrates that the reporting signal is transmitted to the BS 110-2 of the unlicensed band, but is not limited thereto. Unlike FIG. 8, the terminal 120 may transmit the reporting signal to the BS 110-1 through the licensed band.

In step 860, the BS 110-2 may perform uplink scheduling. The BS 110-2 may allocate resources for uplink transmission to each of terminals (for example, terminals which transmitted the reporting signal) informing that channel occupancy is possible. The BS 110-2 may allocate uplink resources in the unlicensed band to the terminal 120. The BS 110-2 may generate control information indicating uplink resources. The control information may include uplink grant.

In step 865, the BS 110-2 may transmit the uplink grant to the terminal 120. The uplink grant may include MCS information to be applied to uplink data to be transmitted by the terminal 120 and information indicating a position at which uplink data is transmitted within the resource block. When Hybrid Automatic Repeat and reQuest (HARQ) for uplink transmission in the unlicensed band is supported, the uplink grant may include HARQ-related information in addition to the MCS information and the information on the position within the resource block. The HARQ-related information may include at least one of a new data indicator (NDI) indicating whether transmission is retransmission, a redundancy version (RV) indicating a redundancy level, and an HARQ process number.

In step 870, the terminal 120 may generate a transport block. The terminal 120 may generate at least one transport block based on the MCS information and the HARQ-related information received in step 865. The terminal 120 may determine a transport block size (TBS) through the MCS information and the HARQ-related information. The terminal 120 may map the generated transport block to a physical resource block according to position information within the resource block. The transport block corresponds to uplink data.

In step 880, the terminal 120 may perform UL LBT. Before transmitting uplink data, the terminal 120 may perform UL LBT in order to determine whether the channel is occupied by a node adjacent to the terminal 120.

In step 890, the terminal 120 may transmit the uplink data. When it is determined that there is no channel occupancy based on the result of the UL LBT in step 880, the terminal 120 may transmit the uplink data to the BS 110. The terminal 120 may transmit the uplink data to the BS 110-2 through uplink resources allocated by the uplink grant.

In step 895, the BS 110 and the terminal 120 may release the channel connection.

In one embodiment, two steps may be defined in a certain communication system. The two steps may include a preparation stage and a data transmission stage for a transmission opportunity (TxOP). In this case, the pre-listen interval according to the present disclosure may be included in the preparation stage. In other words, the detection for determining whether the channel occupies the channel for the uplink transmission may be performed in the preparation stage.

The overall procedure of the LBS has been described with reference to FIGS. 5 to 8. Meanwhile, there is a difference ($T_{LBS}$) between a time point at which the LBT, that is, the LBS is performed in the pre-listen interval and a time point at which the UL LBT is performed before the uplink subframe of the terminal 120. As the $T_{LBS}$ is larger, a probability of occupancy of the unlicensed band by at least one node may become higher. As the $T_{LBS}$ is larger, the probability of the channel occupancy by another node becomes higher since the time point at which the LBS is performed, so that the result of the UL LBT performed before the uplink subframe may be changed. Accordingly, a probability (Pmismatch) that the uplink resources allocated after the LBS result cannot be used may increase as the $T_{LBS}$ is higher.

In order to reduce Pmismatch, a method of reducing the $T_{LBS}$ may be used. The difference ($T_{LBS}$) between the time point at which the LBS of the terminal 120 is performed (or a time point at which the reporting signal is transmitted) and the time point at which the UL LBT is performed before the uplink subframe may be dependent on a time (hereinafter, referred to as a processing delay) during which the terminal 120 processes control information including uplink grant. The processing delay may include a subframe buffering time (for example, 1 ms), a decoding time of a received packet (for example, 1.5 ms), and an encoding time of a transmitted packet (for example, 1.5 ms). FIGS. 9 to 12 illustrate a method (hereinafter, referred to as a two-stage grant method) of operating a first uplink grant for generating a transport block and a second uplink grant for mapping to physical resources in order to reduce the processing delay instead of operating only one uplink grant.

Hereinafter, the operations and the terms for the LBS procedure described in FIGS. 5 to 8 may be equally used for operations performed in the two-stage grant method and terms referring to transmitted control information unless otherwise specified.

Figure 9:
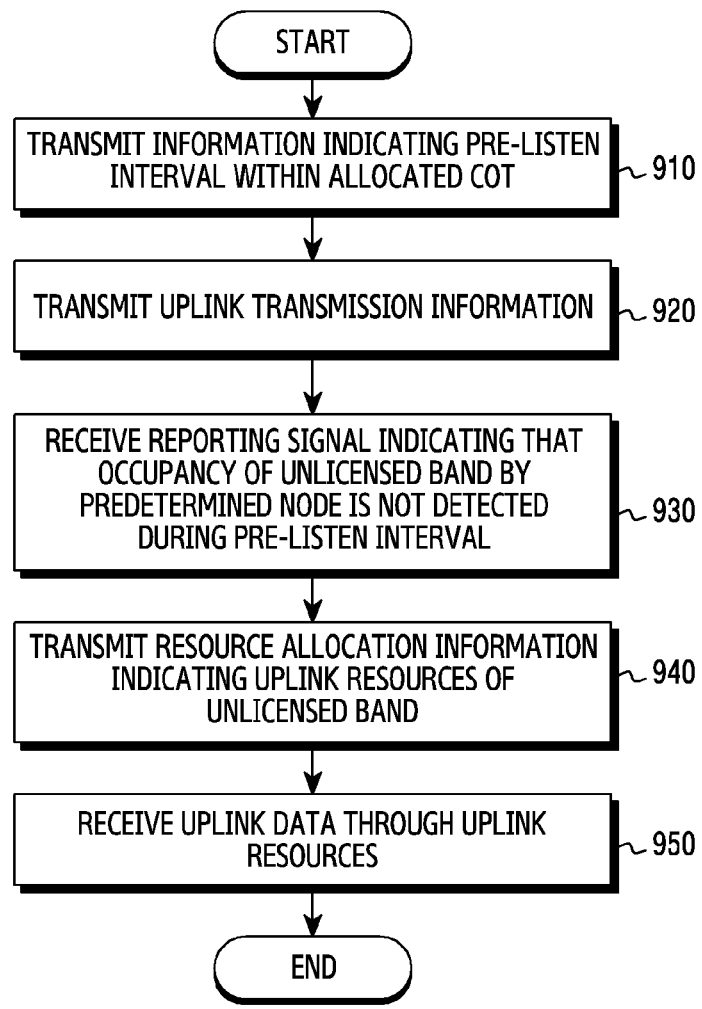
FIG. 9 is a flowchart illustrating the operation of the BS performing LBS through a two-stage grant in a wireless communication system according to various embodiments of the present disclosure.

FIG. 9 is a flowchart illustrating the operation of the BS 110 for performing LBS through a two-stage grant in a wireless communication system according to various embodiments of the present disclosure. Hereinafter, it is described that the BS 110 operates both in the licensed band and the unlicensed band, but it may be interpreted that some of the operations of the BS 110 described below are performed by another BS under a control of the BS 110. In the present disclosure, the two-stage grant method is a method of transmitting a first uplink grant including uplink transmission information and a second uplink grant including resource allocation information to the terminal at different times instead of transmitting one uplink grant including uplink transmission information used for determining the uplink transport block size and resource allocation information indicating allocated uplink resources to the terminal.

Referring to FIG. 9, in step 910, the BS 110 may transmit information indicating a pre-listen interval within the allocated COT. The BS 110 may broadcast configuration information to the terminal 120. The BS 110 may determine occupancy of the unlicensed band after performing DL LBT. The BS 110 may allocate a COT to the terminal 120. The BS 110 may transmit a request signal to the terminal 120. In some embodiments, the BS 110 may transmit information indicating a pre-listen interval to the terminal 120 through at least one of the configuration information and the request signal. The operation of the BS 110 in step 910 corresponds to the operation of the BS 110 in step 510 of FIG. 5.

In step 920, the BS 110 may transmit uplink transmission information to the terminal 120. The uplink transmission information refers to information used for generating an uplink transport block. Hereinafter, the uplink transmission information may be referred to as a first uplink grant or a first grant in the present disclosure. Before allocating uplink resources to the terminal 120, the BS 110 may transmit the first grant such that the terminal 120 generates a transport block in advance.

The first grant may include MCS information. The MCS information may be an MCS value to be applied to an uplink subframe. The MCS value may indicate a modulation order and a coding rate to be applied to uplink data. For example, the MCS value may be indicated by an MCS index (IMcs). According to the MCS value, the terminal 120 may determine the modulation order and the coding rate to be applied to the uplink data. Further, the first grant may include HARQ-related information (for example, an RV and an HARQ process number).

In some embodiments, the first grant may include a resource allocation field. The resource allocation field may indicate the number of physical resource blocks ($N_{PRB}$) to be allocated to the terminal 120. In some embodiments, the first grant may not include the resource allocation field unlike the above-described embodiment. The second grant described below may include the resource allocation field.

In some embodiments, the first grant may further include an identifier separately defined for informing of a state of the terminal 120. For example, the terminal 120 may necessarily need to transmit uplink traffic. The BS 110 may transmit a separately defined identifier in order to instruct the terminal 120 to perform a particular operation. An embodiment related to the use of the identifier will be described in detail with reference to FIGS. 18 to 21.

In step 930, the BS 110 may receive, from the terminal 120, a reporting signal indicating that occupancy of the unlicensed band by any node is not detected during the pre-listen interval. By receiving the reporting signal, the BS 110 may determine that there is no channel occupancy by the node adjacent to the terminal 120. The BS 110 may perform uplink scheduling for uplink transmission of the terminal 120.

In step 940, the BS 110 may transmit resource allocation information indicating uplink resources in the unlicensed band to the terminal 120. The uplink resources may be resources for uplink transmission of the terminal 120. The resource allocation information may include position information indicating positions of resource blocks to be used within an allocated system bandwidth. In some embodiments, the BS 110 may inform the terminal 120 of start positions of the allocated resource blocks as the position information. In another example, the BS 110 may inform the terminal 120 of the start positions of the allocated resource blocks and the size of the resource blocks to be used, as the position information. Hereinafter, the resource allocation information may be referred to as a second uplink grant or a second grant in the present disclosure. The BS 110 may transmit the second grant to the terminal 120 for resource mapping of the uplink transport block.

In step 950, the BS 110 may receive uplink data through uplink resources. The BS 110 may receive uplink data in the unlicensed band.

When the uplink transmission information (the first grant) is transmitted before the resource allocation information (the second grant) is transmitted in step 920, a difference ($T_{LBS}$) between a time point at which the reporting signal is received and a time point at which uplink data is received may be further reduced than the case where the resource allocation information and the uplink transmission information are transmitted together (uplink grant). It is because the generation of the transport block corresponding to the uplink data starts before the resource allocation information is received. The terminal 120 may generate the transport block based on the uplink transmission information.

Figure 10:
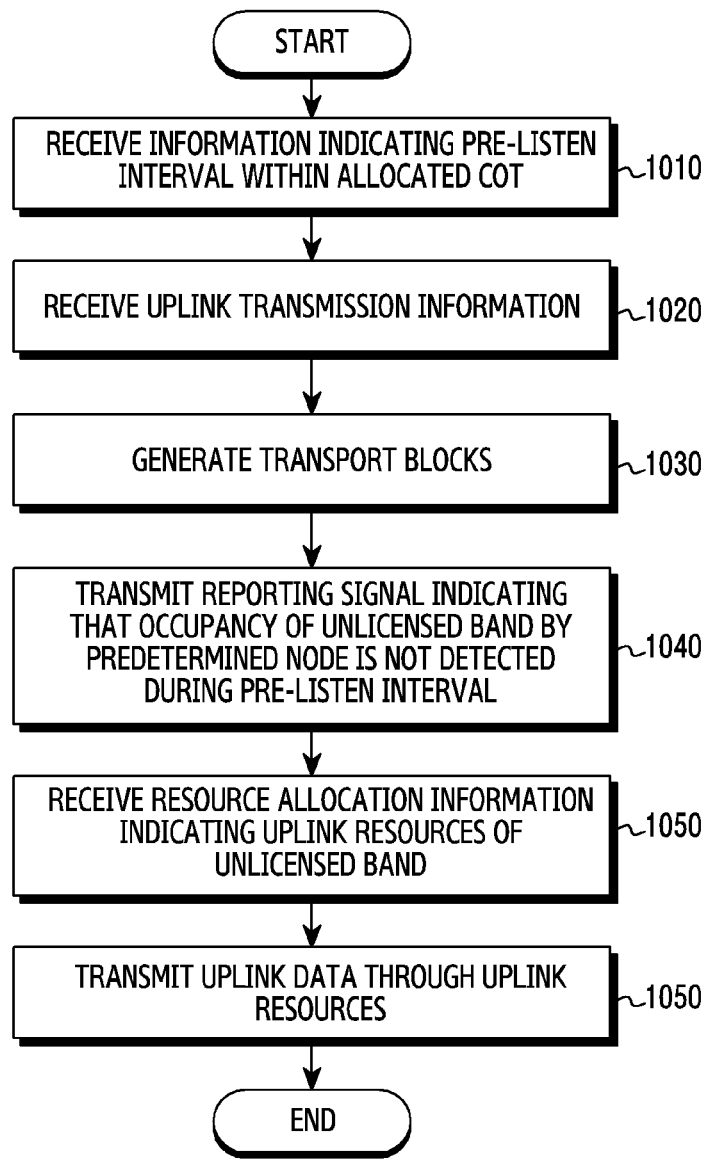
FIG. 10 is a flowchart illustrating the operation of the terminal performing LBS through a two-stage grant in a wireless communication system according to various embodiments of the present disclosure.

FIG. 10 is a flowchart illustrating the operation of the terminal 120 for performing LBS through the two-stage grant in a wireless communication system according to various embodiments of the present disclosure.

In step 1010, the terminal 120 may receive information indicating a pre-listen interval within a COT allocated from the BS 110. According to embodiments, the information indicating the pre-listen interval may be included in configuration information or a request signal. The information indicating the pre-listen interval corresponds to the information indicating the pre-listen interval in step 910 of FIG. 9. When there is downlink transmission, the terminal 120 may receive downlink data before the pre-listen interval.

In step 1020, the terminal 120 may receive uplink transmission information from the BS 110. The uplink transmission information may be referred to as a first grant. The uplink transmission information corresponds to the first grant in step 920 of FIG. 9.

In step 1030, the terminal 120 may generate a transport block. The BS 110 may transmit the first grant including an MCS index to the first terminal 120. The terminal 120 may identify an ITBS in a table by receiving the MCS index from the BS 110. The ITBS may be an index indicating the transport block size in a particular table. The terminal 120 may determine the transport block size based on the ITBS.

In some embodiments, the first grant may include a resource allocation field. The terminal 120 may determine the number of physical resource blocks ($N_{PRB}$) allocated to the terminal 120, which is indicated by the resource allocation field. The terminal 120 may determine the size of the transport block corresponding to the determined ITBS and the determined $N_{PRB}$ in a pre-stored table. The terminal 120 may generate the transport block based on the determined size and HARQ-related information. Meanwhile, in some embodiments, the first grant may not include the resource allocation field unlike the above embodiment. The terminal 120 may determine candidates corresponding to the number of resource blocks which can be allocated to the terminal 120. The terminal 120 may determine sizes of the transport blocks for all of the determined candidates. The terminal 120 may generate the transport block for each of the all sizes.

In step 1040, the terminal 120 may transmit a reporting signal indicating that occupancy of the unlicensed band by any node is not detected during the pre-listen interval to the BS 110. The reporting signal (for example, SRS) corresponds to the reporting signal in step 930 of FIG. 9.

In step 1050, the terminal 120 may receive resource allocation information indicating uplink resources in the unlicensed band. The resource allocation information may be referred to as a second grant. The resource allocation information may correspond to the second grant in step 940 of FIG. 9. The terminal 120 may identify positions of resource blocks to be used within the system bandwidth based on the resource allocation information. In some embodiments, the second grant may include only a start position of the resource block. The terminal 120 may map the transport block generated in step 1030 to a physical resource block in consideration of the start position. Meanwhile, in some embodiments, the second grant may include position information (for example, a resource indication value (RIV)) indicating the start position of the resource block and the number of resource blocks. The terminal 120 may identify the position of the resource block that starts among the resource blocks allocated to the terminal 120 and the length of the resource blocks to be used. The terminal 120 may identify a particular transport block set among pre-generated candidate transport block sets based on the number of resource blocks. The terminal 120 may map the identified particular transport block set to the physical resource block.

In step 1060, the terminal 120 may transmit uplink data through uplink resources. The uplink data corresponds to the transport block mapped to the resource block. The terminal 120 may transmit uplink data in the unlicensed band.

Figure 11:
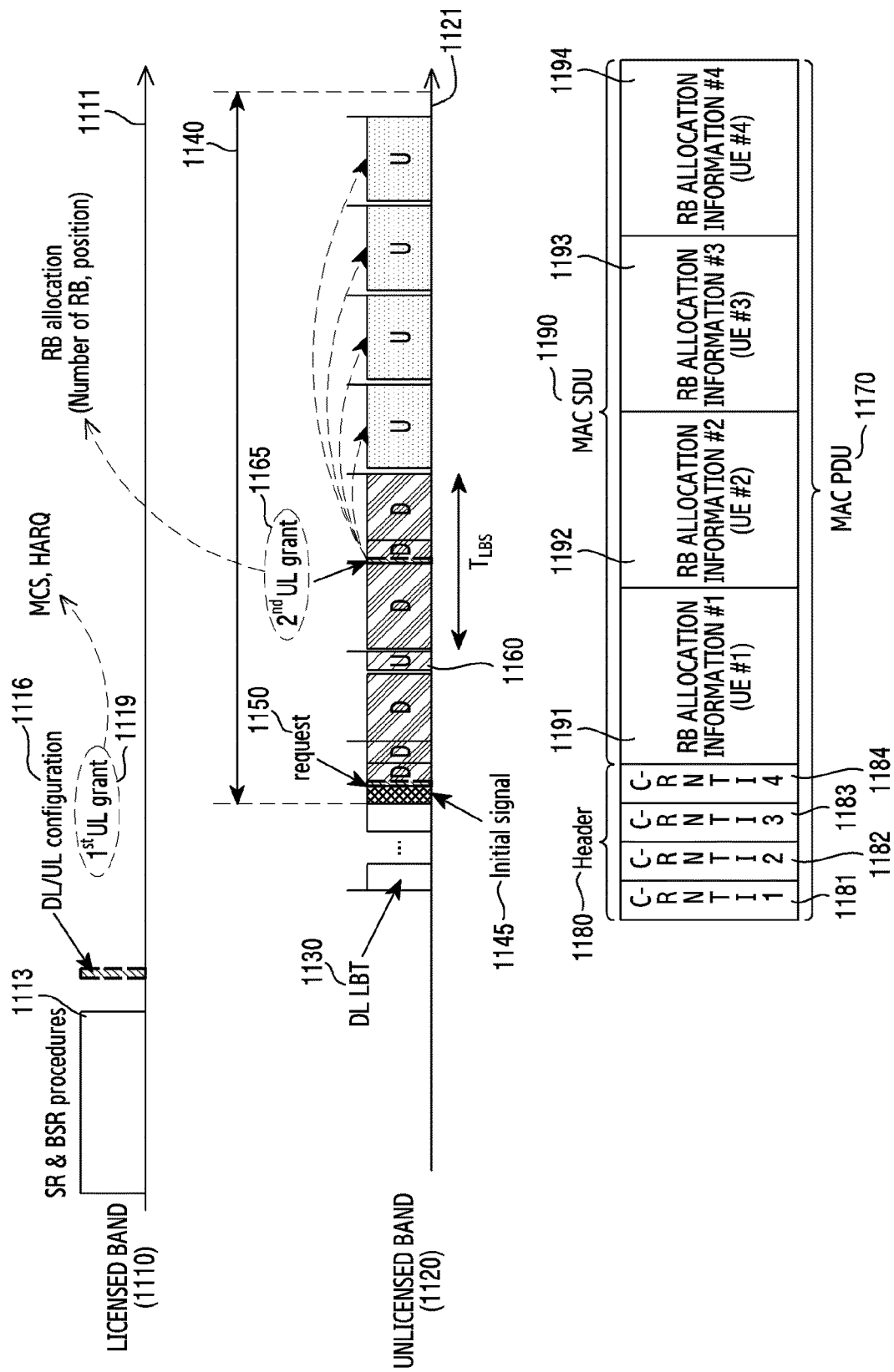
FIG. 11 illustrates an example of a subframe for LBS through a two-stage grant in a wireless communication system according to various embodiments of the present disclosure.

FIG. 11 illustrates an example of a subframe for LBS through the two-stage grant in a wireless communication system according to various embodiments of the present disclosure. The contents of FIG. 7 may be equally applied to the configuration of FIG. 11 that overlaps FIG. 11. The description of the overlapping configuration will be omitted.

Referring to FIG. 11, the operation of the BS 110 and the operation of the terminal 120 may be performed both in a licensed band 1110 and an unlicensed band 1120. Meanwhile, the BS 110 is described as a BS operating both in the licensed band 1110 and the unlicensed band 1120, but is not limited thereto. The BS 110 may operate in the licensed band, and another BS connected to the BS 110 through a backhaul may operate in the unlicensed band.

A time axis 1111 indicates progress of signaling performed by the BS 110 and the terminal 120 in the licensed band 1110. A time axis 1121 indicates progress of signaling performed by the BS 110 and the terminal 120 in the unlicensed band 1120. SR and BSR procedures 1113 for uplink resource allocation of the terminal 120 are performed in the licensed band 1110 at predetermined time intervals.

The BS 110 may generate configuration information 1116 indicating DL-UL configuration for channel occupancy according to a predetermined reference such as downlink traffic and uplink traffic. The BS 110 may broadcast a message including the configuration information 1116. The message may be a cell-specific signal.

The BS 110 may transmit a first grant 1119 to the terminal 120. Before DL LBT 1130 is performed, the BS 110 may transmit the first grant 1119 through the licensed band 1110. The first grant 1119 may include information used for generating an uplink transport block. The first grant 1119 may include an amount of resources (for example, the number of resource blocks), MCS information, and HARQ-related information as downlink control information.

In some embodiments, the MCS information may include an MCS value to be applied to all uplink subframes. In some embodiments, the MCS information may include an MCS value to be applied to each of the uplink subframes. The HARQ-related information may be information on each of the uplink subframes. For example, the HARQ-related information may include an NDI, an HARQ process ID, and an RV index of each of the uplink subframes.

In some embodiments, the MCS information includes an MCS value indicating a modulation order to be applied to uplink data. The HARQ-related information includes an RV value indicating a redundancy version (RV) of uplink data. According to an embodiment, the MCS index may indicate both the MCS value and the RV value. According to another embodiment, the MCS index may indicate the MCS value, and the RV value may be indicated by another indicator. For example, the BS 110 may transmit the MCS index to the terminal 120 as the first grant. The MCS index may have a 5-bit value. In another example, the BS 110 may transmit a field indicating the MCS index and the RV to the terminal 120 as the first grant. In another example, the BS 110 may transmit the field indicating the MCS index and the RV and a resource allocation field to the terminal 120 as the first grant. The BS 110 may provide information used for generating the transport block to the terminal 120 by transmitting the first grant. The BS 110 may transmit, to the terminal 120, the first grant 1119 along with the configuration information 1116 or through separate signaling.

The purpose of first transmitting the first grant 1119 is to reduce a processing delay of control information by generating the transport block in advance in the LBS procedure. Accordingly, the first grant 1119 may not include resource allocation information indicating uplink resources. Meanwhile, in order to reduce overhead, the first grant 1119 may include the size of allocated resources (for example, the number of resource blocks) in some embodiments.

Although FIG. 11 illustrates that the first grant 1119 is transmitted through the licensed band 1110, the BS 110 may transmit the first grant 1119 to the terminal 120 through the unlicensed band 1120 in some embodiments. After performing DL LBT 1130 described below, the BS 110 may transmit the first grant 1119 through a downlink subframe in the unlicensed band 1120.

The BS 110 may determine that there is no channel occupancy by another node by performing the DL LBT 1130. The BS 110 may allocate a COT 1140. The BS 110 may transmit an initial signal 1145 to a subframe boundary for channel occupancy.

Although not illustrated in FIG. 11, the terminal 120 receiving the first grant 1119 may generate transport blocks. The terminal 120 may generate the transport blocks in advance before receiving a second grant 1165. The terminal 120 may store the transport blocks generated in advance in a buffer. In some embodiments, the terminal 120 may store the generated transport blocks in the buffer of the terminal 120 according to a resource allocation set. The resource allocation set refers to candidate values of the transport block size, which can be generated by the terminal 120. At this time, the first grant may not include the resource allocation field. A detailed description thereof will be made with reference to FIG. 13.

The terminal 120 may perform LBS during the pre-listen interval. When a signal of another node is smaller than a threshold value in the unlicensed band 1120, the terminal 120 may transmit a reporting signal 1160 (for example, SRS) to the BS 110. The BS 110 may perform uplink scheduling through the reporting signal received from each of the terminals (for example, terminal 120). The BS 110 may perform uplink scheduling only for terminals having no occupancy of the unlicensed band 1120 by an adjacent node. The BS 110 may transmit resource allocation information indicating corresponding resources to each of the terminals to which uplink resources are allocated. For example, the BS 110 may transmit a second grant 1165 to the terminal 120. The second grant 1165 may include information on time and frequency positions of resources allocated to the terminal 120.

The BS 110 may notify of uplink resources to the terminal 120 through the second grant 1165. In some embodiments, the BS 110 may inform the terminal 120 of the positions on time and frequency axes through the second grant 1165 of the unlicensed band 1120. For example, the time position may indicate the place of an uplink subframe within the COT 1140. For example, the frequency position may indicate the frequency resource set used in the uplink subframe. For example, the frequency resource set may be at least one resource block on the frequency band indicated by an interlace index.

In some embodiments, the BS 110 may inform the terminal 120 of the position of uplink resources through a channel number, which is an index indicating one of the channels for uplink transmission. The channel number may indicate a frequency area of a particular band.

When receiving the second grant for actual resource allocation, the terminal 120 may process the second grant. The terminal 120 may identify the position of allocated uplink resources by decoding information included in the second grant. The terminal 120 may map the pre-generated transport blocks to physical resource blocks according to the allocated uplink resources.

After the downlink subframe expires, the BS 110 and the terminal 120 may perform D2L switching. When a transmission time point of the uplink subframe arrives, the terminal 120 may perform UL LBT. The terminal 120 may transmit the transport block through the allocated uplink resources. The terminal 120 may transmit uplink data corresponding to the mapped transport block to the BS 110. Although not illustrated in FIG. 12, not only the terminal 120 but also all terminals (for example, the terminal transmitting the reporting signal) which can occupy the unlicensed band may transmit the pre-generated transport block according to allocated resources.

Meanwhile, the second grant 1165 is described as a UE-specific signal transmitted to the terminal 120 through downlink control information, but is not limited thereto. The second grant 1165 may be a cell-specific signal. The BS 110 may transmit resource allocation information corresponding to the second grant 1165 to a plurality of terminals on an MAC layer. The resource allocation information may be a cell-specific signal. For example, the plurality of terminals may be 4 terminals. Hereafter, resource allocation information will be described based on 4 terminals. The resource allocation information may include a medium access control (MAC) packet data unit (PDU) 1170. The MAC PDU 1170 may include an MAC header 1180 and an MAC service data unit (SDU) 1190. The MAC header 1180 may include a first identifier 1181 (for example, a cell-radio network temporary identifier (C-RNTI)), a second identifier 1182, a third identifier 1183, and a fourth identifier 1184. The first identifier 1181 may indicate the identity of a first terminal. The second identifier 1182 may indicate the identity of a second terminal (for example, the terminal 120). The third identifier 1183 may indicate the identity of a third terminal. The fourth identifier 1184 may indicate the identity of a fourth terminal. For example, the BS 110 may allocate the second identifier 1182 through to the terminal 120 through the MAC PDU 1170. In some embodiments, each identifier may be implicitly transmitted rather than explicitly transmitted. For example, the BS 110 may transmit the MAC PDU 1170 for the second identifier 1182 according to calculation of a cyclic redundancy check (CRC) to the terminal 120.

The MAC SDU 1190 may include first allocation information 1191, second allocation information 1192, third allocation information 1193, and fourth allocation information 1194 as the scheduling result. The first allocation information 1191 may indicate first uplink resources allocated to the first terminal. The second allocation information 1192 may indicate second uplink resources allocated to the second terminal (for example, the terminal 120). The third allocation information 1193 may indicate third uplink resources allocated to the third terminal. The fourth allocation information 1194 may indicate fourth uplink resources allocated to the fourth terminal. In other words, the allocation information may be an uplink grant. For example, the terminal 120 may perform the CRC on the second allocation information 1192 by using the second identifier 1182. According to the CRC, the terminal 120 may identify the second allocation information 1192 allocated to the terminal 120. The terminal 120 may identify a position of the allocated uplink resources based on the second allocation information 1192. The terminal 120 may transmit uplink data through the identified position.

As described above, the terminal 120 may generate in advance the transport block for uplink burst, thereby reducing the processing delay. For example, the terminal 120 may process the second grant in half the time (for example, K/2) according to the two-stage grant method in comparison with the conventional uplink grant processing time. It is because the first grant is processed before uplink resources are allocated. As the resource allocation information processing time is reduced, the terminal 120 may generate the transport block in the uplink subframe within a shorter time.

According to the reduction in the processing time, a probability of the difference between the result of the LBT performed during the pre-listen interval and the result of UL LBT performed before the uplink subframe is transmitted, that is, a probability (Pmismatch) that uplink resources allocated after the LBS result cannot be used may become lower. Further, according to the reduction in the processing time, a limit between the subframe in which LBS of the terminal 120 is performed and the uplink subframe in which uplink burst is performed may be reduced. Accordingly, a degree of freedom (DOF) of the DL-UL configuration for channel occupancy may increase.

Figure 12:
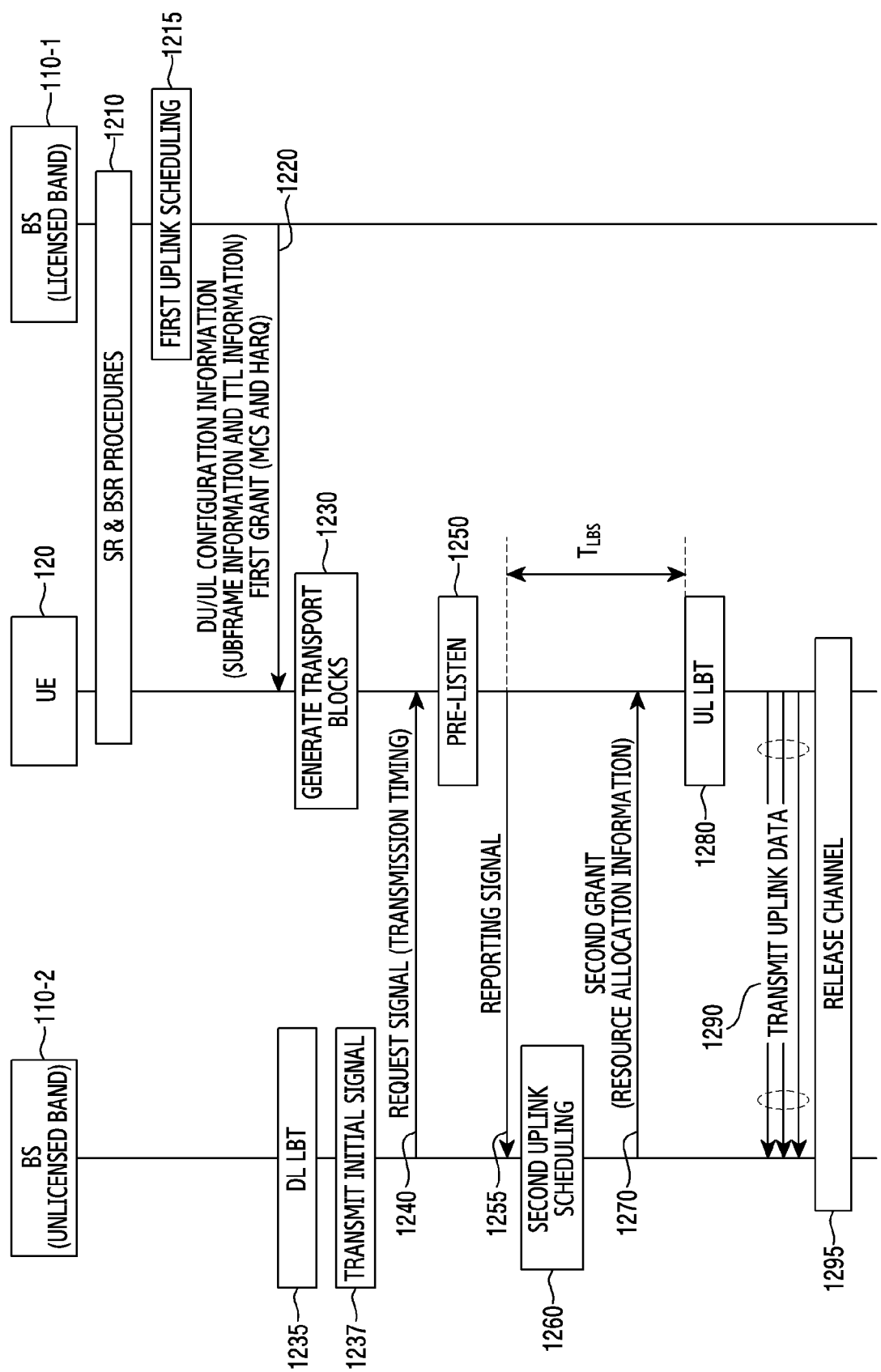
FIG. 12 illustrates an LBS procedure through a two-stage grant in a wireless communication system according to various embodiments of the present disclosure.

FIG. 12 illustrates an LBS procedure through the two-stage grant in a wireless communication system according to various embodiments of the present disclosure.

In step 1210, the BS 110-1 may perform a SR and BSR procedure with the terminal 120. The terminal 120 may periodically transmit the SR and the BSR to the BS 110-1 through the licensed band.

In step 1215, the BS 110-1 may perform first uplink scheduling for the terminal 120. As a first uplink scheduling procedure, the BS 110 may determine parameters used for generating transport blocks by the terminal 120. The BS 110 may determine MCS information and HARQ-related information to be applied to the uplink subframe to be used by the terminal 120.

In step 1220, the BS 110-1 may transmit configuration information to the terminal 120. The BS 110-1 may broadcast configuration information. The configuration information may be transmitted through a cell-specific signal. The configuration information may include information on each of the subframes within the COT. In some embodiments, the configuration information may indicate a pre-listen interval. The BS 110-1 may transmit a first grant to the terminal 120. The BS 110 may transmit the first grant including the MCS information and the HARQ-related information determined in step 1215 to the terminal 120. The first grant may be information specified to the terminal 120. The first grant may be a UE-specific signal. The first grant may be transmitted to the terminal 120 along with the configuration information or after the configuration information is broadcasted through separate signaling. In some embodiments, the first grant may further indicate an amount of resources allocated to the terminal 120. For example, the amount of resources may be indicated by the number of resource blocks. For example, when 55 resource blocks are allocated to the terminal 120, the first grant may include a 6-bit resource indicator.

In step 1230, the terminal 120 may generate transport blocks. The terminal 120 may generate at least one transport block based on the MCS information and the HARQ-related information included in the first grant. The terminal 120 may determine the size of the transport block based on the MCS information and the HARQ-related information. When the terminal 120 is not aware of the amount of allocated resources, the terminal 120 may determine candidates corresponding to the number of resource blocks which can be allocated. The terminal 120 may determine the size of the transport block for each of the candidates. The terminal 120 may generate the transport block for each of the determined sizes. When the amount of resources allocated to the terminal 120 is acquired, the terminal 120 may generate transport blocks according to the acquired amount of resources.

In step 1235, the BS 110-2 may perform DL LBT. When traffic for channel occupancy by another node is smaller than a threshold value, the BS 110-2 may determine the channel occupancy in the unlicensed band.

In step 1237, the BS 110-2 may transmit an initial signal before the subframe boundary in order to prevent channel occupancy by the other node. The BS 110-2 may transmit downlink data through the downlink subframe. For subframe synchronization with other terminals, the BS 110-2 may transmit the initial signal before a first subframe within the COT. When there is no residual symbol between subframes after DL LBT is performed, the initial signal may not be transmitted.

In step 1240, the BS 110-2 may transmit a request signal to the terminal 120. In some embodiments, the request signal may indicate a pre-listen interval.

In step 1250, the terminal 120 may perform pre-listen. The terminal 120 may determine a listen-subframe based on information received from the BS 110-1 or the BS 110-2. The terminal 120 may determine the pre-listen interval in the listen-subframe. The terminal 120 may identify whether there is occupancy of the unlicensed band by the node adjacent to the terminal 120 in the pre-listen interval. When an intensity of a signal by at least one node is lower than a threshold value in the pre-listen interval, the terminal 120 may make a request for allocating uplink resources.

In step 1255, the terminal 120 may transmit the reporting signal to the BS 110-2. Although FIG. 12 illustrates that the reporting signal is transmitted from the terminal 120 to the BS 110-2 of the unlicensed band, the terminal 120 may transmit the reporting signal to the BS 110-1 through the licensed band. By transmitting the reporting signal, the terminal 120 may make a request for resource allocation for uplink in the unlicensed band to the BS 110-1 (or the BS 110-2).

In step 1260, the BS 110-2 may perform second uplink scheduling. The BS 110-2 may allocate uplink resources in the unlicensed band to the terminal 120. In step 1270, the BS 110-2 may transmit the second grant to the terminal 120. The second grant may include position information indicating a position at which uplink data is transmitted on time-frequency resources. The terminal 120 may map the generated transport blocks to physical resources according to the position information. The generated transport blocks correspond to uplink data to be transmitted.

In step 1280, the terminal 120 may perform UL LBT. Before transmitting uplink data, the terminal 120 may perform UL LBT in order to determine whether the channel is occupied by a node adjacent to the terminal 120.

In step 1290, the terminal 120 may transmit the uplink data. When it is determined that there is no channel occupancy based on the result of the UL LBT in step 1280, the terminal 120 may transmit the uplink data to the BS 110. The terminal 120 may transmit uplink data to the BS 110-2 through uplink resources allocated by the second grant.

In step 1295, the BS 110 and the terminal 120 may release the channel connection.

Figure 13:
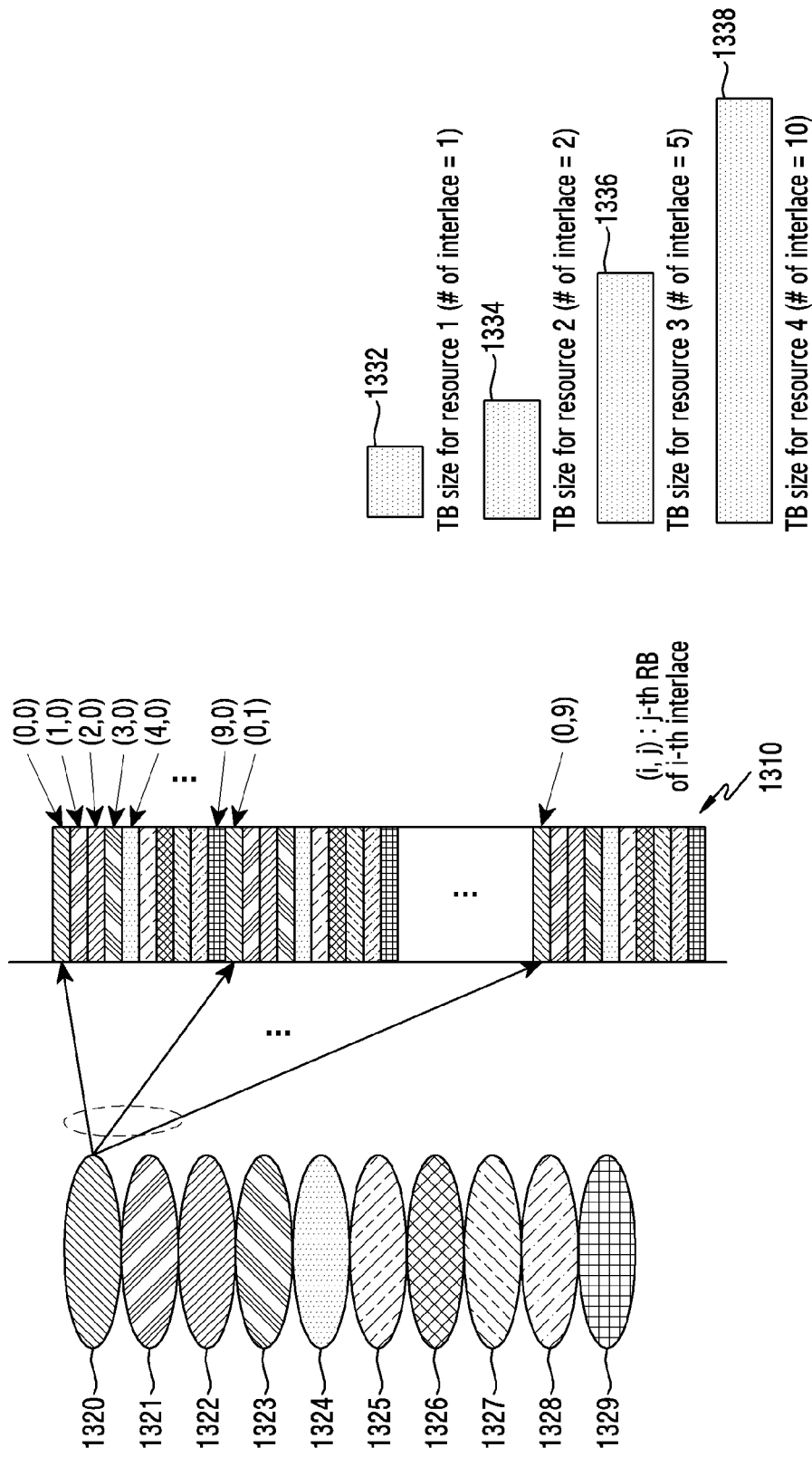
FIG. 13 illustrates an example of a resource allocation set in a wireless communication system according to various embodiments of the present disclosure.

FIG. 13 illustrates an example of a resource allocation set in a wireless communication system according to various embodiments of the present disclosure. The resource allocation set is a set of resource blocks which can be allocated to the terminal 120.

Referring to FIG. 13, a resource stack 1310 may include a plurality of resource blocks (RBs). The plurality of resource blocks may be divided according to the frequency. A vertical axis of the resource stack 1310 indicates the frequency. The resource stack 1310 may include N resource blocks. N resource blocks may be divided into i sets. Each of the sets may include j resource blocks (N=i×j). For example, 100 resource blocks may be divided into 10 sets, and each of the sets may include 10 resource blocks. The set may be referred to as an interlace. Hereinafter, the resource block set is referred to as the interlace. In FIG. 13, (i, j) indicates a $j^{th}$ resource block of an interlace.

When a system bandwidth allocated to the terminal 120 is 20 MHz, the BS 110 may allocate 100 resource blocks to at least one terminal. The BS 110 may divide 100 resource blocks into 10 interlaces 1320 to 1329. 1 interlace may include 10 resource blocks. For example, when 100 resource blocks are allocated to 5 terminals, the BS 110 may allocate 20 resource blocks to each of the 5 terminals. The BS 110 may allocate 2 interlaces to each terminal. The BS 110 may allocate the interlaces 1321 and 1322 to the terminal 120. A value (RBSTART) indicating a start position of the resources allocated to the terminal 120 may be 2.

As illustrated in FIGS. 9 to 12, the terminal 120 may generate in advance the transport blocks for uplink transmission before uplink resources are allocated. In order to generate in advance the transport blocks, the first grant may include MCS information and HARQ-related information.

For the accurate transport block size, the number of resource blocks to be used may be required. In some embodiments, the first grant may indicate ($N_{RB}$) the number of resource blocks to be allocated to the terminal 120. The first grant may include a resource allocation field. The resource allocation field may indicate the number of resource blocks.

In some embodiments, the first grant may not include the number of resource blocks to be allocated to the terminal 120. The terminal 120 may not generate accurate size transport blocks after receiving the first grant. Before receiving the second grant, the terminal 120 may determine candidates corresponding to the number of resource blocks expected to be allocated to the terminal 120. The terminal 120 may generate in advance candidate transport blocks corresponding to the respective candidates. According to an embodiment, the terminal 120 may determine a total of R interlaces corresponding to the allocated system bandwidth. The terminal 120 may generate in advance candidate transport blocks corresponding to each of the divisors of R. For example, when a total of 100 resource blocks consist of 10 interlaces, the terminal 120 may generate candidate transport blocks according to a first size corresponding to 1 interlace. The terminal 120 may generate candidate transport blocks according to a second size 1334 corresponding to 2 interlaces. The terminal 120 may generate candidate transport blocks according to a third size 1336 corresponding to 5 interlaces. The terminal 120 may generate candidate transport blocks according to a fourth size 1338 corresponding to 10 interlaces.

In other words, the terminal 120 may generate transport blocks In some embodiments, the plurality of uplink resource allocation sets for a plurality of uplink resource allocation sets according to the uplink transmission information. In some embodiments, the plurality of uplink resource allocation sets are determined based on a divisor of the maximum number of allocable resources.

The terminal 120 may identify the number of resource blocks to be allocated to the terminal 120 through the second grant. The second grant may include a resource allocation field. The resource allocation field may indicate the number of resource blocks. The terminal 120 may identify a resource block to be transmitted among the candidate resource blocks according to the number of identified resource blocks. For example, the terminal 120 may allocate 20 resource blocks. The terminal 120 may determine 2 interlaces. The terminal 120 may identify the generated candidate resource blocks of the second size 1334 among the generated candidate resource blocks.

As described above, even if the BS 110 does not indicate an amount of resource blocks to be allocated to the terminal 120 through the first grant, the terminal 120 may generate in advance transport blocks corresponding to available interlaces, thereby reducing the processing delay.

Figure 14A:
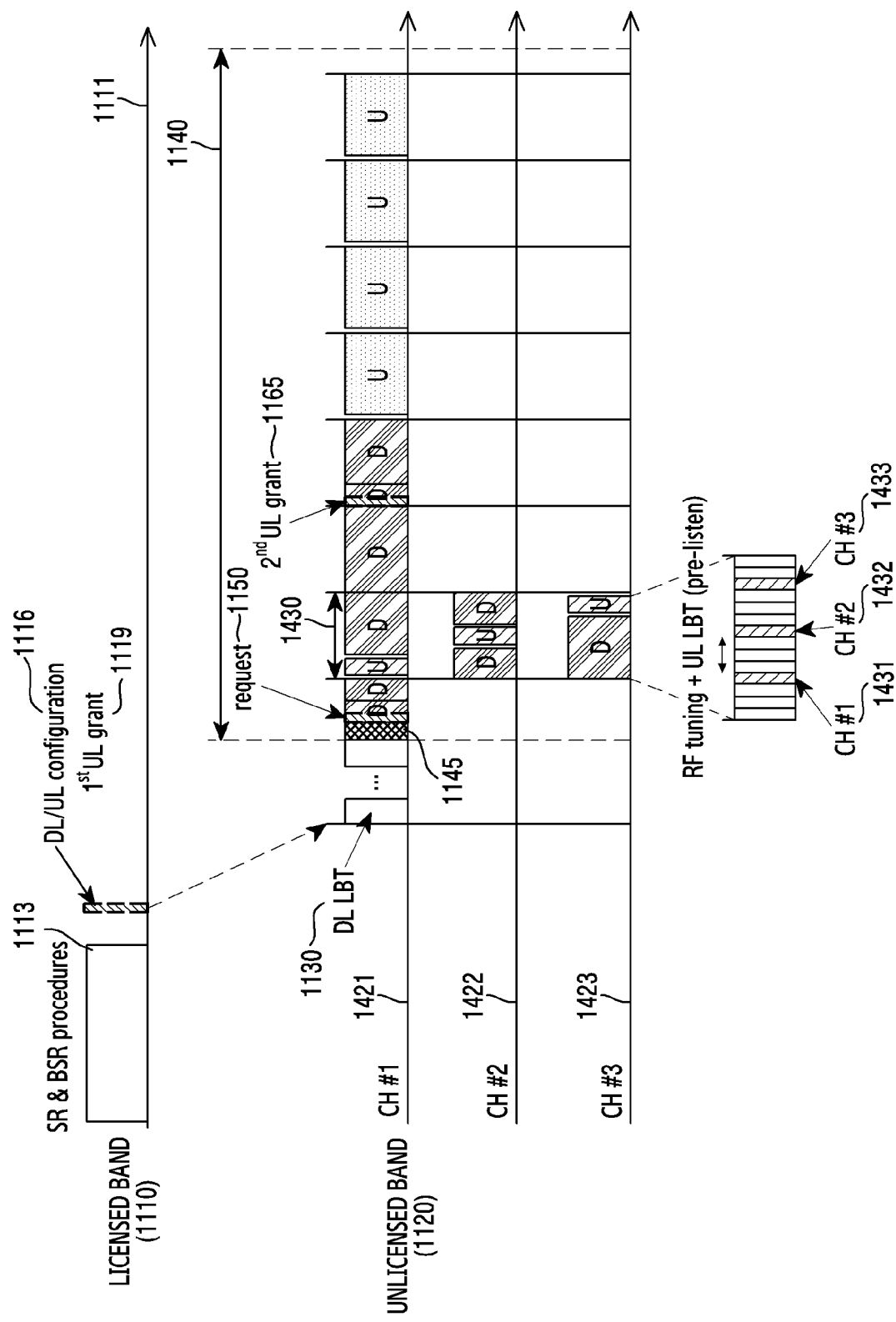
FIG. 14A illustrates an example of a subframe for LBS in a multi-channel in a wireless communication system according to various embodiments of the present disclosure.
Figure 14B:
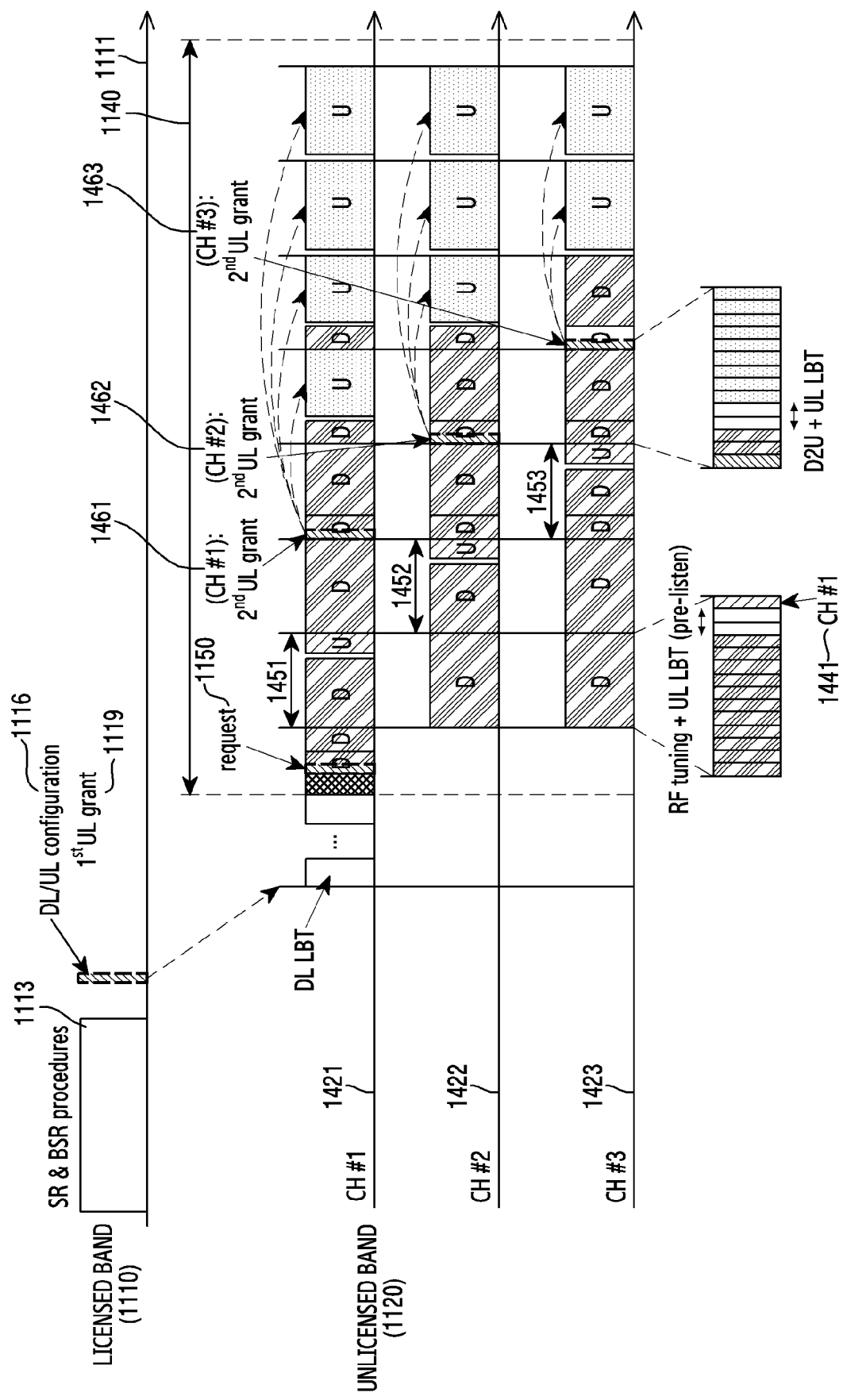
FIG. 14B illustrates another example of the subframe for LBS in a multi-channel in a wireless communication system according to various embodiments of the present disclosure.

The BS 110 and the terminal 120 may perform a CA operation using a channel in the licensed band as a PCC and a channel in the unlicensed band as an SCC. The terminal 120 may perform uplink CA using a plurality of channels in the unlicensed band as SCCs. Whether the terminal 120 can occupy the unlicensed band may vary depending on each of a plurality of channels. The terminal 120 may perform LBS according to various embodiments in each of a plurality of channels (multi-channel) of the unlicensed band. Hereinafter, the LBS operation in the multi-channel will be described with reference to FIGS. 14A, 14B, and 15. In FIGS. 14A and 14B, a description of the configuration which is the same as that illustrated in FIG. 11 will be omitted.

FIGS. 14A and 14B illustrate an example of a subframe for LBS in a multi-channel in a wireless communication system according to various embodiments of the present disclosure.

Referring to FIG. 14A, the terminal 120 may transmit uplink data to the BS 110 by using a first channel 1421, a second channel 1422, and a third channel 1423 as SCCs. Although not explicitly illustrated, the operation of the BS 110 and the terminal 120 in the first channel 1421 may be applied to the second channel 1422 and the third channel 1423. The terminal 120 may perform pre-listen in each of the first channel 1421, the second channel 1422, and the third channel 1423. The BS 110 may transmit information indicating a pre-listen interval to the terminal 120. The terminal 120 may acquire information on a subframe (listen-subframe) including the pre-listen interval. The terminal 120 may determine a listen-subframe 1430.

In the listen-subframe 1430, each of the BS 110 and the terminal 120 may perform D2U switching. The terminal 120 may perform pre-listen in the first channel 1421. When channel occupancy of the first channel 1421 by another node is not detected, the terminal 120 may transmit a reporting signal (for example, SRS). The terminal 120 may perform RF tuning for pre-listen in the second channel 1422. The terminal 120 may change a target channel from the first channel 1421 to the second channel 1422 through the RF tuning. The target channel is a channel on which the terminal 120 performs pre-listen. Like in the first channel 1421, the pre-listen is performed in the second channel 1422 and, when channel occupancy of the second channel 1422 by another node is not detected, the terminal 120 may transmit a reporting signal. Through the above-described method, the pre-listen is performed in the third channel 1423 and, when channel occupancy of the third channel 1423 by another node is not detected, the terminal 120 may transmit a reporting signal. The BS 110 receiving the reporting signal from the terminal 120 may perform uplink scheduling on the multi-channel (the first channel 1421, the second channel 1422, and the third channel 1423) of the terminal 120 based on the reporting signal received in each channel.

The BS 110 may provide information on the reporting signal for each channel to the terminal 120 through a request signal (for example, SRS triggering (broadcasting information) of the unlicensed band. When the reporting signal for each of a plurality of channels is transmitted in one subframe, the request signal may include an index (for example, a channel number) of each of the plurality of channels and information on a transmission order of the corresponding reporting signal in some embodiments.

The BS 110 may allocate uplink resources to the terminal 120 for each channel. The BS 110 may transmit a second grant 1165 for each channel. The second grant 1165 for each channel may indicate a position of uplink resources in all resources which can be allocated. In some embodiments, the second grant 1165 may include a channel number, which is an index indicating one of a plurality of channels for uplink transmission. The terminal 120 may determine a channel, to which uplink resources indicated by the second grant 1165 are allocated, through the channel number indicated by the second grant 1165. The terminal 120 may transmit uplink data in the corresponding channel through the uplink resources allocated to each channel.

Meanwhile, according to the LBS procedure in the multi-channel, the number of channels in which the reporting signal can be transmitted may be limited based on an actual physical time required for RF tuning. Further, since the BS 110 does not perform downlink transmission for a relatively long time, the BS 110 may not occupy the unlicensed band. Accordingly, there is a demand for a method of configuring different listen-subframes with respect to a plurality of channels rather than transmitting the reporting signal after performing pre-listen with respect to the plurality of channels in the same subframe. Hereinafter, an embodiment of allowing transmission of only one reporting signal in every subframe will be described with reference to FIG. 14B.

FIG. 14B illustrates another example of the subframe for LBS in the multi-channel in the wireless communication system according to various embodiments of the present disclosure. When a time point determined by the BS 110 arrives in each channel, the terminal 120 may change a target channel to the corresponding channel by performing RF tuning. The terminal 120 may perform pre-listen in the corresponding channel and, when another node occupying the channel is not detected, transmit a reporting signal (for example, SRS).

Referring to FIG. 14B, the terminal 120 may perform pre-listen in the first channel 1421. The terminal 120 may perform pre-listen in the listen-subframe 1451 for the first channel. When occupancy of the first channel 1421 by another node is not detected, the terminal 120 may transmit the reporting signal 1441. Like the method in the first channel 1421, the terminal 120 may perform pre-listen in each of the second channel 1422 and the third channel 1423 and transmit the reporting signal according to the pre-listen result.

Meanwhile, FIG. 14B illustrates that pre-listen is performed in every subframe sequentially in the first channel 1421, the second channel 1422, and the third channel 1423. The terminal 120 may determine a listen-subframe of each channel through the configuration information 1116 or the request signal 1150.

The terminal 120 may receive the second grant 1461 for the first channel 1421 from the BS 110. The terminal 120 may determine a position of uplink resources allocated to the first channel 1421 based on the second grant 1461. The terminal 120 may map transport blocks generated according to the first grant 1119 to the determined resource position. The terminal 120 may transmit mapped transport blocks to the BS 110 in the first channel 1421. The terminal 120 may receive the second grant 1462 for the second channel 1422 from the BS 110. Like in the first channel 1421, the terminal 120 may transmit uplink data to the BS 110 based on the second grant 1462. The terminal 120 may receive the second grant 1463 for the third channel 1423 from the BS 110. Like in the first channel 1421, the terminal 120 may transmit uplink data to the BS 110 based on the second grant 1463.

Figure 15:
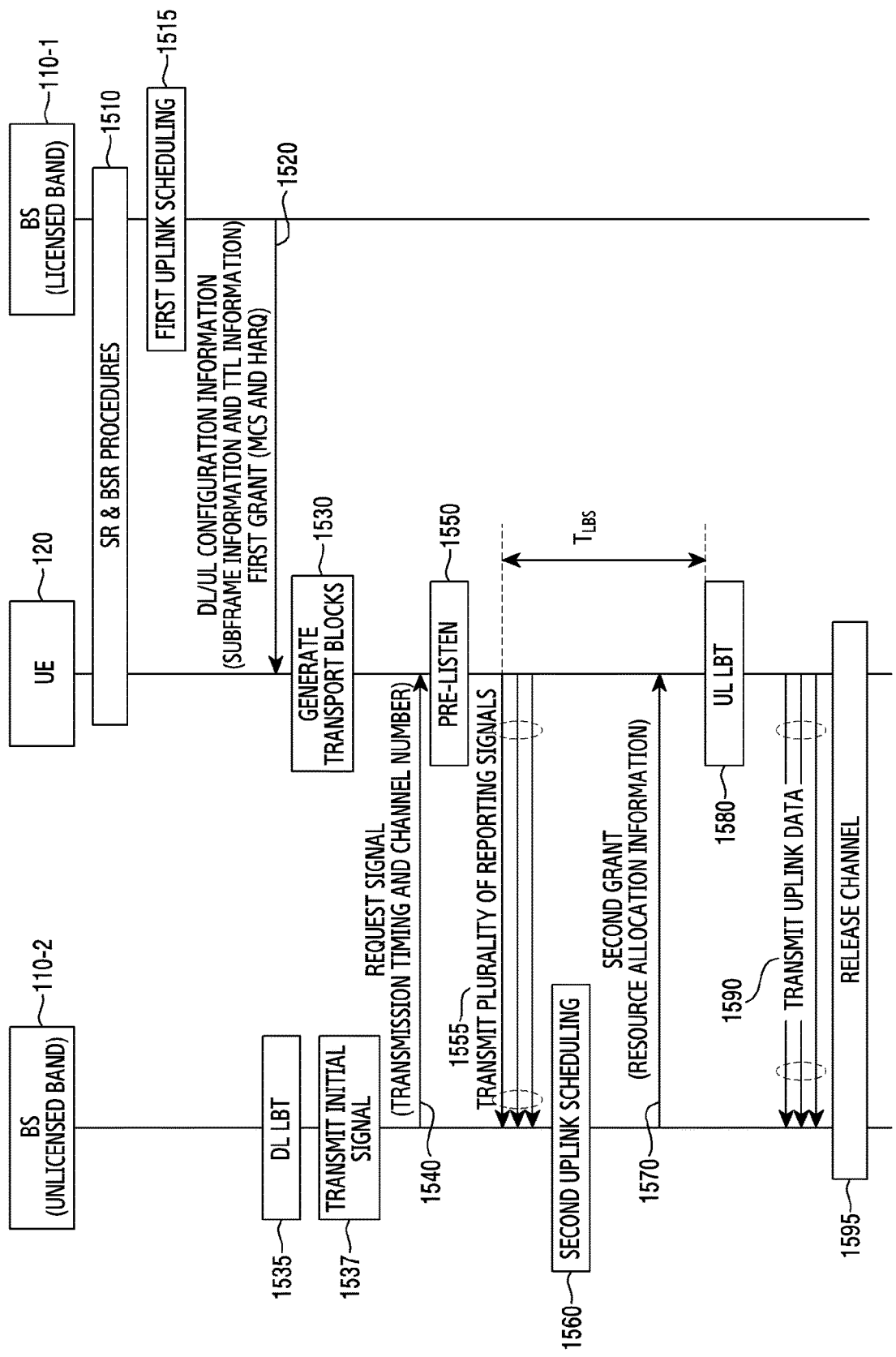
FIG. 15 illustrates an LBS procedure performed in a multi-channel in a wireless communication system according to various embodiments of the present disclosure.

FIG. 15 illustrates an LBS procedure performed in a multi-channel in a wireless communication system according to various embodiments of the present disclosure. Hereinafter, in FIG. 15, a description of the operation which is the same as that illustrated in FIG. 12 will be omitted.

In step 1510, the BS 110-1 may perform SR and BSR procedures with the terminal 120. Step 1510 corresponds to step 1210.

In step 1515, the BS 110-1 may perform first uplink scheduling for the terminal 120. Step 1515 corresponds to step 1215.

In step 1520, the BS 110-1 may transmit configuration information to the terminal 120. The configuration information may include information on each of the subframes within the COT. In some embodiments, the configuration information may include information on a subframe in each of a plurality of channels. For example, the configuration information may include information on a configuration of a subframe (downlink subframe/uplink subframe/mixed subframe) for a first channel within the COT and information on a configuration of a subframe for a second channel. In some embodiments, the configuration information may include information indicating a listen-subframe and information indicating a priority of each of the plurality of channels within the listen-subframe. As the priority is higher, the reporting signal may be first transmitted within the same listen-subframe.

The BS 110-1 may transmit a first grant to the terminal 120. The BS 110 may transmit the first grant including the MCS information and the HARQ-related information determined in step 1515 to the terminal 120.

In step 1530, the terminal 120 may generate transport blocks. The terminal 120 may generate at least one transport block based on the MCS information and the HARQ-related information included in the first grant. Step 1530 corresponds to step 1230.

In step 1535, the BS 110-2 may perform DL LBT. The BS 110-2 may perform DL LBT on each of a plurality of channels. When traffic for channel occupancy by another node is smaller than a threshold value in each channel, the BS 110-2 may determine occupancy of the corresponding channel.

In order to prevent the channel occupancy by another node, the BS 110-2 may transmit an initial signal in the channel determined to be occupied before a subframe boundary in step 1537. For subframe synchronization, the BS 110-2 may transmit the initial signal before a first subframe with the COT. Further, in order to synchronize the subframe boundary in each of the plurality of channels, the BS 110-2 may transmit the initial signal. According to an embodiment, in respective channels, lengths of intervals in which the initial signal is transmitted may vary. The BS 110-2 may transmit downlink data through the downlink subframe.

In step 1540, the BS 110-2 may transmit a request signal to the terminal 120. The BS 110-2 may transmit the request signal to each channel. The request signal may indicate a subframe in which a reporting signal (for example, SRS) is transmitted. For example, the request signal may include an offset value for the reporting signal to be transmitted. In another example, the request signal may indicate a number of a channel in which the reporting signal is transmitted. A downlink channel may be occupied by the BS 110. In some embodiments, the request signal may indicate a pre-listen interval, in other words, an interval in which LBS is performed.

In step 1550, the terminal 120 may perform pre-listen. The terminal 120 may perform pre-listen for each channel. The terminal 120 may determine at least one listen-subframe based on information received from the BS 110-1 or the BS 110-2. In some embodiments, the terminal 120 may perform pre-listen for each of a plurality of channels with different symbols in one listen-subframe. In some embodiments, the terminal 120 may perform pre-listen with different listen-subframes in each channel. When an intensity of a signal by at least one node is lower than a threshold value in the pre-listen interval of each channel, the terminal 120 may make a request for allocating uplink resources.

In step 1555, the terminal 120 may transmit the reporting signal to the BS 110-2. The terminal 120 may transmit the reporting signal for each of the plurality of channels to the BS 110-2. Although FIG. 12 illustrates that the reporting signal is transmitted from the terminal 120 to the BS 110-2 of the unlicensed band, the terminal 120 may transmit the reporting signal to the BS 110-1 through the licensed band.

In some embodiments, the terminal 120 may perform pre-listen for each of the plurality of channels with different symbols in one listen-subframe and transmit the reporting signal according to the pre-listen result. In some embodiments, the terminal 120 may perform pre-listen with different listen-subframes in each channel. The terminal 120 may perform pre-listen in the listen-subframe corresponding to each channel and transmit the reporting signal according to the pre-listen result. By performing the pre-listen with different listen-subframes, it is possible to lower an LBT failure probability due to an RF tuning time.

In step 1560, the BS 110-2 may perform second uplink scheduling. The BS 110-2 may allocate uplink resources in the unlicensed band to the terminal 120. The BS 110-2 may distribute uplink resources to the plurality of channels. The BS 110-2 may allocate first uplink resources for the first channel and second uplink resources for the second channel to each terminal 120.

In step 1570, the BS 110-2 may transmit the second grant to the terminal 120. The BS 110-2 may transmit the second grant for each channel to the terminal 120. The second grant for each channel may include information indicating a position of uplink resources for the corresponding channel. Further, the second grant for each channel may include an index for identifying the corresponding channel. The terminal 120 may map the generated transport blocks to physical resources according to the position of resources for the channel. The transport blocks correspond to uplink data to be transmitted.

In step 1580, the terminal 120 may perform UL LBT for each channel. Before transmitting uplink data, the terminal 120 may perform UL LBT in order to determine whether the channel is occupied by a node adjacent to the terminal 120.

In step 1590, the terminal 120 may transmit uplink data for each channel. When it is determined that there is no channel occupancy by another node based on the result of the UL LBT in step 1580, the terminal 120 may transmit uplink data for the channel to the BS 110.

In step 1595, the BS 110 and the terminal 120 may release the channel connection.

The BS 110 may have no downlink traffic to be transmitted to the terminal 120 in the unlicensed band. For example, it is assumed that there is only uplink traffic which the terminal 120 transmits to the BS 110. The BS 110 may not transmit a signal higher than or equal to a threshold value in a downlink subframe in the unlicensed band. The BS 110 may not occupy the unlicensed band 1120. When the BS 110 does not occupy the unlicensed band 1120 during the downlink subframe, another node occupies the unlicensed band 1120, so that the terminal 120 cannot perform uplink transmission. Hereinafter, an LBS operation having no downlink traffic to prevent occupancy by another node will be described with reference to FIGS. 16 and 17.

Figure 16:
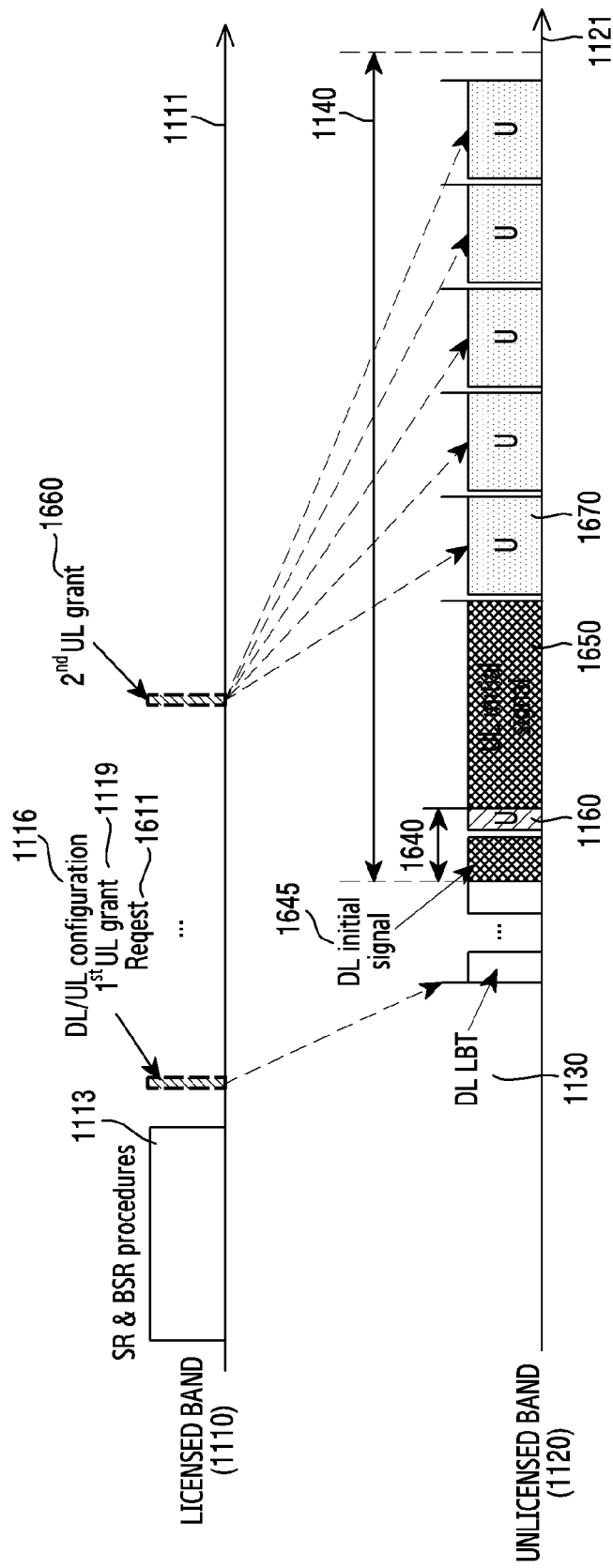
FIG. 16 illustrates an example of a subframe for LBS when there is no downlink traffic in a wireless communication system according to various embodiments of the present disclosure.

FIG. 16 illustrates an example of a subframe for LBS when there is no downlink traffic in a wireless communication system according to various embodiments of the present disclosure. In FIG. 16, a description of the configuration which is the same as that illustrated in FIG. 11 will be omitted.

Referring to FIG. 16, the terminal 120 may periodically transmit the SR and BSR 1113 to the BS 110 through the licensed band 1110. The BS 110 may transmit the configuration information 1116 and the first grant 1119 to the terminal 120 through the licensed band 1110. The BS 110 may transmit a request signal 1611 in the licensed band 1110. Since the BS 110 does not use a downlink subframe in the unlicensed band, the request signal 1611 may be transmitted only in the licensed band 1110.

The BS 110 may provide information indicating LBS with no downlink traffic to the terminal 120. In some embodiments, the BS 110 may provide information indicating that there is no downlink transmission to the terminal 120 by transmitting the request signal to the terminal 120 in the licensed band 1110. The terminal 120 may determine to perform the LBS with no downlink traffic in response to the reception of the request signal in the licensed band 1110, not in the unlicensed band 1120. In some embodiments, the request signal 1611 may include an identifier indicating the LBS with no downlink traffic. For example, identification information is 1 bit and may indicate whether the LBS with no downlink traffic is performed. The terminal 120 may perform the LBS with no downlink traffic in response to the reception of the identification information.

The BS 110 may perform LBT 1630. For example, the LBT 1630 may be the LBT procedure of category 4. In order to process uplink traffic in the unlicensed band 1120, the BS 110 may perform the LBT 1630. The LBT 1630 may be the LBT procedure of category 4. When a signal intensity higher than or equal to a threshold value by another node is not detected within the cell of the BS 110, the BS 110 may determine occupancy of the unlicensed band 1120. The BS 110 may allocate the COT 1140. The BS 110 may determine a first subframe 1640 of the COT 1140 as a listen-subframe. In some embodiments, if there is no downlink data traffic, the BS may transmit a reservation signal (or initial signal) for occupying the unlicensed band before the pre-listen interval. Since there is no downlink traffic to be transmitted in the unlicensed band 1120, the BS 110 may transmit an initial signal 1645 to reserve the occupancy of the channel in the unlicensed band. The initial signal 1645 is a downlink initial signal transmitted by the BS 110. Within the subframe 1640, the BS 110 may transmit the initial signal 1645 before a symbol corresponding to a pre-listen interval. The BS 110 may prevent channel occupancy by another node by transmitting the initial signal 1645.

In the pre-listen interval, the terminal 120 may identify occupancy of the unlicensed band 1120 by a node adjacent to the terminal 120. In other words, the terminal 120 may perform pre-listen. The terminal 120 may determine whether an intensity of a signal provided from another node is higher than or equal to a threshold value without receiving downlink traffic or transmitting uplink traffic. When the signal of the intensity higher than or equal to the threshold value is not detected, the terminal 120 may transmit the reporting signal 1160 to the BS 110. As the terminal 120 performs pre-listen, a possibility of occupancy of the unlicensed band 1120 by a hidden node (for example, the node 130 of FIG. 1) of the BS 110 may be considered. The BS 110 may perform uplink scheduling considering the hidden node according to reception of the reporting signal.

The terminal 120 may transmit the reporting signal 1160 to the BS 110 in the unlicensed band 1120. The BS 110 may receive the reporting signal 1160 through a communication module that controls the unlicensed band 1120. The BS 110 may perform uplink scheduling for the terminal 120. The BS 110 may transmit a second grant 1660 through a communication module that controls the licensed band 1110. Since downlink traffic is not transmitted in the unlicensed band 1120, the BS 110 may transmit the second grant to the terminal 120 in the licensed band 1110. Meanwhile, when the BS 110 controls the operation in the licensed band 1110 and another BS controls the operation in the unlicensed band 1120, the BS 110 may receive the pre-listen result of the terminal 120 from the other BS through a backhaul network. The BS 110 may perform uplink scheduling in the licensed band 1110 according to the pre-listen result.

After transmitting the reporting signal, the terminal 120 may transmit an initial signal 1650. The initial signal 1650 may be an uplink initial signal transmitted by the terminal 120. The terminal 120 may maintain occupancy of the unlicensed band 1120 by transmitting the initial signal 1650. Through the maintenance of the unlicensed band 1120, it is possible to prevent another node from entering the channel in the downlink subframe. In addition, since channel occupancy through the initial signal 1650 is the occupancy of the unlicensed band 1120 by the terminal 120, not the occupancy of the unlicensed band 1120 by the BS 110, it is possible to prevent occupancy of the hidden node of the terminal 120. The terminal 120 may process uplink traffic within the allocated COT by reserving the unlicensed band 1120. In some embodiments, the uplink transmission information may include an identifier making a request for transmitting the reservation signal of the terminal after the reporting signal is transmitted. In some embodiments, the transmission of the reservation signal of the terminal is preconfigured by the BS before receiving the uplink transmission. In some embodiments, the transmission of the reservation signal of the terminal is determined by the terminal according to a current channel status or an operation status (i.e. remaining duration until uplink subframe boundary).

The BS 110 may receive the reporting signal from the terminal 120. The BS 110 may perform uplink scheduling for uplink transmission in the unlicensed band of the terminal 120. The BS 110 does not use the downlink subframe in the unlicensed band. The BS 110 may transmit the second grant to the terminal 120 through the licensed band 1110. The terminal 120 may determine a position of uplink resources allocated by the BS 110 based on the second grant. The terminal 120 may map the generated transport blocks to the determined position of uplink resources based on the first grant.

The terminal 120 may determine a time point of an uplink subframe 1670 based on the second grant. The terminal 120 may stop transmission of the initial signal 1650 before the uplink subframe 1670. The terminal 120 may perform UL LBT. When it is determined that there is no occupancy of the unlicensed band 1120 by the node adjacent to the terminal 120, the terminal 120 may transmit uplink data to the BS 110 through the uplink subframe 1670. The terminal 120 may transmit uplink data to the BS 110 through the mapped resources.

Figure 17:
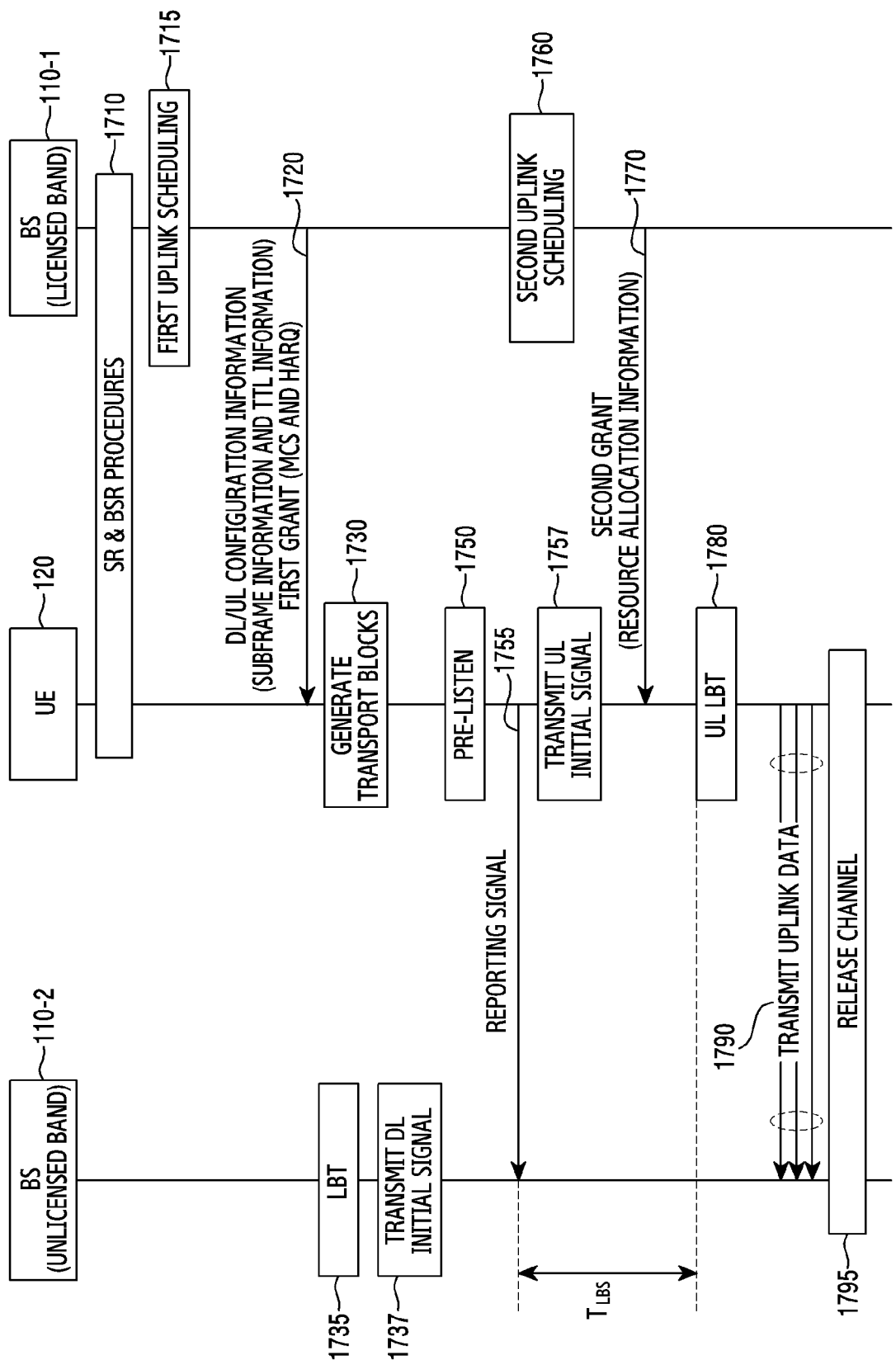
FIG. 17 illustrates an LBS procedure performed when there is no downlink traffic in a wireless communication system according to various embodiments of the present disclosure.

FIG. 17 illustrates an LBS procedure performed when there is no downlink traffic in a wireless communication system according to various embodiments of the present disclosure. Hereinafter, in FIG. 17, a description of the operation corresponding to that illustrated in FIG. 12 will be omitted.

In step 1710, the BS 110-1 may perform SR and BSR procedures with the terminal 120. Step 1710 corresponds to step 1210.

In step 1715, the BS 110-1 may perform first uplink scheduling for the terminal 120. Step 1715 corresponds to step 1215.

In step 1720, the BS 110-1 may transmit configuration information to the terminal 120. The configuration information may include information on each of the subframes within the COT. Since there is no downlink traffic, subframes within the COT may not include a downlink subframe (subframe in which only downlink symbols exist).

The BS 110-1 may transmit a first grant to the terminal 120. The BS 110-1 may transmit the first grant including the MCS information and the HARQ-related information determined in step 1715 to the terminal 120.

The BS 110-1 may transmit a request signal to the terminal 120. Since there is no downlink traffic in the unlicensed band, the downlink subframe is not used in the unlicensed band. The BS 110-1 may transmit the request signal to the terminal 120 in the licensed band.

In step 1730, the terminal 120 may generate transport blocks. The terminal 120 may generate at least one transport block based on the MCS information and the HARQ-related information included in the first grant. Step 1530 corresponds to step 1230.

In step 1735, the BS 110-2 may perform the LBT (for example, LBT of category 4). When traffic for channel occupancy by another node in the unlicensed band is smaller than a threshold value, the BS 110-2 may determine occupancy of the corresponding channel. Since there is no downlink traffic, the BS 110-2 is used to reserve the unlicensed band in order to prevent channel occupancy by another node.

In step 1737, the BS 110-2 may transmit a downlink initial signal. The BS 110-2 occupies the unlicensed band through the initial signal and may prevent another node from entering the channel. Although not illustrated in FIG. 17, the BS 110-2 may transmit the initial signal continuously after the subframe boundary, not before the subframe boundary. The BS 110-2 may transmit the initial signal up to a symbol before the pre-listen interval in the listen-subframe.

In step 1750, the terminal 120 may perform pre-listen. The terminal 120 may perform the pre-listen based on information received from the BS 110-2. When an intensity of a signal by at least one node is lower than a threshold value in the pre-listen interval, the terminal 120 may make a request for allocating uplink resources.

In step 1755, the terminal 120 may transmit the reporting signal to the BS 110-2. The terminal 120 may make a request for allocating uplink resources to the BS 110-2 through the reporting signal. Transmission of the reporting signal in the unlicensed band may indicate occupancy of the unlicensed by the terminal 120. Meanwhile, although FIG. 17 illustrates that the reporting signal is transmitted from the terminal 120 to the BS 110-2 of the unlicensed band, the terminal 120 may transmit the reporting signal to the BS 110-1 through licensed band. The terminal 120 may indicate occupancy of the unlicensed band by the terminal 120 to the BS 110-1 through explicit signaling.

In step 1757, the terminal 120 may transmit an uplink initial signal. When the BS 110 does not occupy the channel during the subframe allocated for the purpose of downlink transmission, channel occupancy by another node of the terminal 120 may be generated. Accordingly, the terminal 120 may transmit the initial signal in order to prevent the channel occupancy by the other node. The other node includes a hidden node. The terminal 120 may transmit the initial signal for channel occupancy before the subframe allocated for the purpose of uplink transmission.

In step 1760, the BS 110-1 may perform second uplink scheduling. The BS 110-1 may determine that the terminal 120 can occupy the unlicensed band based on the reporting signal which the BS 110-2 receives. When the BS 110-1 and the BS 110-2 are implemented as separate entities, the BS 110-1 may receive the LBS result of the terminal 120 such as the reporting signal from the BS 110-2 through a backhaul network. The BS 110-1 may perform second uplink scheduling on a plurality of terminals (including the terminal 120)

transmitting the reporting signal. The BS 110-1 may allocate uplink resources to each of the plurality of terminals based on fairness with other terminals and an amount of load. The BS 110-1 may allocate a particular time-frequency area in the whole bandwidth to the terminal 120 as uplink resources. The BS 110-1 may generate a second grant indicating the uplink resources allocated to the terminal 120.

In step 1770, the BS 110-1 may transmit the second grant to the terminal 120. The COT may not include a downlink subframe. Since there is no downlink traffic in the unlicensed band, the BS 110-2 cannot transmit the second grant to the terminal 120. The BS 110-1 may transmit the second grant in the licensed band. The second grant may indicate a position of uplink resources allocated to the terminal 120. The terminal 120 may map pre-generated transport blocks to resource blocks corresponding to the allocated uplink resources.

In step 1780, the terminal 120 may perform UL LBT for each channel. Step 1780 corresponds to step 1280.

In step 1790, the terminal 120 may transmit the uplink data. Step 1790 corresponds to step 1290.

In step 1795, the BS 110 and the terminal 120 may release the channel connection.

As LBT (LBS) is performed before uplink scheduling, waste of uplink resources is reduced. Further, as the terminal directly performs the LBS and reports the LBS result to the BS, uplink scheduling of the BS may be performed in consideration of the existence of a hidden node for the BS. However, since there is a time difference ($T_{LBS}$) between a time point at which the terminal transmits the reporting signal according to the LBS result and a time point at which the UL LBT is performed before the uplink subframe, the terminal may still have a failure possibility of uplink channel occupancy. Accordingly, the terminal may not occupy the unlicensed band in the state where the terminal should necessarily occupy the unlicensed band (hereinafter, referred to as a urgent mode) like in the state where the terminal should necessarily process uplink traffic. Hereinafter, the LBS operation in the urgent mode will be described with reference to FIGS. 18 and 19.

Figure 18:
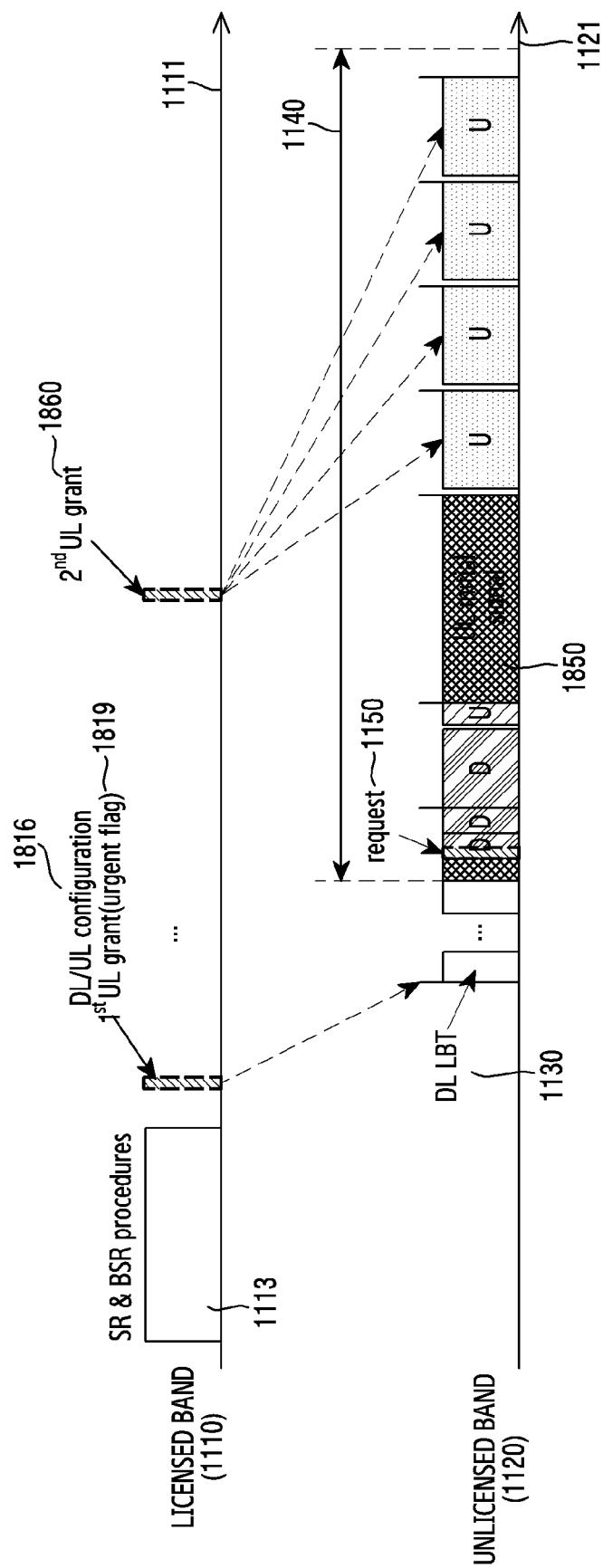
FIG. 18 illustrates an example of a subframe for LBS in an urgent mode in a wireless communication system according to various embodiments of the present disclosure.

FIG. 18 illustrates an example of a subframe for LBS in the urgent mode in a wireless communication system according to various embodiments of the present disclosure. The terminal 120 may be requested to perform LBT in the urgent mode. For example, the terminal 120 may be requested to have a data rate higher than or equal to a predetermined value. In another example, the terminal 120 may be requested to necessarily process traffic within the COT. In FIG. 18, a description of the configuration which is the same as that illustrated in FIG. 11 will be omitted.

Referring to FIG. 18, the terminal 120 may periodically transmit the SR and BSR 1113 to the BS 110 through the licensed band 1110. The BS 110 may transmit configuration information 1816 and a first grant 1819 to the terminal 120 through the licensed band 1110.

The BS 110 may make a request for performing LBS in the urgent mode to the terminal 120. In other words, the BS 110 may transmit identification information instructing the terminal to perform LBT in the urgent mode. In some embodiments, the configuration information 1816 may include the identification information. The configuration information 1816 may include an urgent flag indicating the urgent mode. For example, the urgent flag is configured by 1 bit and may indicate whether the urgent mode is performed. In some embodiments, the first grant 1819 may include the identification information. For example, control information of the first grant 1819 may include a field indicating LBS in the urgent mode. The field may indicate whether the terminal 120 performs the LBS in the urgent mode. In another example, a combination of at least two pieces of information included in the first grant 1819 may indicate whether the LBS in the urgent mode is performed. The first grant 1819 may be transmitted through a UE-specific signal.

According to reception of the identification information, the terminal 120 may be configured to perform the LBS in the urgent mode. The terminal 120 may perform pre-listen. When a signal intensity by at least one node is lower than a threshold value in the unlicensed band 1120, the terminal 120 may transmit the reporting signal 1160 (for example, SRS). After transmitting the reporting signal 1160, the terminal 120 operating in the urgent mode may transmit an uplink initial signal 1850. The terminal 120 may change the purpose of the subframe for downlink transmission to the subframe for transmission of the uplink initial signal 1850.

On the other hand, when the signal intensity is higher than or equal to the threshold value in the unlicensed band 1120, the terminal 120 may not transmit the reporting signal. The terminal 120 may not make a request for uplink resources to the BS 110. The BS 110 may transmit downlink data to the terminal 120 through a downlink subframe subsequent to the listen-subframe. That is, according to the LBS result, the terminal 120 may determine whether to use the downlink subframe after the listen-subframe or to change the downlink subframe to the uplink subframe for transmission of the initial signal 1850 and use the uplink subframe.

The terminal 120 may maintain channel occupancy of the unlicensed band 1120 by transmitting the initial signal 1850. By receiving the reporting signal 1160 from the terminal 120, the BS 110 may determine to allocate uplink resources to the terminal 120.

In some embodiments, the uplink transmission information may include an identifier making a request for transmitting the reservation signal of the terminal after the reporting signal is transmitted. In some embodiments, the transmission of the reservation signal of the terminal is preconfigured by the BS before receiving the uplink transmission. In some embodiments, the transmission of the reservation signal of the terminal is determined by the terminal according to a current channel status, an operation status (e.g., remaining duration until uplink subframe boundary), or an operation mode (e.g., an urgent mode).

The BS 110 may perform uplink scheduling. The BS 110 may generate a second grant 1860. The BS 110 may transmit the second grant 1860 to the terminal 120 through the licensed band 1110 (or the unlicensed band 1120). The terminal 120 may stop transmission of the initial signal 1850 at a timing predetermined according to the second grant 1860. The terminal 120 may perform UL LBT. The terminal 120 may transmit uplink data.

Figure 19:
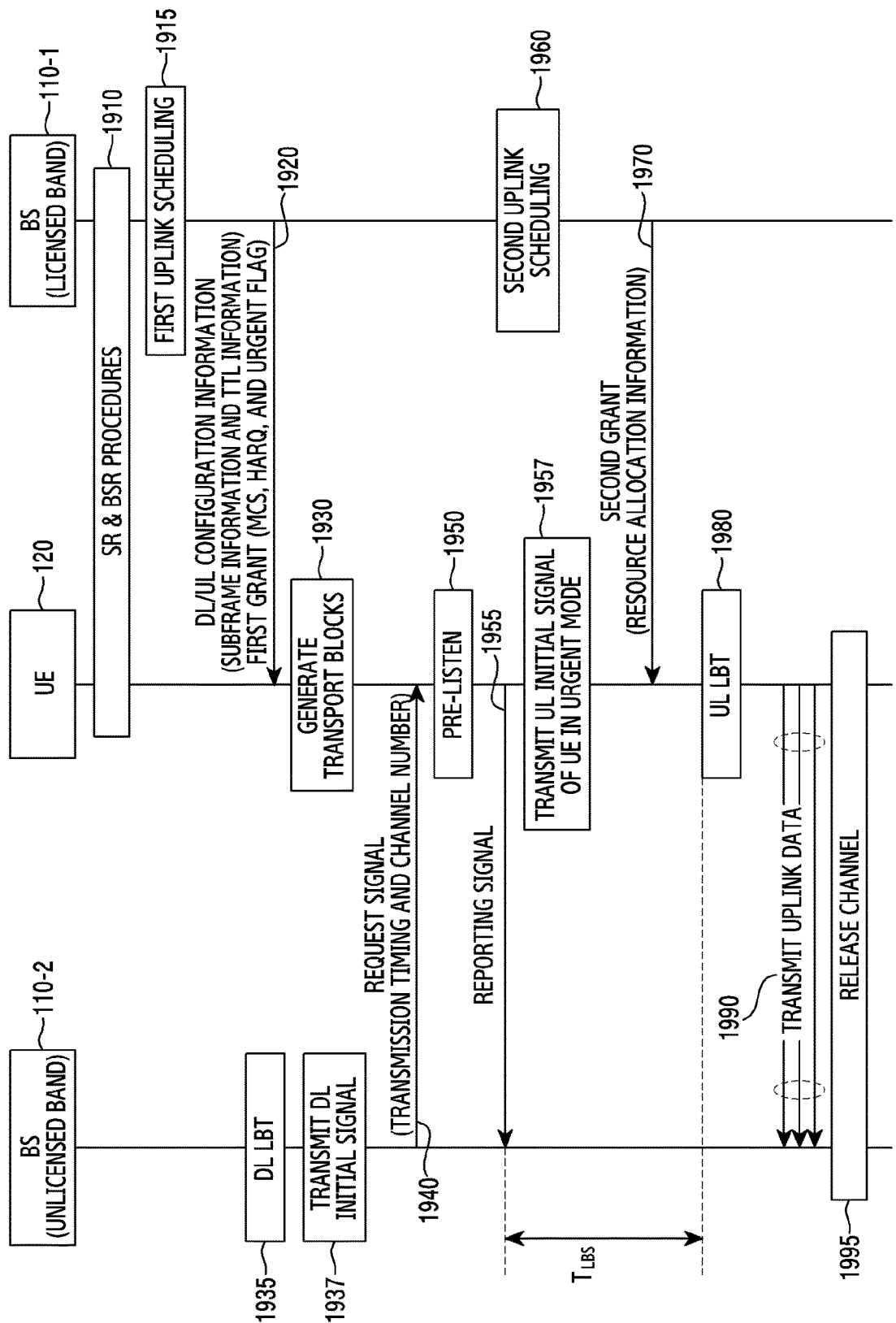
FIG. 19 illustrates an LBS procedure performed by the terminal in the urgent mode in a wireless communication system according to various embodiments of the present disclosure.

FIG. 19 illustrates an LBS procedure performed by the terminal in the urgent mode in a wireless communication system according to various embodiments of the present disclosure. Hereinafter, in FIG. 19, a description of the operation corresponding to that illustrated in FIG. 12 or FIG. 17 will be omitted.

In step 1910, the BS 110-1 may perform SR and BSR procedures with the terminal 120. Step 1910 corresponds to step 1210.

In step 1915, the BS 110-1 may perform first uplink scheduling for the terminal 120. Step 1915 corresponds to step 1215.

In step 1920, the BS 110-1 may transmit configuration information to the terminal 120. The BS 110 may transmit a first grant including MCS information and HARQ-related information determined in step 1915 to the terminal 120. Step 1920 corresponds to step 1220. In addition, in some embodiments, the configuration information may indicate the urgent mode. The BS 110-1 may inform a plurality of terminals within the coverage of the BS 110-1 that there is a terminal (for example, the terminal 120) used to operate in the urgent mode among the plurality of terminals.

In step 1930, the terminal 120 may generate transport blocks. The terminal 120 may generate at least one transport block based on the MCS information and the HARQ-related information included in the first grant. Step 1930 corresponds to step 1230.

In step 1935, the BS 110-2 may perform DL LBT. Step 1935 corresponds to step 1235. When traffic for channel occupancy by another node is smaller than a threshold value, the BS 110-2 may determine channel occupancy of the unlicensed band.

In step 1937, the BS 110-2 may transmit an initial signal before a subframe boundary. The BS 110-2 may perform subframe synchronization. The BS 110-2 may prevent channel occupancy by another node until the subframe synchronization. The BS 110-2 may transmit downlink data through a downlink subframe. Step 1937 corresponds to step 1237.

In step 1940, the BS 110-2 may transmit a request signal to the terminal 120. Step 1940 corresponds to step 1240.

In step 1950, the terminal 120 may perform pre-listen. The terminal 120 may determine a listen-subframe based on information received from the BS 110-1 or the BS 110-2. The terminal 120 may determine a pre-listen interval in the listen-subframe. The terminal 120 may identify whether there is occupancy of the unlicensed band by a node adjacent to the terminal 120 in the pre-listen interval. When a signal intensity by at least one node is lower than a threshold value in the pre-listen interval, the terminal 120 may make a request for allocating uplink resources to the BS 110-1 (or the BS 110-2).

In step 1955, the terminal 120 may transmit the reporting signal to the BS 110-1. Step 1955 corresponds to step 1755.

In step 1957, the terminal 120 may transmit the initial signal. The terminal 120 may transmit an uplink initial signal through a subframe (downlink subframe) allocated for the purpose of downlink transmission. Before a subframe (uplink subframe) allocated for the purpose of uplink transmission, the terminal 120 may transmit the initial signal to occupy the unlicensed band.

In step 1960, the BS 110-1 may perform second uplink scheduling. Step 1960 corresponds to step 1760.

In step 1970, the BS 110-1 may transmit a second grant to the terminal 120. FIG. 19 illustrates that the BS 110-1 transmits the second grant to the terminal 120 in the licensed band, but is not limited thereto. Unlike in FIG. 17 in which the downlink subframe is not used, the BS 110-2 may transmit the second grant to the terminal 120 in the unlicensed band. The second grant may indicate a position of uplink resources allocated to the terminal 120. The terminal 120 may map the transport blocks generated in step 1930 to resource blocks corresponding to the allocated uplink resources.

In step 1980, the terminal 120 may perform UL LBT for each channel. Step 1980 corresponds to step 1280.

In step 1990, the terminal 120 may transmit uplink data. Step 1990 corresponds to step 1290.

In step 1995, the BS 110 and the terminal 120 may release the channel connection.

As described in the LBS with no downlink traffic or the LBS in the urgent mode, it is used to transmit the initial signal to for uplink transmission of the terminal in the unlicensed band. However, not using the downlink subframe (for example, downlink subframe after reporting signal is transmitted) of the whole unlicensed band for uplink transmission of a particular terminal is inefficient in terms of resources. Hereinafter, a reservation-LBS operation for reserving the use of an uplink subframe of a particular terminal without excluding downlink transmission of another terminal will be described with reference to FIGS. 20 and 21. The reservation-LBS may be also referred to as zero-LBS.

Figure 20:
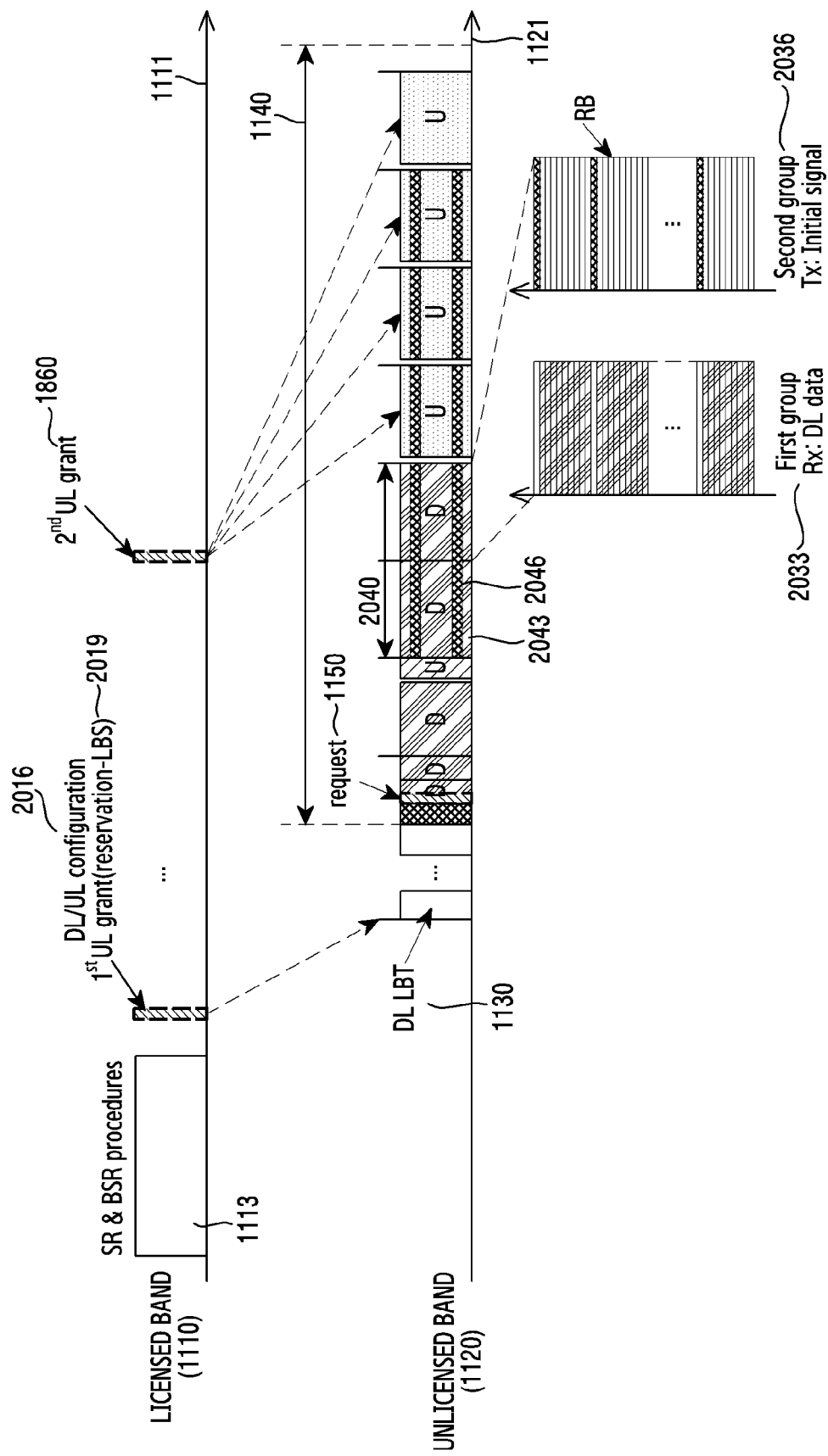
FIG. 20 illustrates an example of a subframe for reservation-LBS in a wireless communication system according to various embodiments of the present disclosure.

FIG. 20 illustrates an example of a subframe for reservation-LBS in a wireless communication system according to various embodiments of the present disclosure. The reservation-LBS is LBS performed for coexistence between a terminal and other terminals used to perform uplink transmission. Hereinafter, for convenience of description, two terminals will be described. The terminal 120 is a terminal performing reservation-LBS and the terminal 123 is a terminal performing LBS through the two-stage grant. In FIG. 20, a description of the configuration which is the same as that illustrated in FIG. 18 will be omitted.

Referring to FIG. 20, the terminal 120 may periodically transmit the SR and BSR 1113 to the BS 110 through the licensed band 1110. The BS 110 may transmit configuration information 2016 to the terminals 120 and 123 through the licensed band 1110. The BS 110 may broadcast the configuration information 2016. The configuration information 2016 may be transmitted through a cell-specific signal.

The configuration information 2016 may include an identifier indicating the reservation-LBS. The BS 110 may inform, through the identifier, each of the terminals that there is a terminal performing the reservation-LBS within the coverage of the BS 110. The configuration information 2016 may include a reservation-flag indicating the reservation-LBS. The reservation-flag may be referred to as a zero-LBS flag. For example, the reservation-flag is 1 bit and may indicate whether there is a terminal reserving an uplink subframe.

The BS 110 may divide a plurality of terminals within the coverage of the BS 110 into 2 groups. The BS 110 may divide the plurality of terminals into a first group 2033 and a second group 2036. In some embodiments, the first group 2033 may include terminals that do not occupy the channel in the uplink subframe after the downlink subframe. The second group 2036 may include terminals having uplink traffic to be transmitted in the uplink subframe. The BS 110 may monitor each of the plurality of terminals and divide the plurality of terminals into the first group 2033 and the second group 2036. In some embodiments, the BS 110 may determine the first group 2033 and the second group 2036 according to a priority of each of the plurality of terminals. The BS 110 may determine that terminals included in the second group 2036 having a relatively higher priority perform the reservation-LBS. The priority may be a priority for occupancy of the unlicensed band 1120. For example, the terminal 120 may be included in the second group 2036. The terminal 123 may be included in the first group 2033.

The BS 110 may make a request for performing the reservation-LBS to the terminal 120. In other words, the BS 110 may transmit identification information instructing the terminal 120 to perform the reservation-LBS. The BS 110 may transmit the identification information to the terminal 120 through a first grant 2019. For example, control information of the first grant 2019 may include a reservation-LBS field indicating whether the reservation-LBS is performed. The first grant 2019 may be transmitted through a UE-specific signal. Although not illustrated in FIG. 20, the BS 110 may transmit, to the terminal 123, identification information indicating that the reservation-LBS is not performed.

The reservation-LBS field may indicate whether the corresponding terminal performs the reservation-LBS. The terminal 120 may be configured to perform the reservation-LBS according to the reception of the identification information. The terminal 120 may perform pre-listen. When a signal intensity by at least one node is lower than a threshold value in the unlicensed band 1120, the terminal 120 may transmit a reporting signal (for example, SRS).

Before the uplink subframe after the listen-subframe, that is, during an interval 2040, the terminal 120 may transmit an uplink initial signal 2046. Although not illustrated in FIG. 20, not only the terminal 120 but also each of the terminals included in the second group 2036 may transmit the uplink initial signal in order to occupy the uplink channel of the unlicensed band. The resources may be scheduled such that each of the terminals included in the second group 2036 are not physically adjacent to each other or influence by channel occupancy therebetween is small.

The terminals (for example, the terminal 123) included in the first group 2033 may transmit downlink data 2043 in the unlicensed band 1120 according to downlink resources allocated by the BS 110. The terminal 123 does not use the uplink subframe after the downlink subframe under a control of the BS 110. Accordingly, in uplink transmission, the terminal 120 may not consider channel occupancy by the terminal 123. Further, as the terminal 120 occupies the channel through the initial signal 2046, it is possible to prevent channel occupancy by a hidden node (for example, the node 130) which the BS 110 cannot control. The BS 110, the terminal 120, and the terminal 123 may efficiently use resources during the interval 2040 by performing the reservation-LBS.

In some embodiments, the uplink transmission information may include an identifier making a request for transmitting the reservation signal of the terminal after the reporting signal is transmitted. In some embodiments, the transmission of the reservation signal of the terminal is preconfigured by the BS before receiving the uplink transmission. In some embodiments, the transmission of the reservation signal of the terminal is determined by the terminal according to a current channel status, an operation status (e.g., remaining duration until uplink subframe boundary), or an operation mode (e.g., the reservation-LBS).

The BS 110 may perform uplink scheduling. The BS 110 may generate a second grant 2060. The BS 110 may transmit the second grant 2060 to the terminal 120 through the licensed band 1110 (or the unlicensed band 1120). The terminal 120 may stop transmission of the initial signal 2046 at a timing predetermined according to the second grant 2060. The terminal 120 may perform UL LBT. The terminal 120 may transmit uplink data. Like the terminal 120, each of the other terminals included in the second group 2036 may receive the second grant and transmit uplink data based on the second grant.

Figure 21:
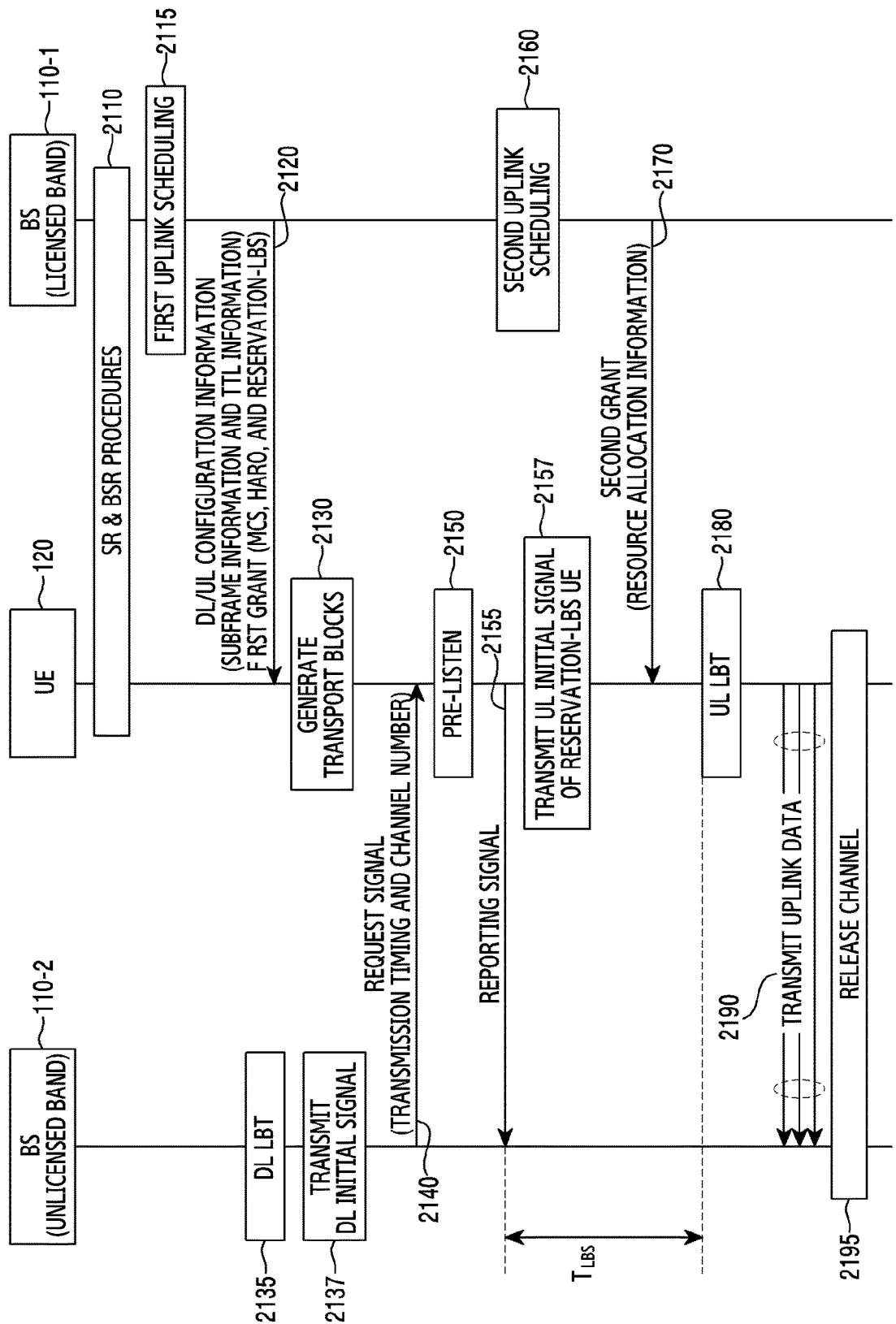
FIG. 21 illustrates a reservation-LBS procedure performed in a wireless communication system according to various embodiments of the present disclosure.

FIG. 21 illustrates a reservation-LBS procedure performed in a wireless communication system according to various embodiments of the present disclosure. Hereinafter, in FIG. 21, a description of the operation corresponding to that illustrated in FIG. 12 or FIG. 17 will be omitted.

In step 2110, the BS 110-1 may perform SR and BSR procedures with the terminal 120. Step 2110 corresponds to step 1210.

In step 2115, the BS 110-1 may perform first uplink scheduling for the terminal 120. Step 2115 corresponds to step 1215.

In step 2120, the BS 110-1 may transmit configuration information to the terminal 120. The BS 110 may transmit a first grant including MCS information and HARQ-related information determined in step 2115 to the terminal 120. Step 2120 corresponds to step 1220. In addition, in some embodiments, the configuration information may indicate reservation-LBS. The BS 110-1 may inform a plurality of terminals within the coverage of the BS 110-1 that there is a terminal (for example, the terminal 120) to perform reservation-LBS among the plurality of terminals.

In step 2130, the terminal 120 may generate transport blocks. The terminal 120 may generate at least one transport block based on the MCS information and the HARQ-related information included in the first grant. Step 2130 corresponds to step 1230.

In step 2135, the BS 110-2 may perform DL LBT. Step 2135 corresponds to step 1235. When traffic for channel occupancy by another node is smaller than a threshold value, the BS 110-2 may determine channel occupancy of the unlicensed band.

In order to prevent channel occupancy by another node, the BS 110-2 may transmit the initial signal before the subframe boundary in step 2137. The BS 110-2 may transmit downlink data through a downlink subframe. Step 2137 corresponds to step 1237.

In step 2140, the BS 110-2 may transmit a request signal (for example, SRS triggering) to the terminal 120. Step 2140 corresponds to step 1240.

In step 2150, the terminal 120 may perform pre-listen. The terminal 120 may determine a listen-subframe based on information received from the BS 110-1 or the BS 110-2. The terminal 120 may determine a pre-listen interval in the listen-subframe. The terminal 120 may identify whether there is occupancy of the unlicensed band by a node adjacent to the terminal 120 in the pre-listen interval. When a signal intensity by at least one node is lower than a threshold value in the pre-listen interval, the terminal 120 may make a request for allocating uplink resources.

In step 2155, the terminal 120 may transmit the reporting signal to the BS 110-1. Step 2155 corresponds to step 1755.

In step 2157, the terminal 120 may transmit the initial signal. The terminal 120 may transmit an uplink initial signal. Before the uplink subframe, the terminal 120 may transmit the initial signal to occupy the unlicensed band. The terminal 120 may transmit the initial signal through some resources rather than the whole allocated bandwidth. Although not illustrated in FIG. 21, the BS 110 may transmit, to at least one of the terminals included in the group, to which the terminal 120 does not belong, downlink data in the downlink subframe through residual resources other than the resources for transmission of the initial signal.

In step 2160, the BS 110-1 may perform second uplink scheduling. Step 2160 corresponds to step 1760. The second uplink scheduling may be for the terminal transmitting the reporting signal.

The BS 110-1 may divide a plurality of terminals into a first group and a second group. In the downlink subframe interval after the reporting signal is transmitted, one group may transmit the initial signal to occupy the uplink channel and the other group may receive downlink data. The BS 110-1 does not limit uplink channel occupancy of the group that receives downlink data. Even the terminal, which is not included in the group transmitting the initial signal after the reporting signal is transmitted, may transmit the reporting signal after pre-listen.

In step 2170, the BS 110-1 may transmit a second grant to the terminal 120. FIG. 21 illustrates that the BS 110-1 transmits the second grant to the terminal 120 in the licensed band, but is not limited thereto. That is, the BS 110-2 may transmit a second grant to the terminal 120 in the unlicensed band. Step 2170 corresponds to step 1270.

In step 2180, the terminal 120 may perform UL LBT for each channel. Step 2180 corresponds to step 1280.

In step 2190, the terminal 120 may transmit uplink data. Step 1990 corresponds to step 1290.

In step 2195, the BS 110 and the terminal 120 may release the channel connection.

In a state where a system (for example, Wi-Fi) using an asynchronous radio access scheme and a system (for example, LAA) using a synchronous radio access scheme share the unlicensed band, when the LBS according to various embodiments of the present disclosure is performed, it is possible to maximize the use efficiency of uplink resources and increase capability of user perceived throughput (UPT) in the uplink in comparison with the conventional art.

Hereinafter, parameters used for describing capability of LBS are defined.

A UL LBT success probability may be defined as a first parameter. The UL LBT success probability may be determined based on the following equation.

$$P_{LBT} = \frac{N_{success}}{N_{attempt}} \qquad \text{Equation (1)}$$

$P_{LBT}$ denotes a UL LBT success probability. $N_{success}$ denotes the number of times the UL LBT is succeeded. $N_{attempt}$ denotes the number of times the UL LBT is performed, in other words, the number of time the UL LBT is attempted.

Resource utilization efficiency (RUE) may be defined as a second parameter. Unless otherwise defined in the present disclosure, the RUE is utilization efficiency of uplink resources. The RUE may be determined based on the following equation.

$$RUE = \frac{N_{used\ RB}}{N_{scheduled\ RB}} \qquad \text{Equation (2)}$$

RUE denotes resource utilization efficiency. $N_{used\ RB}$ denotes the number of resource blocks used for actual uplink transmission. $N_{scheduled\ RB}$ denotes the number of resource blocks scheduled for uplink transmission. For example, the BS may allocate a total of 100 resource blocks to 4 terminals, that is, 25 resource blocks to each terminal. One of the 4 terminals may detect occupancy of the unlicensed band by a hidden node by performing UL LBT. The remaining 3 terminals of the 4 terminals may perform the UL LBT but not detect the occupancy of the unlicensed band by another node. The remaining 3 terminals may perform uplink transmission. RUE may be 75%.

UPT may be defined as a third parameter. The UPT may be determined based on the following equation.

$$UPT = \frac{S_{buffer}}{T_{reception} - T_{arrival}} \qquad \text{Equation (3)}$$

UPT denotes user perceived throughput. $S_{buffer}$ denotes a packet size. $T_{arrival}$ denotes a time point at which the packet arrives a buffer of a terminal of the corresponding user. $T_{reception}$ denotes a time at which the packet is successfully received by the terminal of the corresponding user.

Hereinafter, simulation environments such as [Table 1] and [Table 2] below are considered to evaluate the capability of the LBS according to various embodiments of the present disclosure. A packet arrival rate $\lambda$ of the LAA communication system is set as 1.0/second in the downlink and 0.3/second in the uplink. [Table 1] shows common parameters and [Table 2] shows system-dependent parameters.

TABLE 1

Figure 24:
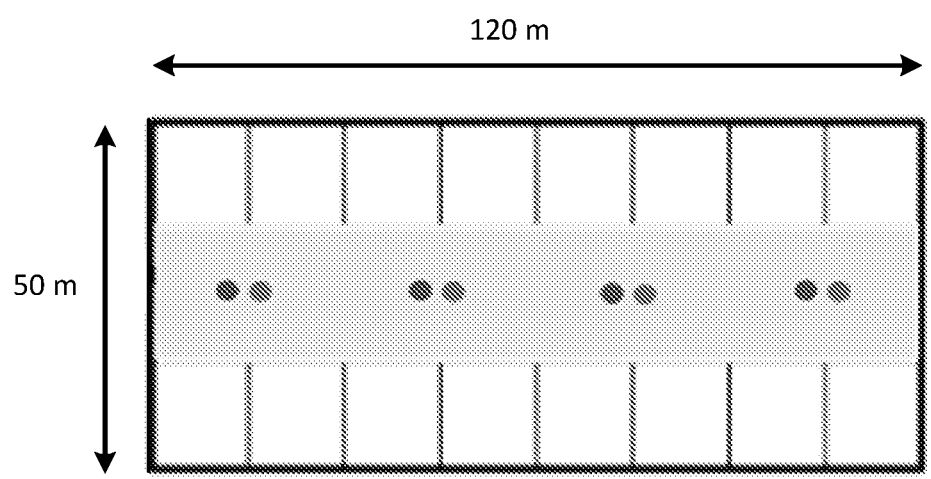
FIG. 24 illustrates a layout for nodes according to various embodiments of the present disclosure.

| Parameters | Value |
| --- | --- |
| Layout for nodes | Two operators deploy 4 small cells each in the single-floor building. The small cells of each operator are equally spaced and centered along the shorter dimension of the building. The distance between two closest nodes from two operators is random. The set of small cells for both operators is centered along the longer dimension of the building. For example, this layout for nodes is illustrated in FIG. 24. |
| System bandwidth per carrier | 20 MHz |
| Carrier frequency | 5.0 GHz for unlicensed band |
| Number of carriers | 1 |
| Total BS TX Power | 18 dBm |
| Total UE TX Power | 18 dBm |
| Channel model | ITU InH |
| Penetration | 0 dB |
| Antenna configuration | 2D Omni-directional, 1Tx2Rx |
| BS Antenna height | 6 m |
| UE Antenna height | 1.5 m |
| Antenna gain + connector loss | 5 dBi |
| Antenna gain of UE | 0 dBi |
| Number of UEs | 20 UEs per unlicensed band carrier per operator |
| UE dropping per network | All UEs should be randomly dropped and be within coverage of the small cell in the unlicensed band. |
| Minimum distance | 3 m (2D distance) |
| Traffic model | FTP Model 3 with packet size of 0.5 Mbytes (LAA: DL + UL, Wi-Fi: DL) |
| UE receiver | MRC |
| UE noise figure | 9 dB |
| UE speed | 3 km/h |
| Cell selection criteria | For LAA UEs, cell selection is based on RSRP in the unlicensed band. For WiFi STAs, cell selection is based on RSS (Received signal power strength) of WiFi APs. RSS threshold is −82 dBm. |

TABLE 2

| | Value | |
| --- | --- | --- |
| Parameters | LAA | Wi-Fi |
| Link adaptation | Closed-loop (realistic) | Open-loop |
| Scheduling | Proportional fair | N/A |

TABLE 2-continued

| Parameters | Value | |
| --- | --- | --- |
| | LAA | Wi-Fi |
| Channel coding | Turbo code | BCC |
| COT(TxOP) | 8 ms | 3 ms |
| CCA threshold | CCA-ED: −62 dBm | CCA-ED: −62 dBm |
| CCA slot size | 9 us | 9 us |
| Defer size | 34 us | 34 us (DIFS) |

In order to evaluate the LBS capability, the simulation is performed in 4 schemes.

A first scheme: does not use LBS (subframe ratio DL:UL=4:4)

A second scheme: does not use LBS+two-stage grant scheme (subframe ratio DL:UL=2:6)

A third scheme: LBS($T_{LBS=2\ ms}$)+two-stage grant scheme (subframe ratio DL:UL=3:5)

A fourth scheme: LBS($T_{LBS=1\ ms}$)+two-stage grant scheme (subframe ratio DL:UL=2:6)

$T_{LBS}$ may be defined as a difference between a time point at which the reporting signal is transmitted (a time point at which pre-listen ends) and a time point at which UL LBT actually ends.

Figure 22:
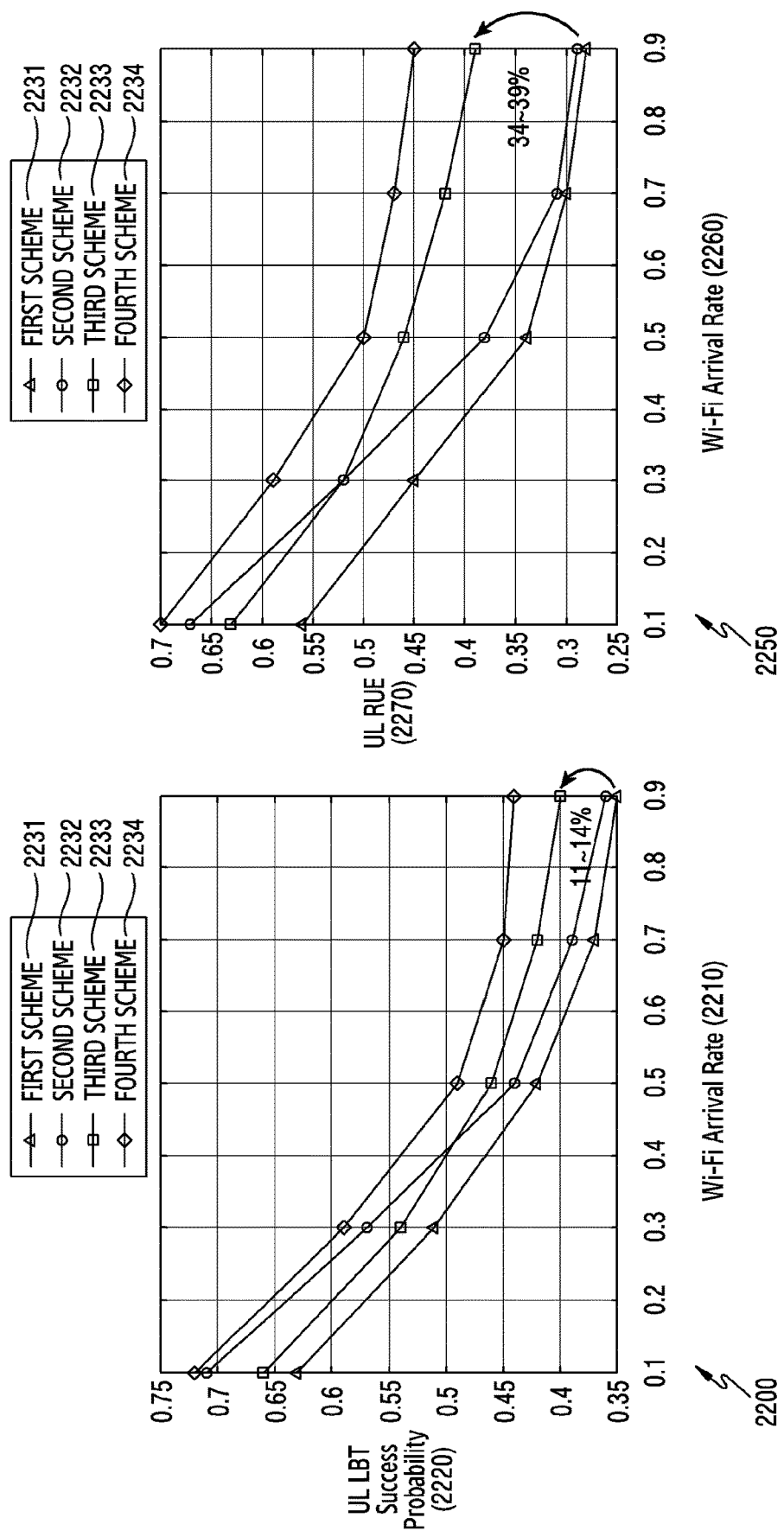
FIG. 22 illustrates a graph showing LBS capability in a wireless communication system according to various embodiments of the present disclosure.

FIG. 22 illustrates a graph showing LBS capability in a wireless communication system according to various embodiments of the present disclosure.

A graph 2200 shows a UL LBT success probability of each of 4 schemes (a first scheme 2231, a second scheme 2232, a third scheme 2233, and a fourth scheme 2234). A horizontal axis 2210 indicates a Wi-Fi arrival rate. The Wi-Fi arrival rate indicates an amount of traffic of an adjacent node. In other words, the Wi-Fi arrival rate indicates an amount of traffic by an adjacent node (for example, the node 130) as an interference source of the terminal 120 in FIG. 1. A vertical axis 2220 indicates a UL LBT success probability. Referring to the graph 2200, as the Wi-Fi arrival rate increases, a probability that the terminal occupies the uplink channel in the unlicensed band, that is, the UL LBT success probability may decrease. It is because, when the terminal performs UL LBT, a probability that Wi-Fi occupies the channel is already high.

In the graph 2200, the second scheme 2232 has an interval in which the UL LBT success probability is higher than the third scheme 2233. However, when Wi-Fi traffic increases, capability of the second scheme 2232 may decrease compared to the third scheme 2233. Meanwhile, since much traffic exists in a Wi-Fi buffer in an environment having much Wi-Fi traffic, a channel occupancy probability (1−$P_{LBT}$) by a Wi-Fi node may be consistent regardless of the number of uplink subframes in every UL LBT of the terminal.

Meanwhile, the third scheme 2233 or the fourth scheme 2234 performing the LBS may have a substantially higher success rate than the first scheme 2231 or the second scheme 2232.

Particularly, as Wi-Fi traffic increases, a capability gap may further increase. The UL LBT success rate in the third scheme 2233 may improve 11% to 14% compared to the first scheme 2231 or the second scheme 2232. It is because, as Wi-Fi traffic is larger, chances to prevent unnecessary resource allocation may increase through the LBS. The BS may more effectively select a terminal having an idle channel through the third scheme 2233 or the fourth scheme 2234 compared to the first scheme 2231 or the second scheme 2232 That is, the performance of the LBS, the UL LBT success rate may be improved.

A graph 2250 shows RUE of each of the four schemes (the first scheme 2231, the second scheme 2232, the third scheme 2233, and the fourth scheme 2234). A horizontal axis 2260 indicates a Wi-Fi arrival rate. A vertical axis 2270 indicates RUE. The RUE is resource utilization efficiency in the uplink, and refers to metric indicating an amount of resources used for uplink transmission of the terminal among the amount of resources allocated to the terminal. The RUE may indicate MAC efficiency in the uplink. The RUE is relevant to throughput.

RUE capability is also similar to the UL LBT success rate. Referring to the graph 2250, the UL LBT success rate in the third scheme 2233 may increase by 34% to 39% compared to the UL LBT success rate in the first scheme 2231 or the second scheme 2232.

In current iterations in which the LBS is not performed like in the first scheme 2231 or the second scheme 2232, the BS may allocate more resources to the terminal that fails in the LBT according to a proportional fairness (PF) scheduling algorithm. Accordingly, an amount of wasted resources in the first scheme 2231 or the second scheme 2232 may increase. In a comparison between the graph 2200 and the graph 2250, the RUE of the first scheme 2231 or the second scheme 2232 is lower than the UL LBT success rate. On the other hand, in the third scheme 2233 or the fourth scheme 2234, the BS selects terminals (a terminal which does not detect other nodes occupying the channel based on the LBS result) having a high UL LBT success probability and performs scheduling. Accordingly, in a comparison between the graph 2200 and the graph 2250, the RUE of the third scheme 2233 or the fourth scheme 2234 may be similar to the UL LBT success rate.

Figure 23:
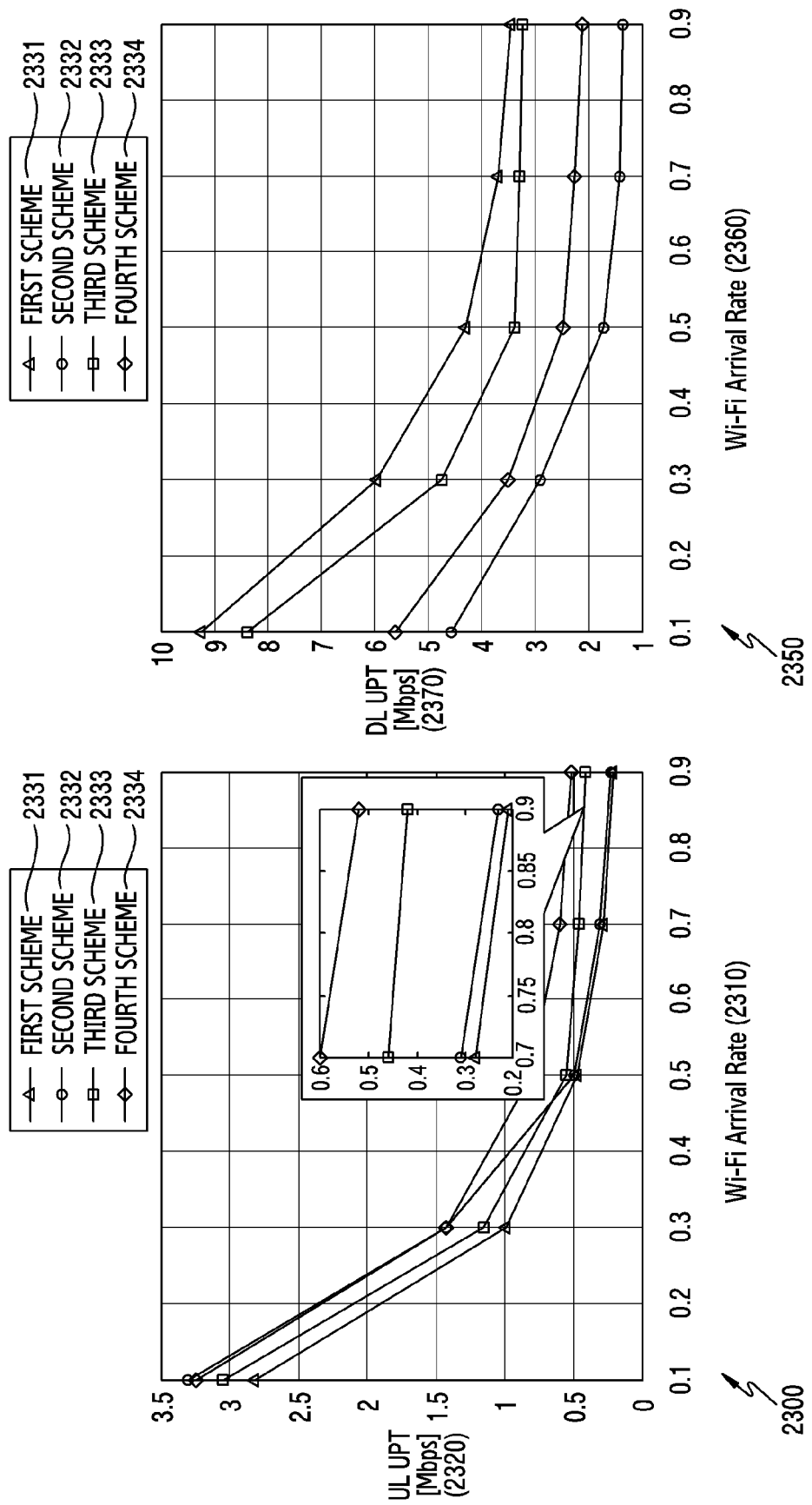
FIG. 23 illustrates another graph indicating LBS capability in a wireless communication system according to various embodiments of the present disclosure.

FIG. 23 illustrates another graph indicating LBS capability in a wireless communication system according to various embodiments of the present disclosure. FIG. 23 illustrates graphs for capability of UPT.

A graph 2300 shows UL UPT of each of the 4 schemes (the first scheme 2331, the second scheme 2332, the third scheme 2333, and the fourth scheme 2334). A horizontal axis 2310 indicates a Wi-Fi arrival rate. A vertical axis 2320 indicates UL UPT. The UL UPT may be influenced by a ratio between the uplink subframe and the downlink subframe.

In the case of the second scheme 2332, since there are many uplink subframes, the UL UPT may be relatively higher compared to other schemes even though the RUE is low. However, in the second scheme 2332, UPT capability may decrease compared to the fourth scheme 2334 since the RUE decreases as Wi-Fi traffic increases.

In the case of the third scheme 2333 performing the LBS, since there are smaller uplink subframes compared to the second scheme 2332, the UL UPT capability may be lower than the second scheme 2332 in an environment having small Wi-Fi traffic. However, as Wi-Fi traffic increases, the RUE increases, so that the UL UPT of the third scheme 2333 may increase 83% to 100% compared to the first scheme 2231 or the second scheme 2232.

A graph 2350 shows DL UPT of each of the 4 schemes (the first scheme 2331, the second scheme 2332, the third scheme 2333, and the fourth scheme 2334). A horizontal axis 2360 indicates a Wi-Fi arrival rate. A vertical axis 2370 indicates UL UPT. The LBS is an LBT procedure for uplink data transmission, but a performance gain in the uplink may influence a performance gain in the downlink and an effect of increasing channel utilization efficiency of all systems (LAA and Wi-Fi) may be created.

In a comparison between the second scheme 2332 and the fourth scheme 2334, although they have the same downlink subframe ratio, DL UTP in the fourth scheme 2334 performing the LBS may be higher than DL UPT in the second scheme 2332. According to the schemes performing the LBS (the third scheme 2333 and the fourth scheme 2334), UL MAC efficiency improves compared to the schemes in which the LBS is not performed, so that an uplink traffic processing rate may increase. As uplink traffic is rapidly processed, a probability that uplink traffic of a particular terminal occupies a channel between the BS and another terminal. Accordingly, as the LBS is performed, the DL UPT capability may improve.

As described above, the terminal directly performs LBT before uplink scheduling (LBS) and uplink resources are allocated according to the LBS result instead of allocating resources according to the LBT performed by the BS, so that an amount of wasted resources may decrease. Specifically, through performance of the LBS by the terminal, a possibility that allocated resources are not used due to channel occupancy by a hidden node may be reduced. Further, since the LBS is performed in a subframe more adjacent to the uplink subframe, a variable occupancy state of the unlicensed band may be accurately grasped. In addition, by performing the LBS through the two-stage grant, a processing time of uplink resources by the terminal may be reduced, a probability that a state of channel occupancy by another node is changed may be reduced, and resource utilization efficiency may increase.

Methods stated in claims and/or specifications according to various embodiments may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random-access memory (RAM) and a flash memory, a read only memory (ROM), an electrically erasable programmable ROM (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the internet, intranet, local area network (LAN), wide LAN (WLAN), and storage area network (SAN) or a combination thereof. Such a storage device may access, via an external port, the electronic device that performs various embodiments of the present disclosure. Further, a separate storage device on the communication network may access a portable electronic device.

In the above-described detailed various embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to various embodiments thereof, it will be understood by those skilled in the art that various changes in form and details may be made therein without departing from the spirit and scope of the present disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
    receiving uplink transmission information for generating at least one transport block (TB) before a pre-listen interval;
    receiving information for indicating the pre-listen interval;
    transmitting a reporting signal for indicating that a channel of an unlicensed band is detected to be idle during the pre-listen interval;
    receiving resource allocation information for indicating uplink resources in the channel of the unlicensed band allocated based on the reporting signal; and
    transmitting uplink data according to the at least one TB through the uplink resources.

2. The method of claim 1, wherein:
    the receiving of the information for indicating the pre-listen interval comprises:
        receiving configuration information from a base station; and
        receiving a request signal for triggering transmission of the reporting signal,
    wherein the information for indicating the pre-listen interval is included in the configuration information or the request signal, and
    wherein the request signal includes resource information for the reporting signal,
    wherein the request signal includes information for a sounding reference signal, SRS, request,
    wherein the reporting signal is an SRS according to the SRS request, and
    wherein the configuration information includes information for indicating a type of each of at least one subframe within a channel occupation time (COT) including the pre-listen interval.

3. The method of claim 1, further comprising:
    based on control information indicating that there is no downlink traffic on the unlicensed band before a starting symbol of the uplink data after transmitting the reporting signal, transmitting a reservation signal on the channel until the starting symbol of the uplink data after transmitting the reporting signal; and
    based on control information indicating that there is downlink traffic on the unlicensed band before the starting symbol of the uplink data after transmitting the reporting signal, receiving downlink data through the unlicensed band, wherein a request signal for triggering transmission of the reporting signal and the resource allocation information are received through the unlicensed band.

4. The method of claim 1, further comprising:
generating the at least one TB based on the uplink transmission information; and
mapping the at least one TB to the uplink resources based on the resource allocation information,
wherein the uplink transmission information includes modulation and coding scheme (MCS) information for generating the at least one TB.

5. The method of claim 1, further comprising:
generating a plurality of TBs for a plurality of predetermined uplink resource allocation sets based on the uplink transmission information; and
identifying the at least one TB among the generated plurality of TBs based on the resource allocation information.

6. The method of claim 1, further comprising:
transmitting a second reporting signal for indicating that a second channel of the unlicensed band is detected to be idle during the pre-listen interval;
receiving second resource allocation information for indicating second uplink resources in the second channel of the unlicensed band; and
transmitting second uplink data based on the second uplink resources,
wherein the uplink data and the second uplink data are transmitted through channel aggregation (CA) as secondary component carriers (SCCs).

7. The method of claim 1, further comprising:
receiving control information for requesting a transmission of a reservation signal for occupying the unlicensed band; and
transmitting the reservation signal for occupying the unlicensed band,
unlink an uplink subframe for the uplink data after the pre-listen interval.

8. The method of claim 1, further comprising:
receiving a request signal for the reporting signal, the request signal including:
resource information for the reporting signal; and
an offset value between a reception of the request signal and a transmission of the reporting signal in a time domain,
wherein the reporting signal is transmitted based on the offset value in the time domain.

9. The method of claim 1,
wherein the uplink transmission information includes hybrid automatic repeat and request (HARQ) information,
wherein the HARQ information is used to determine a transport block size, TBS, for the at least one TB, and
wherein the HARQ information includes a HARQ process number.

10. A terminal in a wireless communication system, the terminal comprising:
at least one transceiver; and
at least one processor, operably coupled to the at least one transceiver, configured to control the at least one transceiver to:
receive uplink transmission information for generating at least one transport block (TB) before a pre-listen interval;
receive information for indicating the pre-listen interval;
transmit a reporting signal for indicating that a channel of an unlicensed band is detected to be idle during the pre-listen interval;
receive resource allocation information for indicating uplink resources of the unlicensed band allocated based on the reporting signal; and
transmit uplink data according to the at least one TB through the uplink resources.

11. The terminal of claim 10, wherein, in order to receive the information for indicating the pre-listen interval, the at least one processor is configured to control the at least one transceiver to:
receive configuration information from a base station and a request signal for triggering transmission of the reporting signal, and
wherein the information for indicating the pre-listen interval is included in the configuration information or the request signal,
wherein the request signal includes resource information for the reporting signal,
wherein the request signal includes information for a sounding reference signal, SRS, request,
wherein the reporting signal is an SRS according to the SRS request, and
wherein the configuration information includes information for indicating a type of each of at least one subframe within a channel occupation time (COT) including the pre-listen interval.

12. The terminal of claim 11, wherein
the at least one processor is further configured to control the at least one transceiver to:
transmit a second reporting signal for indicating that a second channel of the unlicensed band is detected to be idle during the pre-listen interval,
receive second resource allocation information for indicating second uplink resources in the second channel of the unlicensed band, and
transmit second uplink data based on the second uplink resources, and
wherein the uplink data and the second uplink data are transmitted through channel aggregation (CA) as secondary component carriers (SCCs).

13. The terminal of claim 10, wherein the at least one processor is further configured to control the at least one transceiver to:
based on control information indicating that there is no downlink traffic on the unlicensed band before a starting symbol of the uplink data after transmitting the reporting signal, transmit a reservation signal on the channel until the starting symbol of the uplink data after transmitting the reporting signal; and
based on control information indicating that there is downlink traffic on the unlicensed band before the starting symbol of the uplink data after transmitting the reporting signal, receive downlink data through the unlicensed band,
wherein a request signal for triggering transmission of the reporting signal and the resource allocation information are received through the unlicensed band.

14. The terminal of claim 10, wherein
the at least one processor is further configured to:
generate the at least one TB based on the uplink transmission information; and
map the at least one TB to the uplink resources based on the resource allocation information, and wherein the uplink transmission information includes modulation and coding scheme (MCS) information for generating the at least one TB.

15. The terminal of claim 14, wherein the at least one processor is further configured to:
generate a plurality of TBs for a plurality of predetermined uplink resource allocation sets based on the uplink transmission information, and
identify the at least one TB among the generated transport blocks plurality of TBs based on the resource allocation information.

16. The terminal of claim 10, wherein the at least one processor is further configured to control the at least one transceiver to:
receive control information for requesting a transmission of a reservation signal for occupying the unlicensed band; and
transmit the reservation signal for occupying the unlicensed band
until an uplink subframe for the uplink data after the pre-listen interval.

17. The terminal of claim 10, wherein the at least one processor is further configured to:
control the at least one transceiver to receive a request signal for the reporting signal, the request signal including:
resource information for the reporting signal; and
an offset value between a reception of the request signal and a transmission of the reporting signal in a time domain, and
wherein the reporting signal is transmitted based on the offset value in the time domain.

18. The terminal of claim 10,
wherein the uplink transmission information includes hybrid automatic repeat and request (HARQ) information,
wherein the HARQ information is used to determine a transport block size, TBS, for the at least one TB, and
wherein the HARQ information includes a HARQ process number.

19. A base station in a wireless communication system, the base station comprising:
at least one transceiver; and
at least one processor, operably coupled to the at least one transceiver, configured to control the at least one transceiver to:
transmit uplink transmission information for generating at least one transport block (TB) before a pre-listen interval;
transmit information for indicating the pre-listen interval;
receive, from a terminal, a reporting signal for indicating that a channel of an unlicensed band is detected to be idle during the pre-listen interval;
transmit, to the terminal, resource allocation information for indicating uplink resources in the channel of the unlicensed band allocated based on the reporting signal; and
receive, from the terminal, uplink data according to the at least one TB through the uplink resources.

20. The base station of claim 19, wherein the at least one processor is, in order to transmit the information for indicating the pre-listen interval, configured to:
control the at least one transceiver to transmit configuration information to the terminal and transmit a request signal for triggering transmission of the reporting signal to the terminal, wherein the information for indicating the pre-listen interval is included in the configuration information or the request signal,
wherein the request signal includes resource information for the reporting signal,
wherein the request signal includes information for a sounding reference signal, SRS, request,
wherein the reporting signal is an SRS according to the SRS request, and
wherein the configuration information includes information for indicating a type of each of at least one subframe within a channel occupancy time (COT) including the pre-listen interval.

21. The base station of claim 20, wherein the at least one processor is further configured to control the at least one transceiver to:
transmit control information indicating that there is downlink traffic on the unlicensed band before a starting symbol of the uplink data after transmitting the reporting signal, and
transmit downlink data to the terminal through the unlicensed band according to the configuration information, and
wherein the request signal and the resource allocation information are transmitted through the unlicensed band.

22. The base station of claim 20,
wherein the uplink transmission information includes modulation and coding scheme (MCS) information for generating the at least one transport block (TB) including the uplink data.

23. The base station of claim 20, wherein the at least one processor is configured to control the at least one transceiver to:
receive, from the terminal, a second reporting signal for indicating that a second channel of the unlicensed band is detected to be idle during the pre-listen interval,
transmit second allocation information for indicating second uplink resources in the second channel of the second unlicensed band, and
receive second uplink data based on the second uplink resources.

24. The base station of claim 19, wherein
the at least one processor is further configured to control the at least one transceiver to transmit control information for requesting a transmission of a reservation signal for occupying the unlicensed band after the pre-listen interval until an uplink subframe for the uplink data.

25. The base station of claim 19, wherein the at least one processor is further configured to:
control the at least one transceiver to transmit a request signal for the reporting signal, the request signal including:
resource information for the reporting signal; and
an offset value between a reception of the request signal and a transmission of the reporting signal in a time domain, and
wherein the reporting signal is transmitted based on the offset value in the time domain.

26. The base station of claim 19,
wherein the uplink transmission information includes hybrid automatic repeat and request (HARQ) information,
wherein the HARQ information is used to determine a transport block size, TBS, for the at least one TB, and wherein the HARQ information includes a HARQ process number.

\* \* \* \* \*